(12) United States Patent
Kogo et al.

(10) Patent No.: US 8,947,791 B2
(45) Date of Patent: Feb. 3, 2015

(54) LARGE APERTURE ZOOM OPTICAL SYSTEM AND IMAGE PICKUP APPARATUS

(75) Inventors: Shoji Kogo, Hino (JP); Yasushi Yamamoto, Kishiwada (JP); Kana Inoue, Osaka (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 191 days.

(21) Appl. No.: 13/495,822

(22) Filed: Jun. 13, 2012

(65) Prior Publication Data

US 2012/0314291 A1      Dec. 13, 2012

(30) Foreign Application Priority Data

Jun. 13, 2011   (JP) .................... 2011-130825

(51) Int. Cl.
*G02B 9/60*   (2006.01)
*G02B 15/14*  (2006.01)
*G02B 15/173* (2006.01)
*G02B 27/64*  (2006.01)

(52) U.S. Cl.
CPC ............ *G02B 15/173* (2013.01); *G02B 27/646* (2013.01); *G02B 9/60* (2013.01)
USPC ............ 359/766; 359/432; 359/676; 359/684

(58) Field of Classification Search
CPC ...... G02B 17/00; G02B 15/173; G02B 15/12; G02B 9/60; G02B 15/14
USPC ......... 359/555, 557, 676–692, 714, 746, 753, 359/766, 773
See application file for complete search history.

(56) References Cited

U.S. PATENT DOCUMENTS

| 4,749,266 A * | 6/1988 | Takahashi et al. ............ 359/683 |
| 5,059,007 A | 10/1991 | Tanaka |
| 5,477,297 A | 12/1995 | Suzuki |
| 2005/0157403 A1 * | 7/2005 | Sato ............................. 359/687 |
| 2010/0214658 A1 * | 8/2010 | Ito ................................ 359/557 |
| 2011/0080651 A1 * | 4/2011 | Sakamoto ..................... 359/683 |
| 2011/0228407 A1 * | 9/2011 | Yamaguchi ................... 359/687 |

FOREIGN PATENT DOCUMENTS

| JP | 2-244110 | 9/1990 |
| JP | 7-92431 | 4/1995 |
| JP | 2000-19398 | 1/2000 |
| JP | 2007-150996 | 6/2007 |
| JP | 2010-136269 | 6/2010 |

* cited by examiner

*Primary Examiner* — Thomas K Pham
*Assistant Examiner* — Collin X Beatty
(74) *Attorney, Agent, or Firm* — Cozen O'Connor

(57) ABSTRACT

A large aperture zoom optical system and an image pickup apparatus have a five-lens-group arrangement of positive-negative-positive-negative-positive refractive powers. At the time of zooming, the fifth lens group is fixed, and at least the second lens group, the third lens group and the fourth lens group are moved. The third lens group for use in focusing is composed of a single lens element.

15 Claims, 33 Drawing Sheets

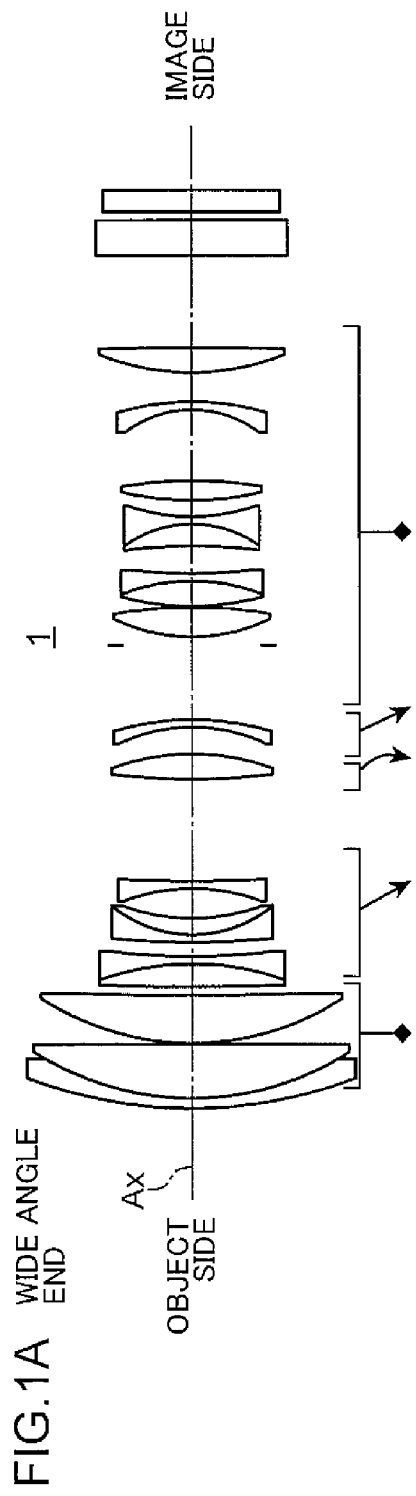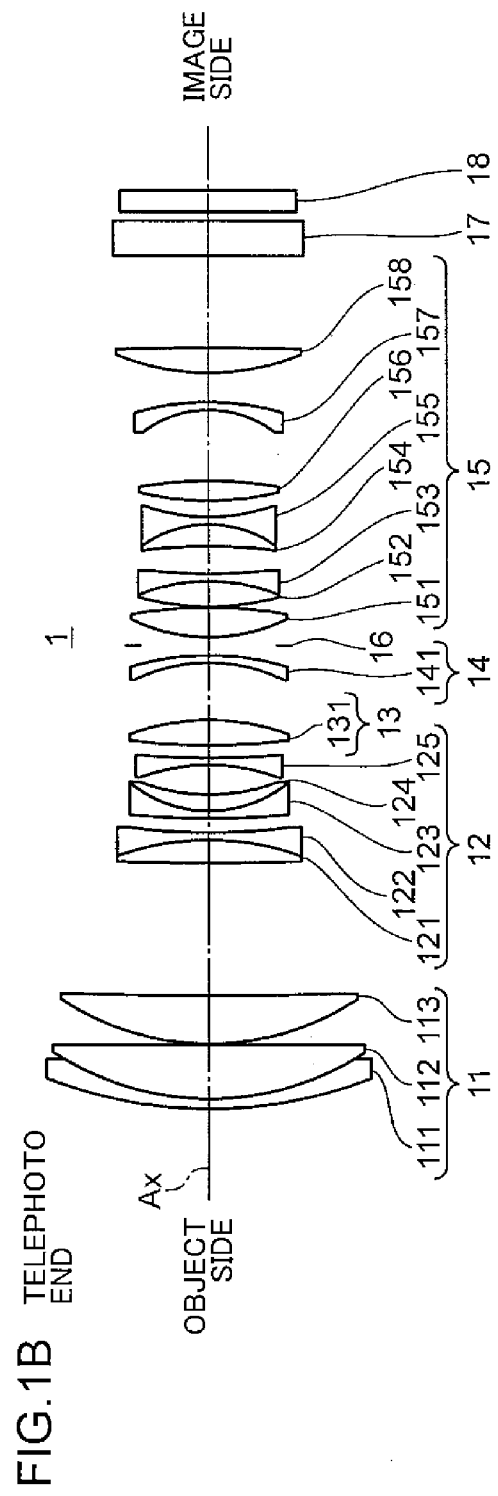

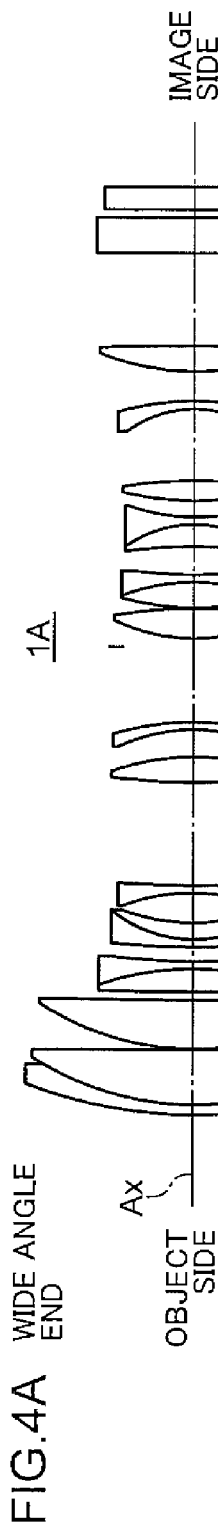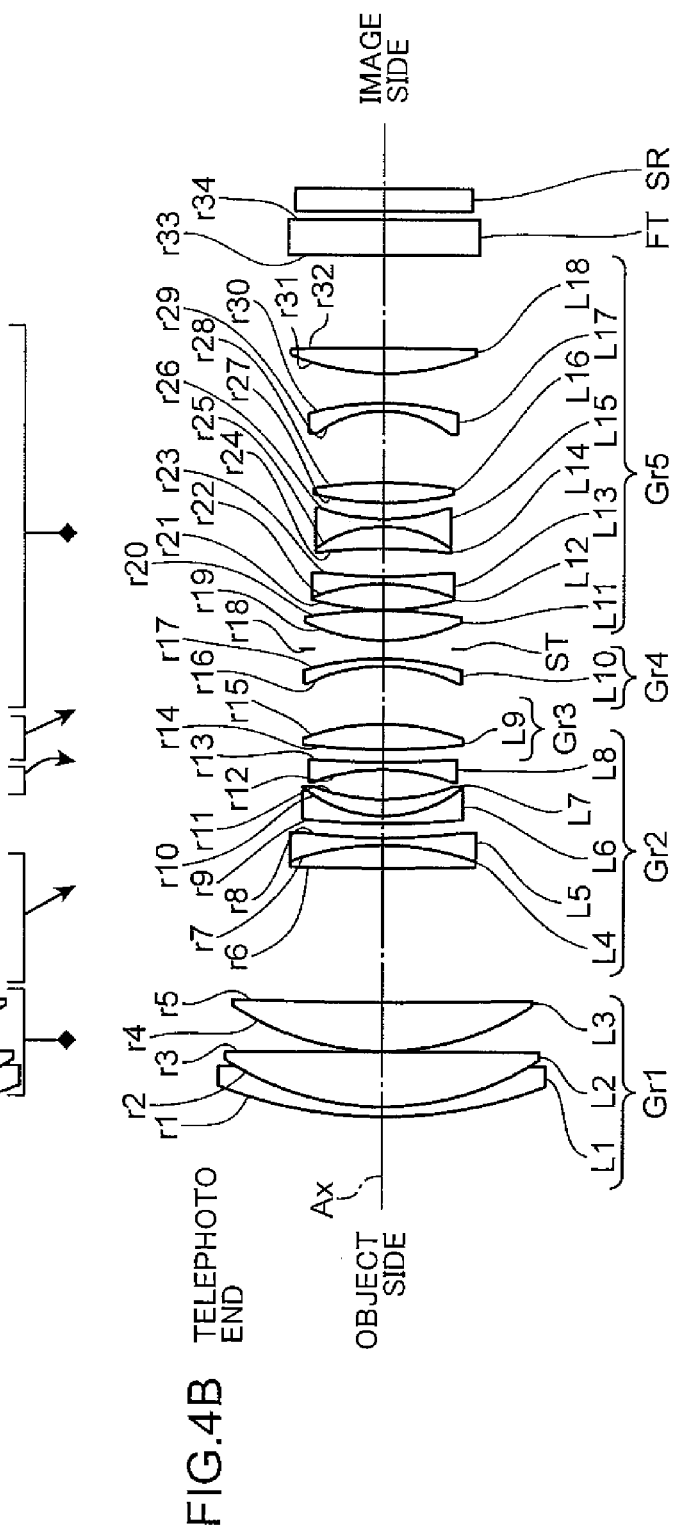
FIG.4A WIDE ANGLE END
FIG.4B TELEPHOTO END

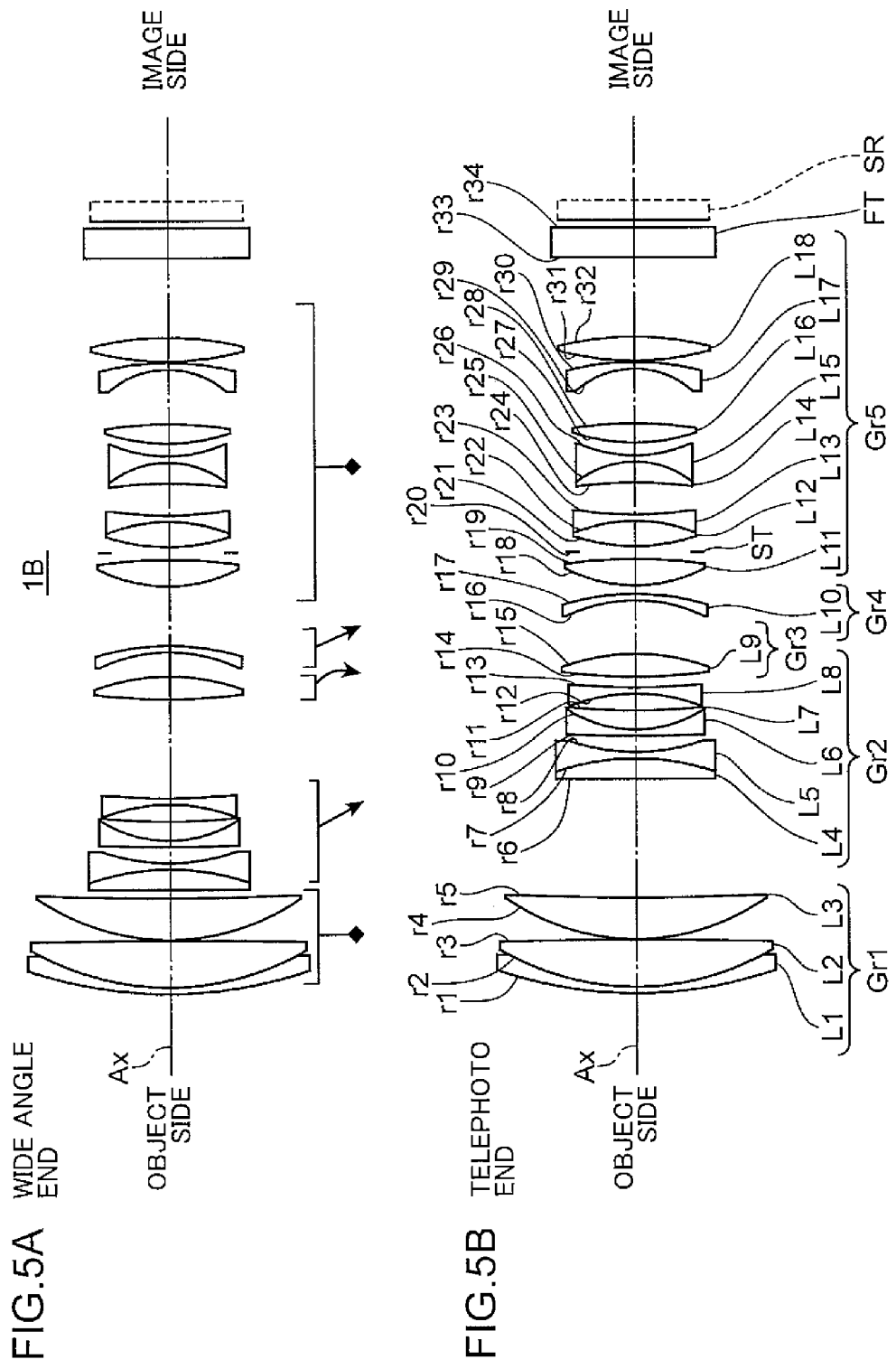

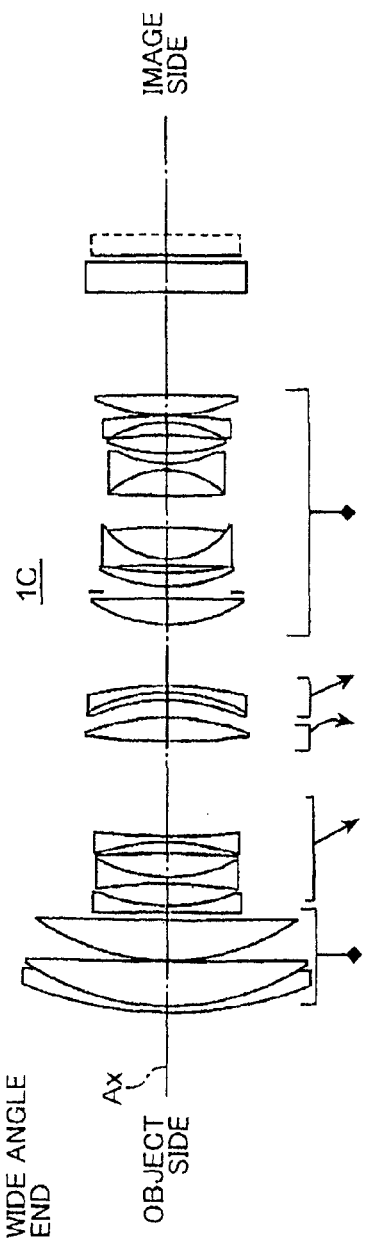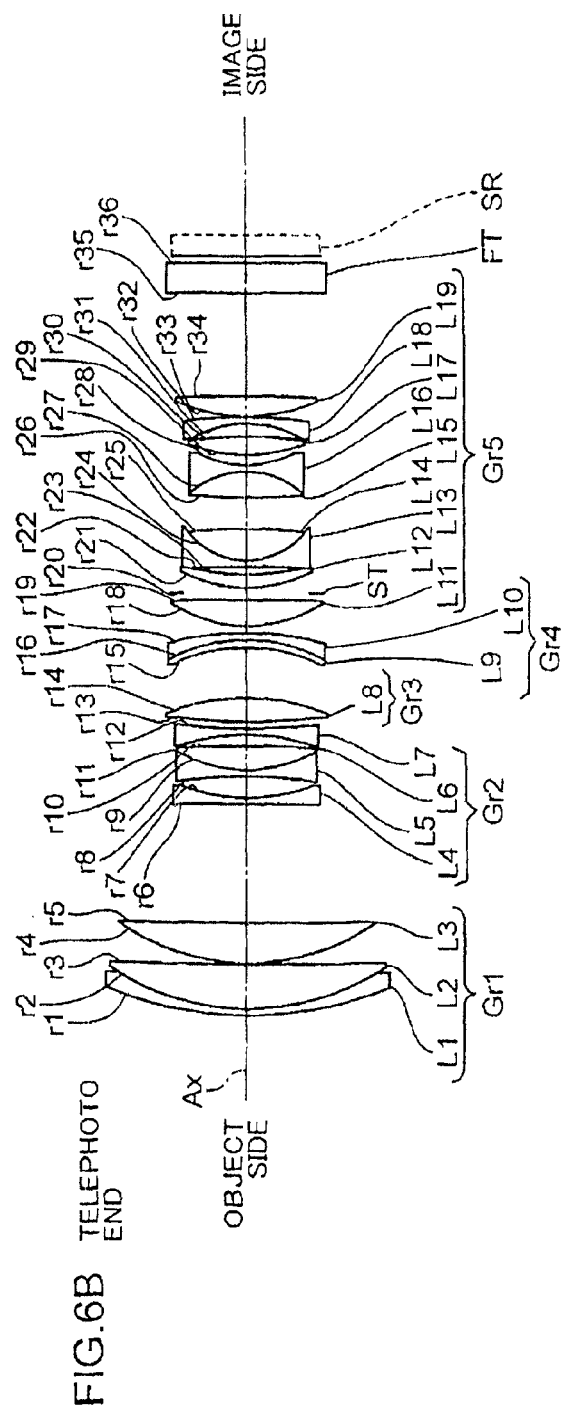
FIG.6A WIDE ANGLE END
FIG.6B TELEPHOTO END

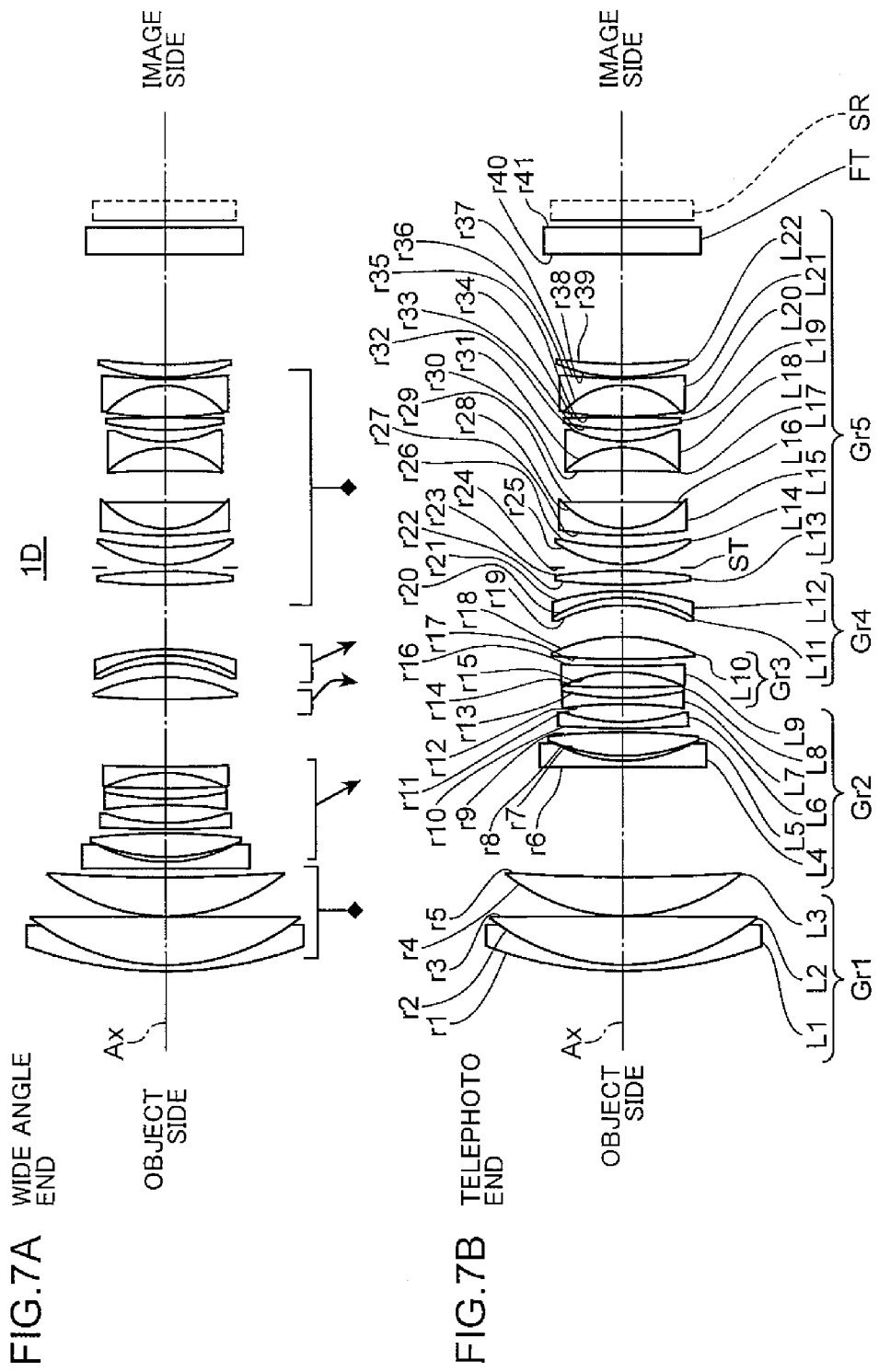

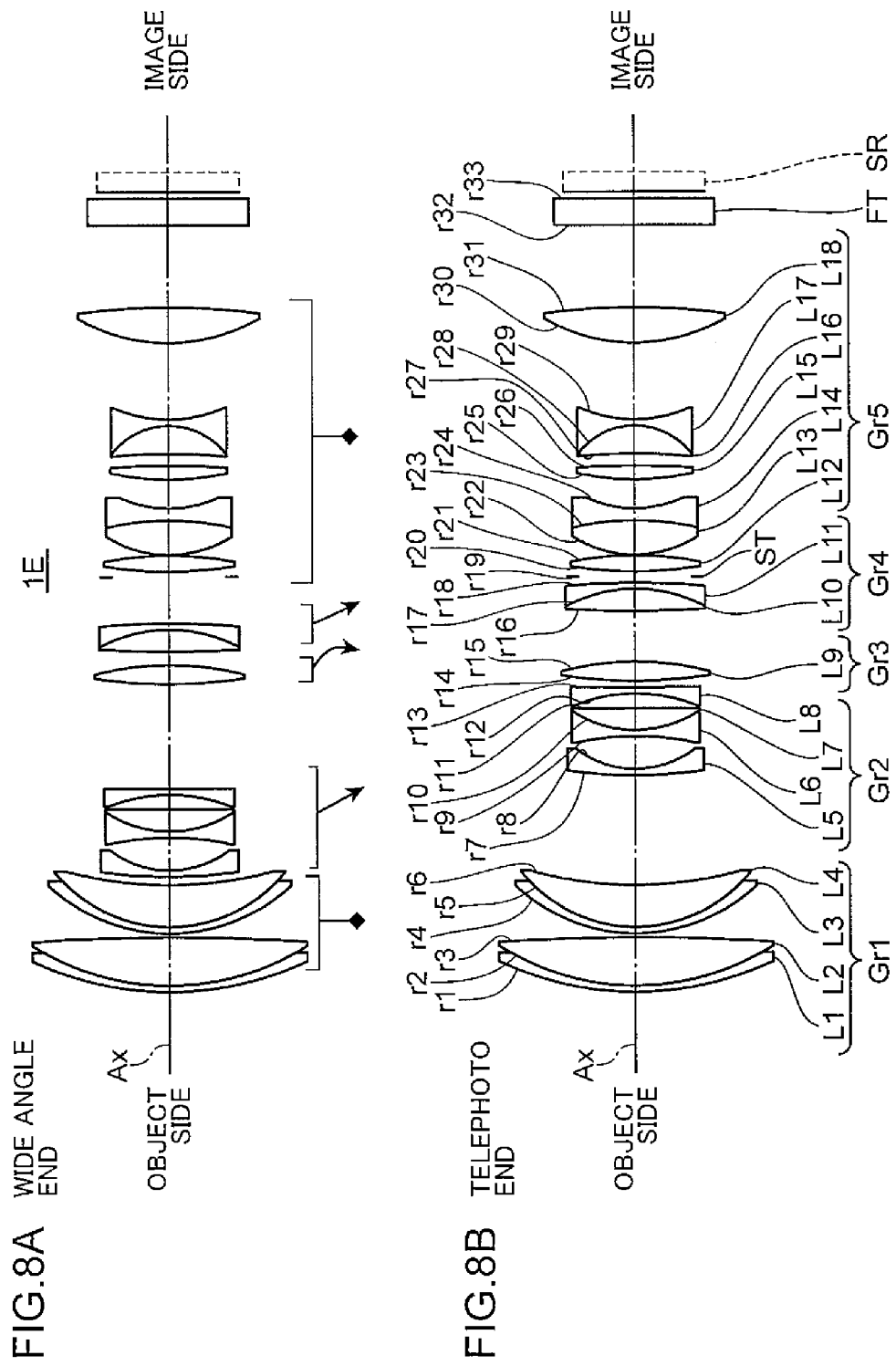
FIG.8A WIDE ANGLE END
FIG.8B TELEPHOTO END

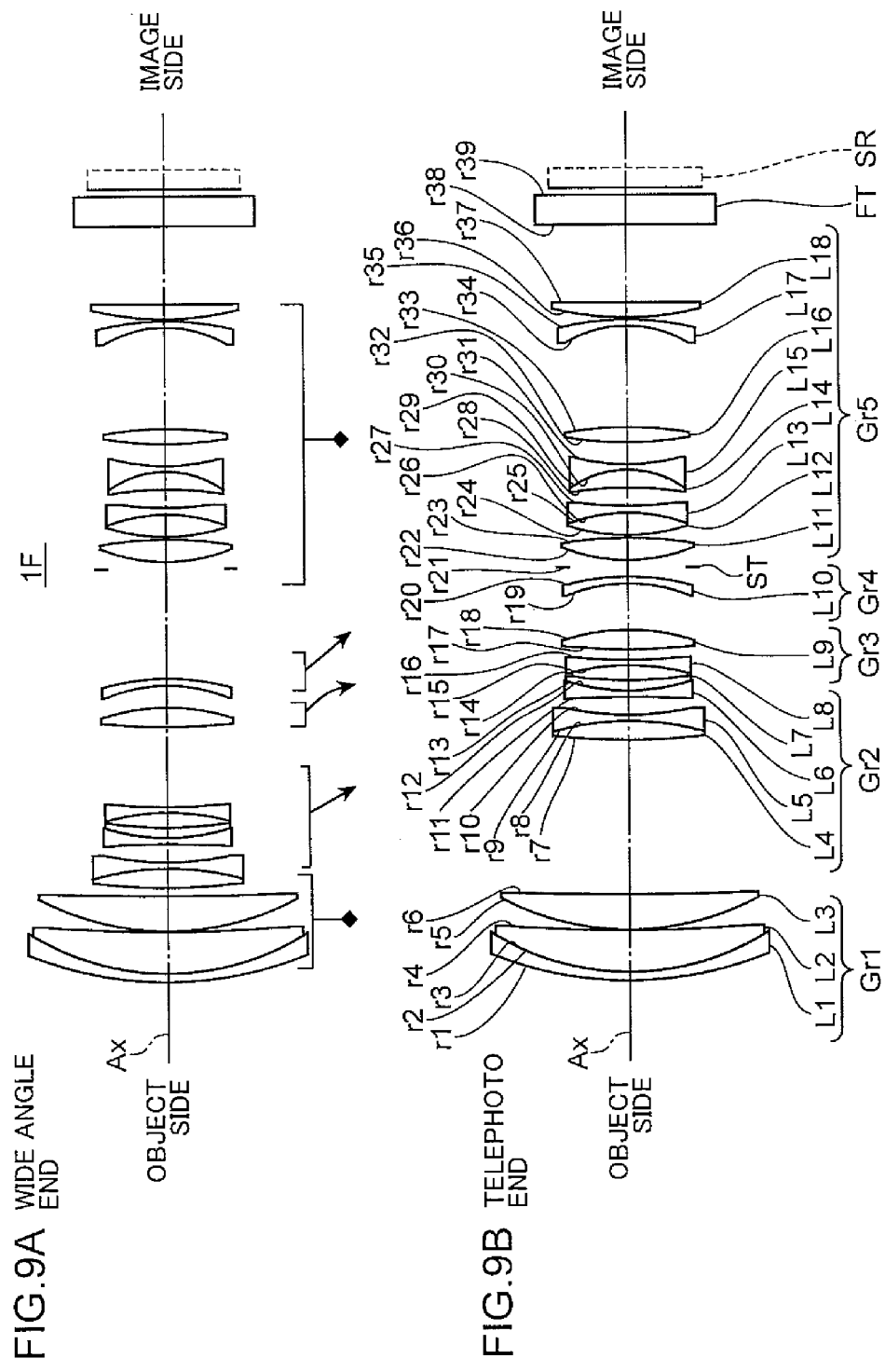
FIG.9A WIDE ANGLE END
FIG.9B TELEPHOTO END

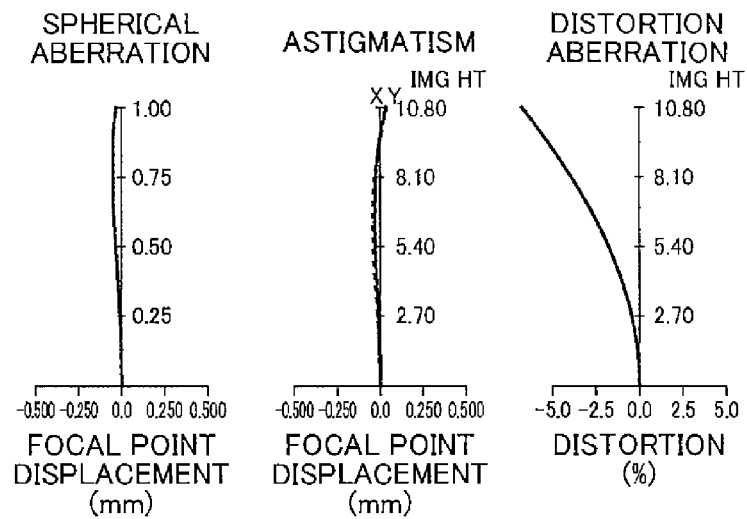
FIG.10A EXAMPLE 1 (INFINITE, WIDE ANGLE END)
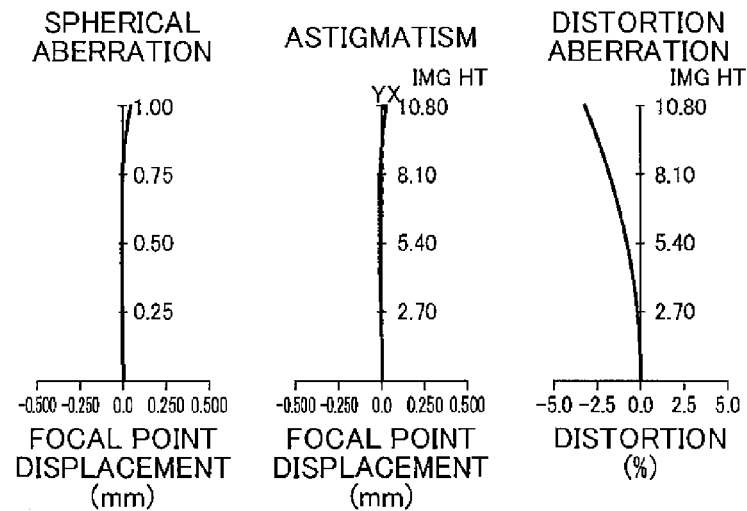
FIG.10B EXAMPLE 1 (INFINITE, MIDDLE)
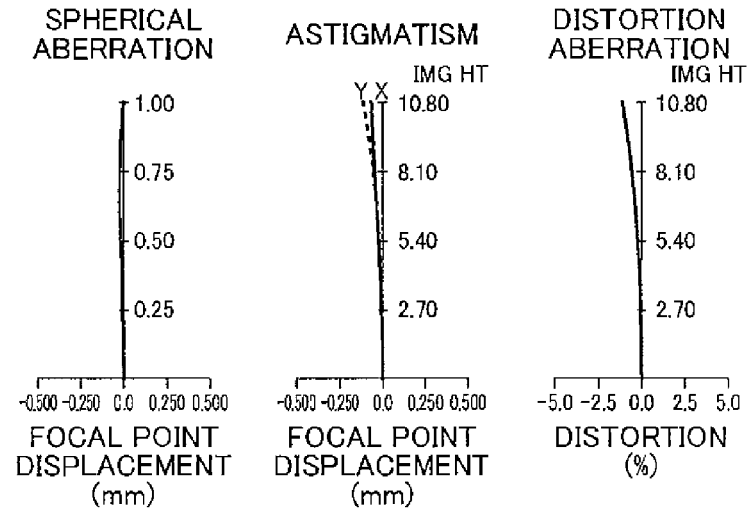
FIG.10C EXAMPLE 1 (INFINITE, TELEPHOTO END)

FIG.11A
EXAMPLE 1
(INFINITE, WIDE ANGLE END)

FIG.11B
EXAMPLE 1
(INFINITE, MIDDLE)

FIG.11C
EXAMPLE 1
(INFINITE, TELEPHOTO END)

FIG.12A EXAMPLE 1 (CLOSEST, WIDE ANGLE END)
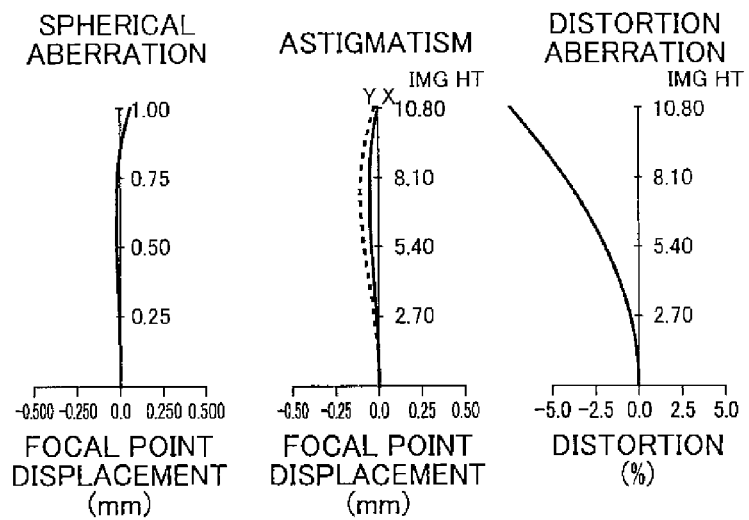
FIG.12B EXAMPLE 1 (CLOSEST, MIDDLE)
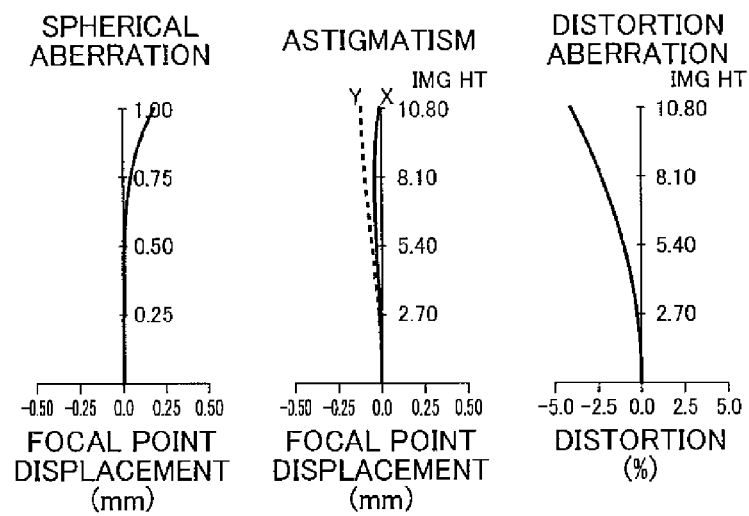
FIG.12C EXAMPLE 1 (CLOSEST, TELEPHOTO END)
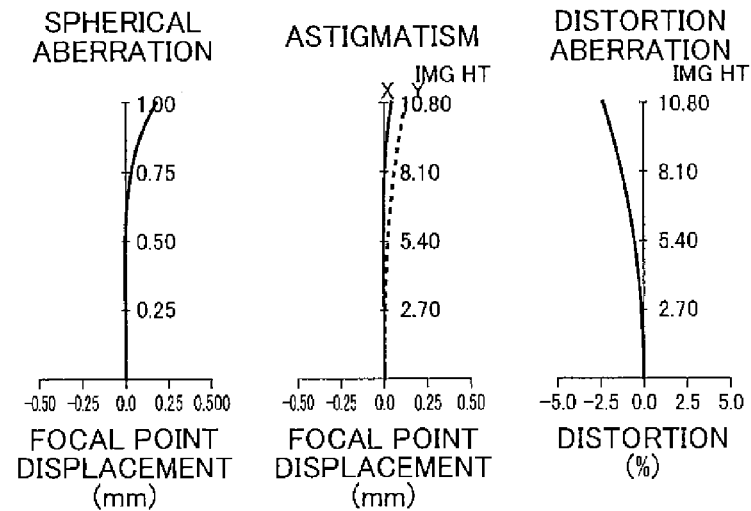

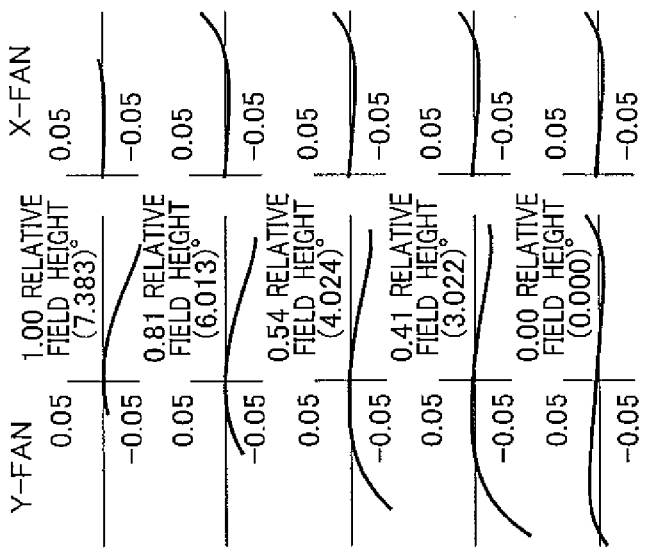
FIG.13A EXAMPLE 1 (CLOSEST, WIDE ANGLE END)
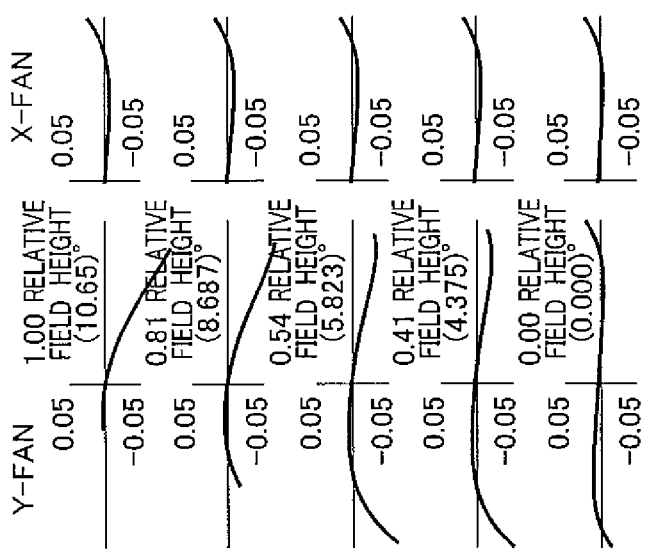
FIG.13B EXAMPLE 1 (CLOSEST, MIDDLE)
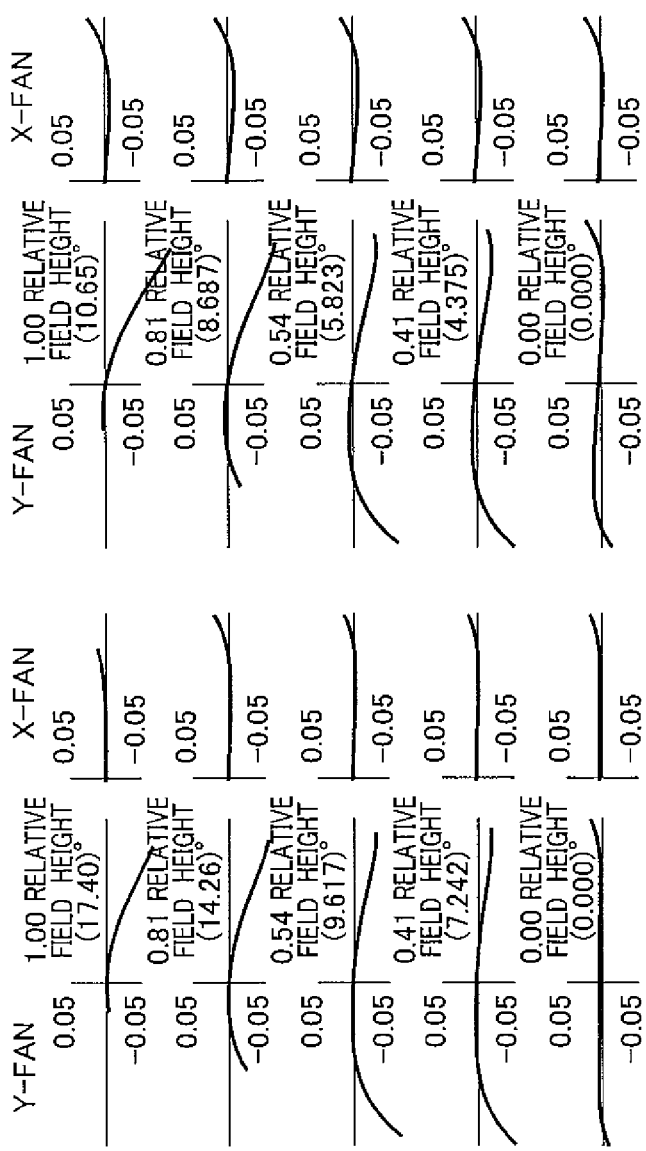
FIG.13C EXAMPLE 1 (CLOSEST, TELEPHOTO END)

FIG.14A EXAMPLE 2 (INFINITE, WIDE ANGLE END)
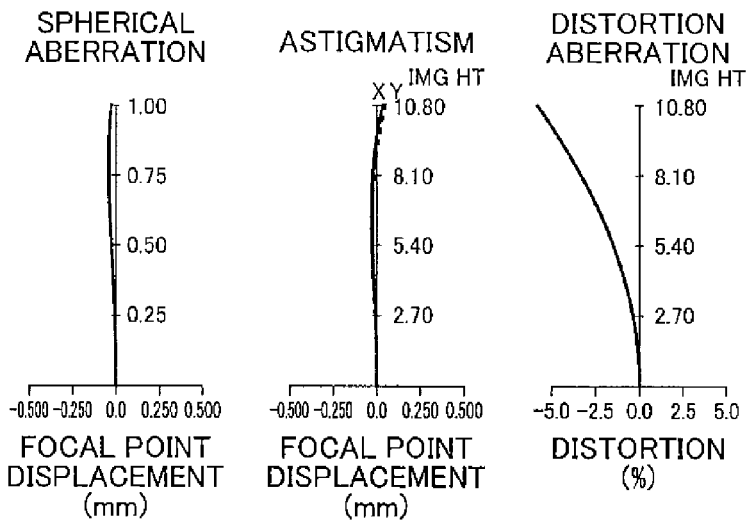
FIG.14B EXAMPLE 2 (INFINITE, MIDDLE)
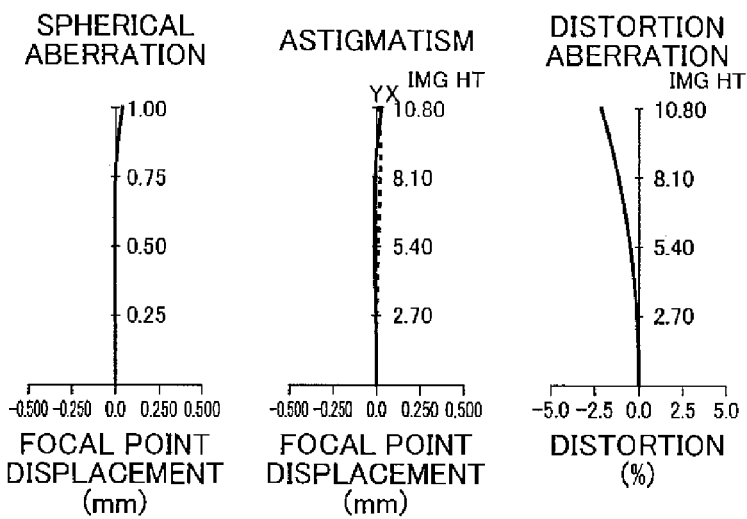
FIG.14C EXAMPLE 2 (INFINITE, TELEPHOTO END)
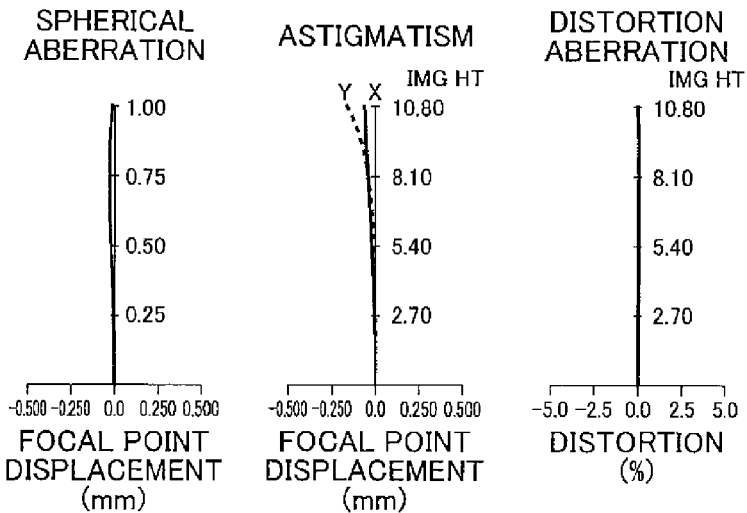

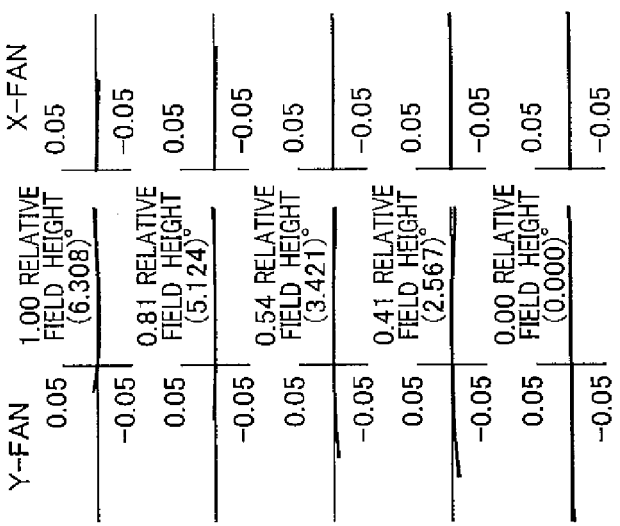
FIG.15A EXAMPLE 2 (INFINITE, WIDE ANGLE END)
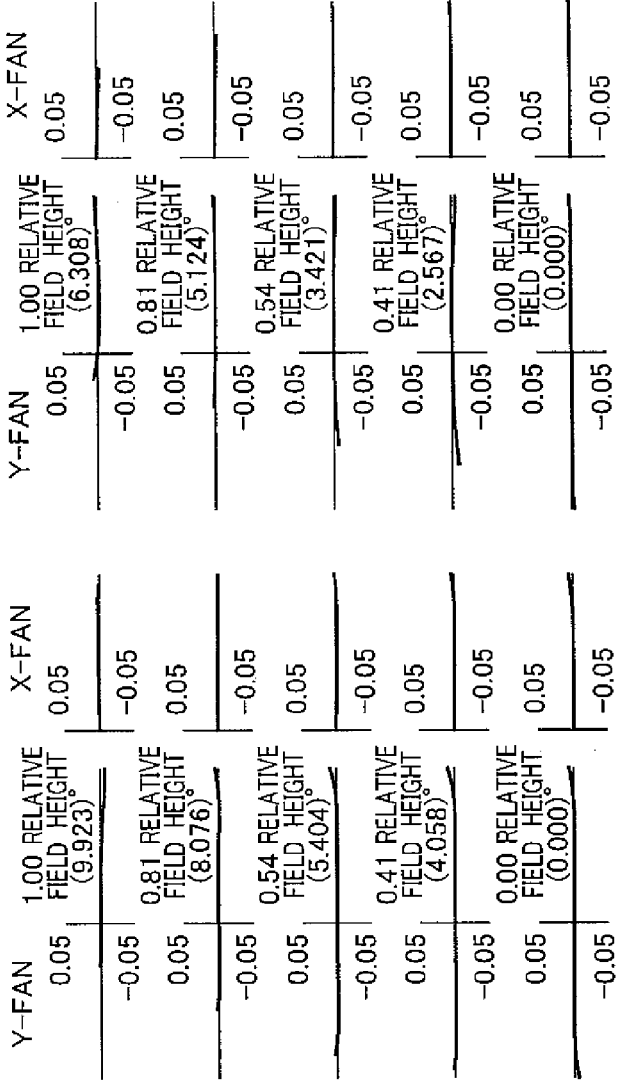
FIG.15B EXAMPLE 2 (INFINITE, MIDDLE)
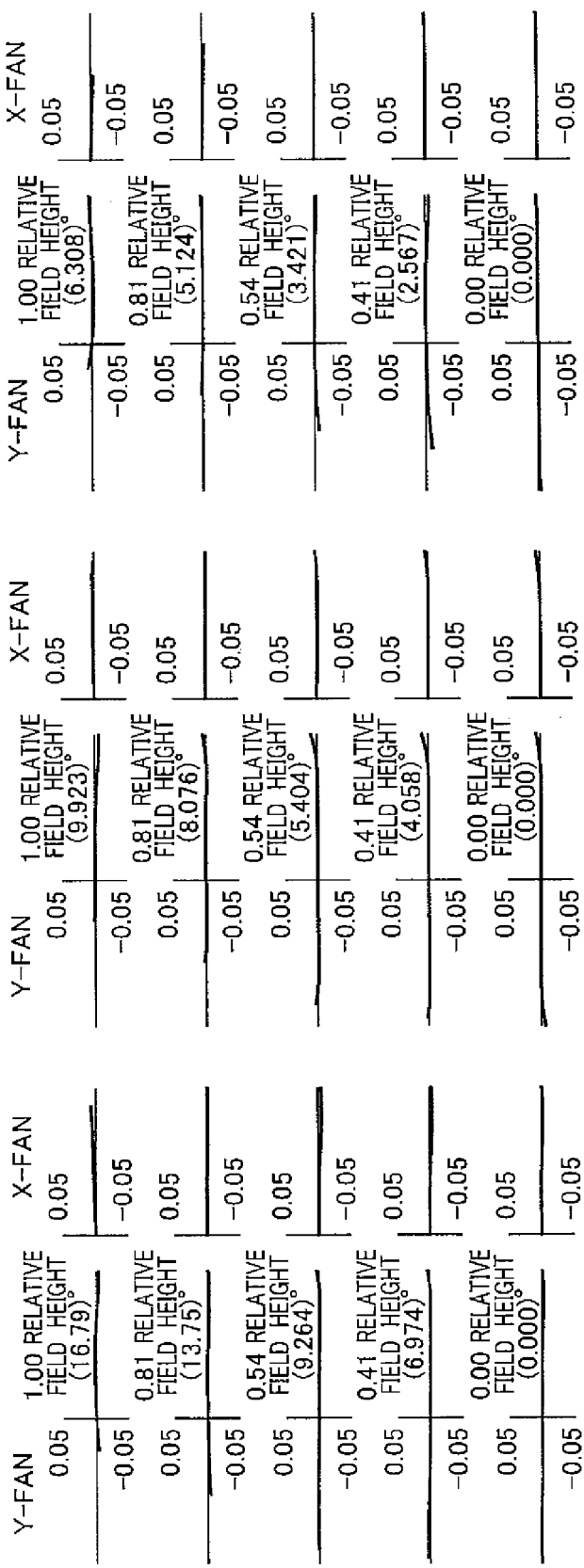
FIG.15C EXAMPLE 2 (INFINITE, TELEPHOTO END)

FIG.16A EXAMPLE 2 (CLOSEST, WIDE ANGLE END)
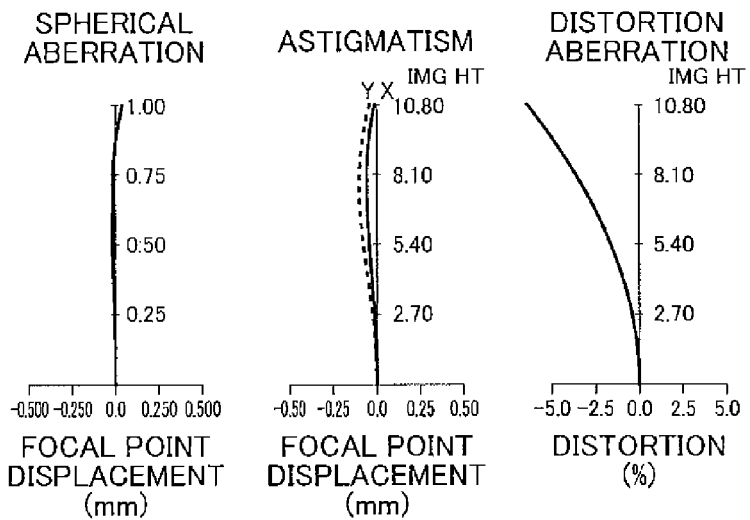
FIG.16B EXAMPLE 2 (CLOSEST, MIDDLE)
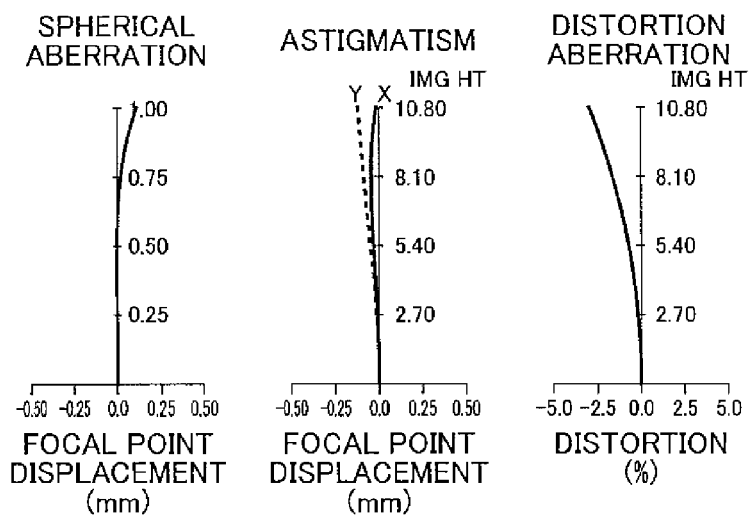
FIG.16C EXAMPLE 2 (CLOSEST, TELEPHOTO END)
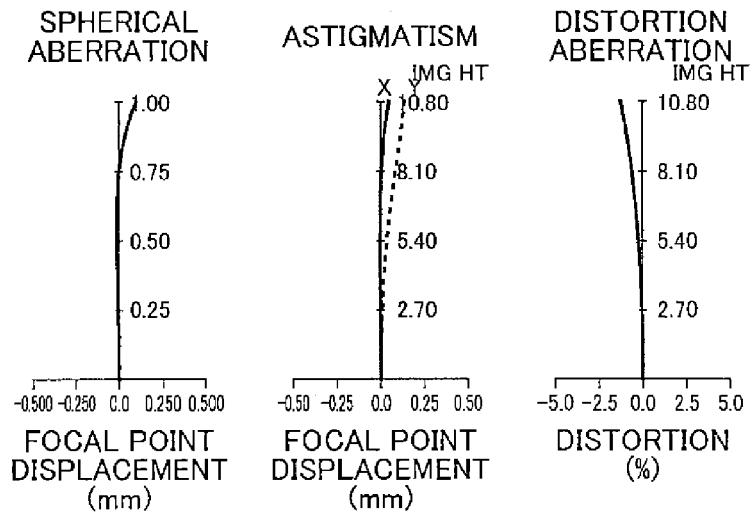

EXAMPLE 2
(CLOSEST, WIDE ANGLE END)

EXAMPLE 2
(CLOSEST, MIDDLE)

EXAMPLE 2
(CLOSEST, TELEPHOTO END)

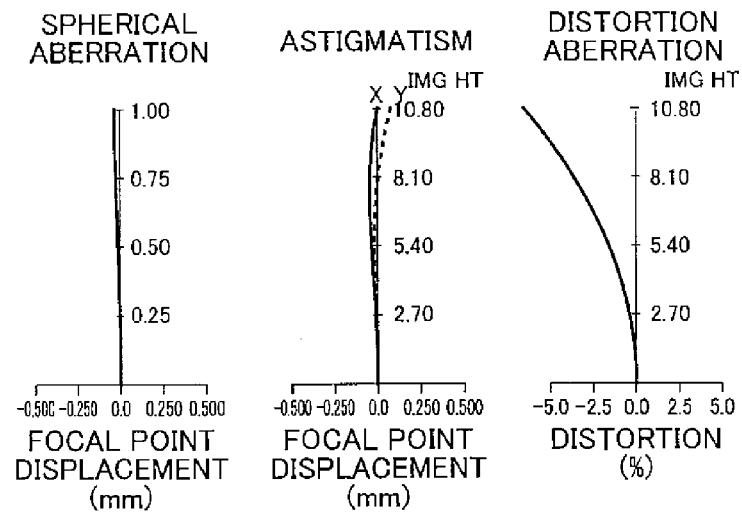
FIG.18A EXAMPLE 3 (INFINITE, WIDE ANGLE END)
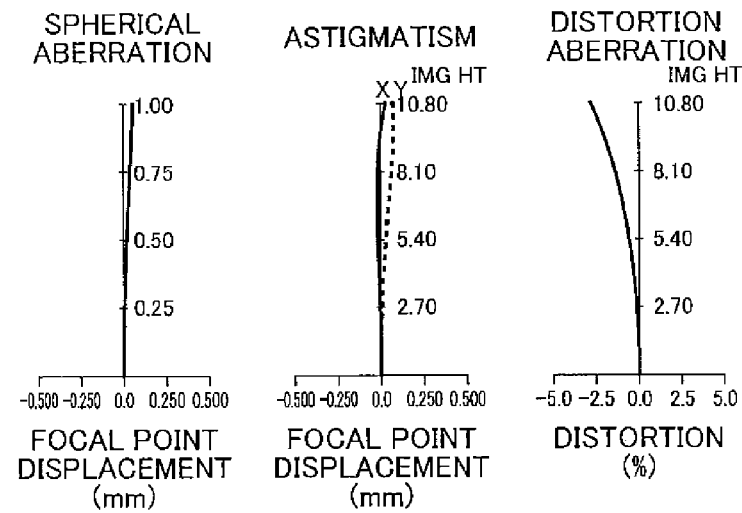
FIG.18B EXAMPLE 3 (INFINITE, MIDDLE)
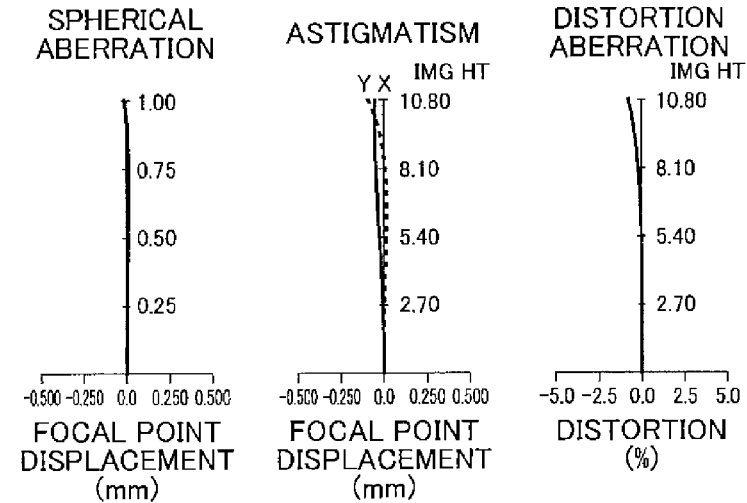
FIG.18C EXAMPLE 3 (INFINITE, TELEPHOTO END)

EXAMPLE 3
(INFINITE, WIDE ANGLE END)

EXAMPLE 3
(INFINITE, MIDDLE)

EXAMPLE 3
(INFINITE, TELEPHOTO END)

FIG.20A EXAMPLE 3 (CLOSEST, WIDE ANGLE END)
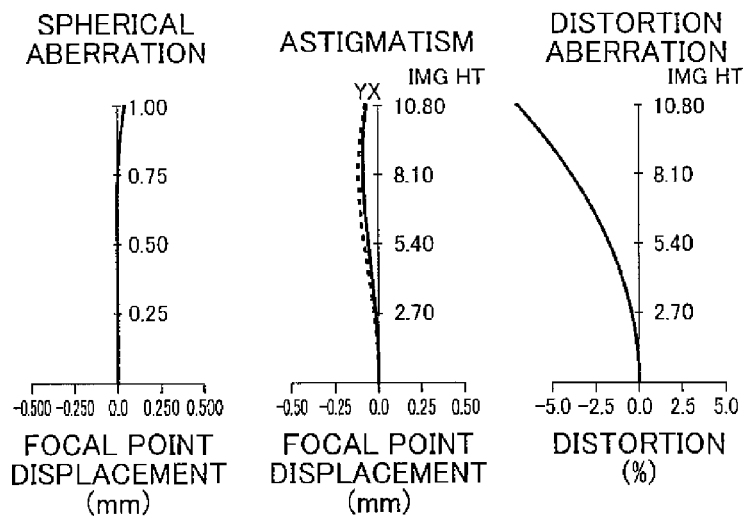
FIG.20B EXAMPLE 3 (CLOSEST, MIDDLE)
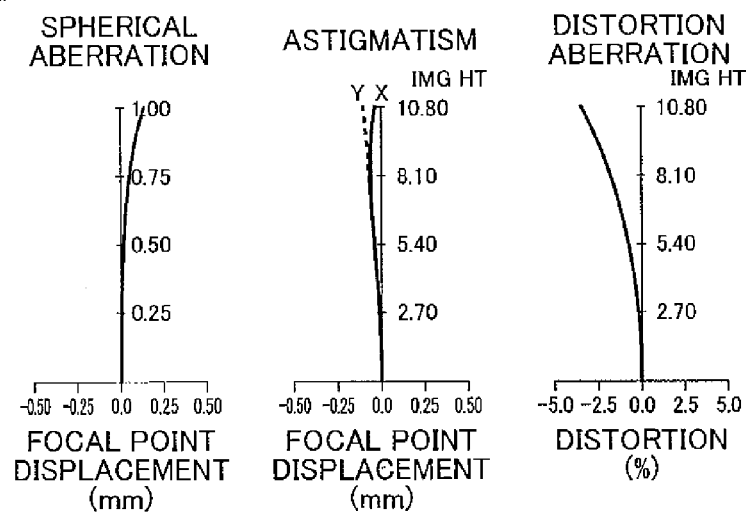
FIG.20C EXAMPLE 3 (CLOSEST, TELEPHOTO END)
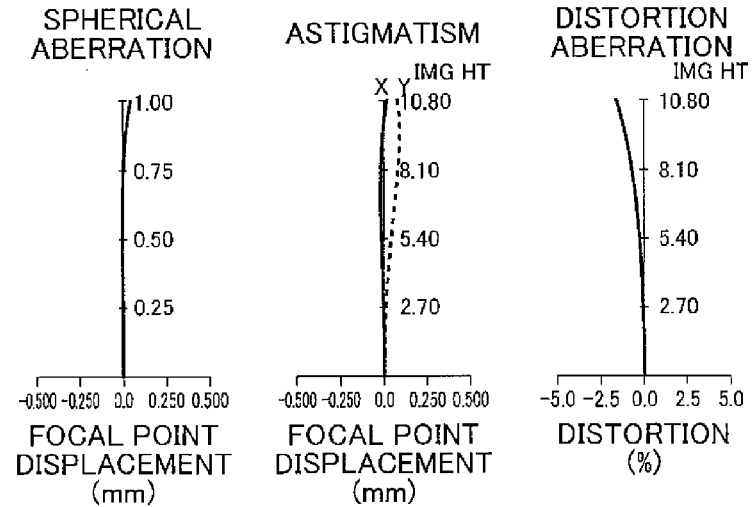

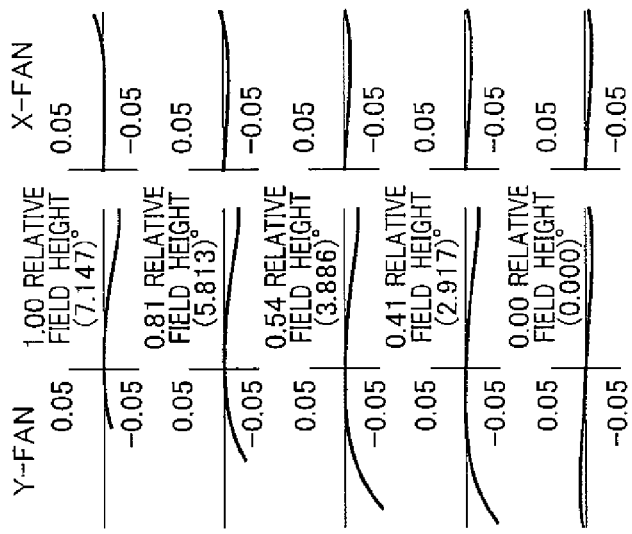
FIG.21A EXAMPLE 3 (CLOSEST, WIDE ANGLE END)
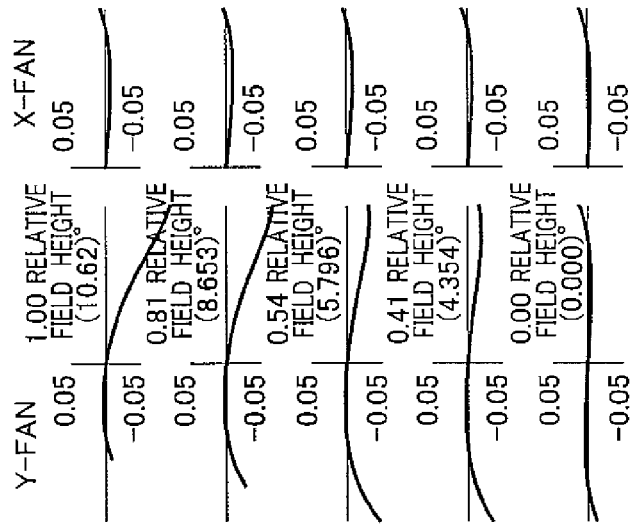
FIG.21B EXAMPLE 3 (CLOSEST, MIDDLE)
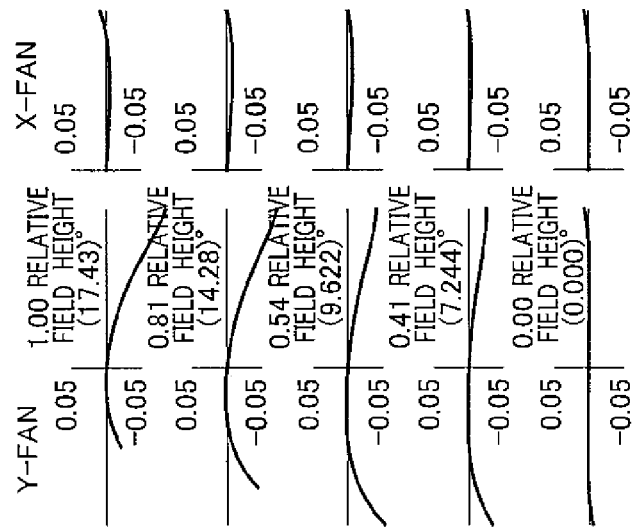
FIG.21C EXAMPLE 3 (CLOSEST, TELEPHOTO END)

FIG.22A EXAMPLE 4 (INFINITE, WIDE ANGLE END)
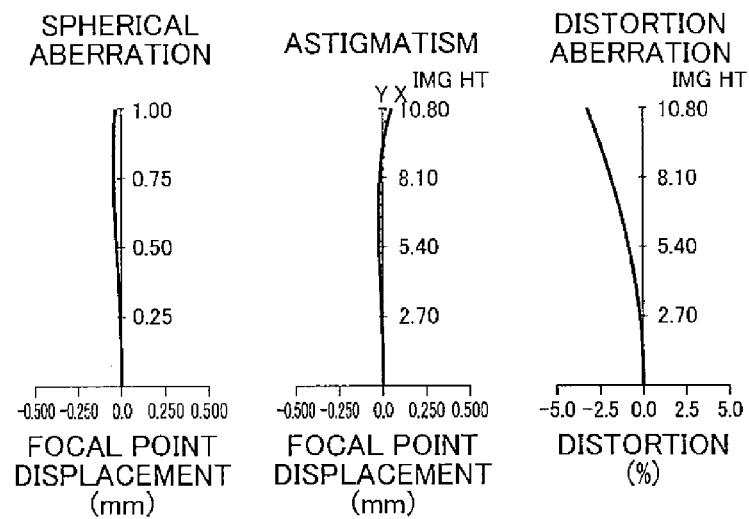
FIG.22B EXAMPLE 4 (INFINITE, MIDDLE)
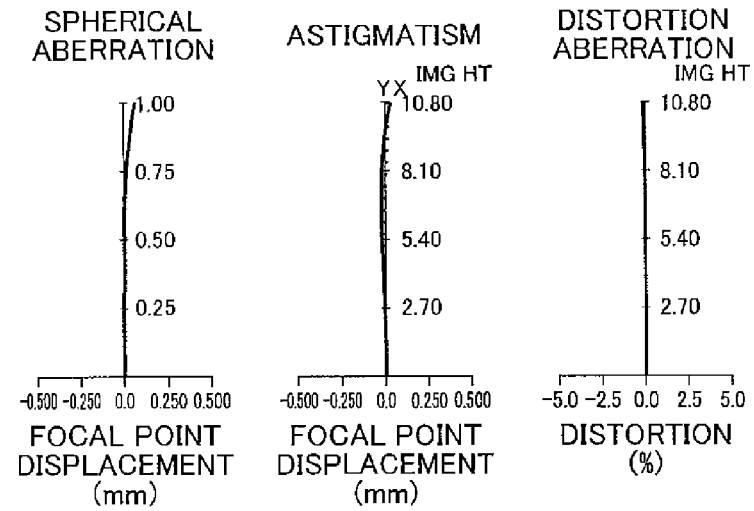
FIG.22C EXAMPLE 4 (INFINITE, TELEPHOTO END)
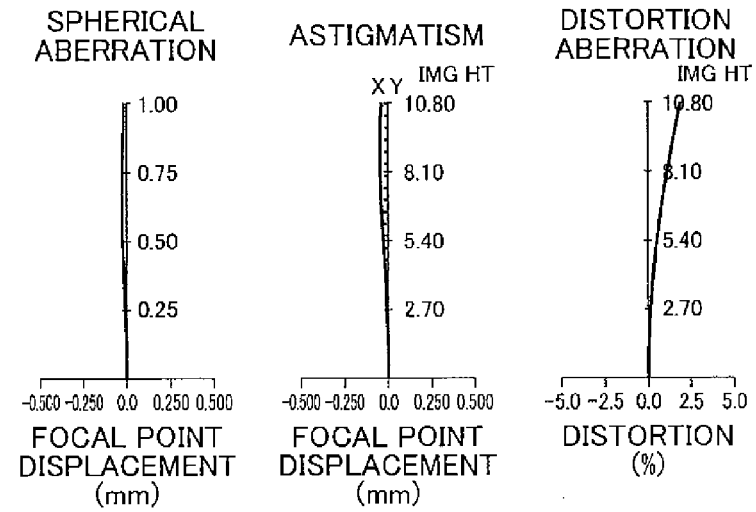

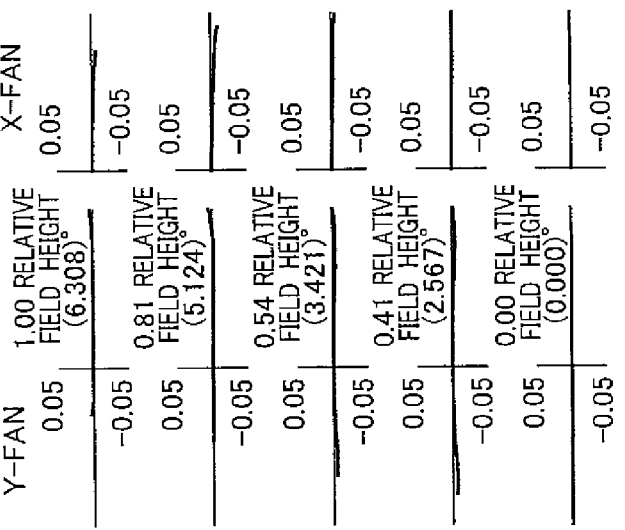
FIG.23A EXAMPLE 4 (INFINITE, WIDE ANGLE END)
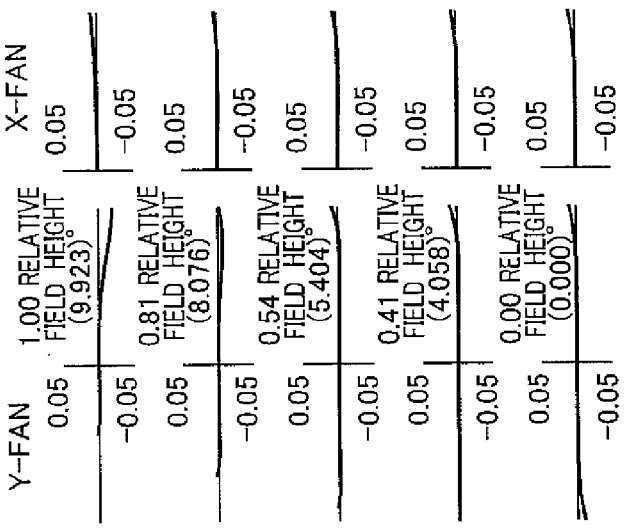
FIG.23B EXAMPLE 4 (INFINITE, MIDDLE)
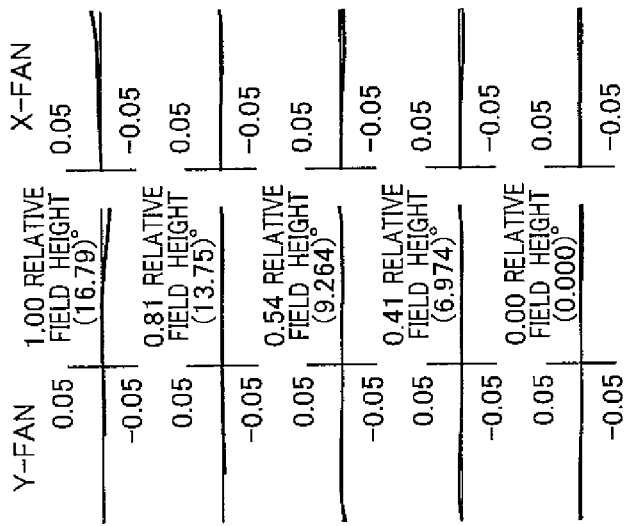
FIG.23C EXAMPLE 4 (INFINITE, TELEPHOTO END)

FIG.24A  EXAMPLE 4 (CLOSEST, WIDE ANGLE END)
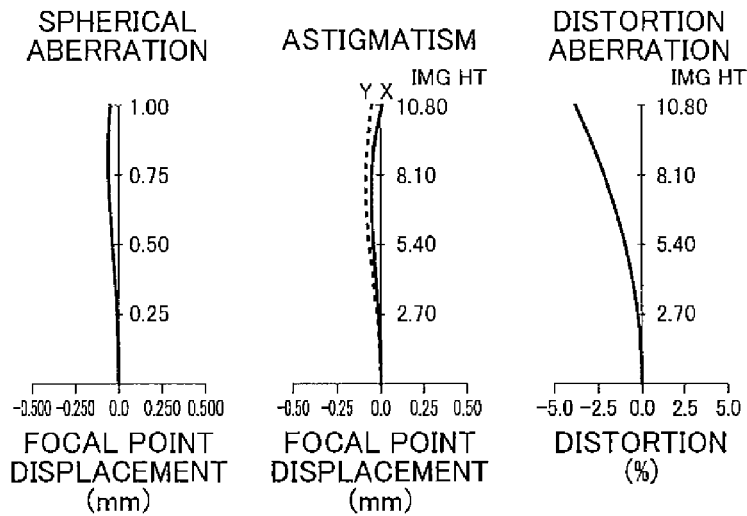
FIG.24B  EXAMPLE 4 (CLOSEST, MIDDLE)
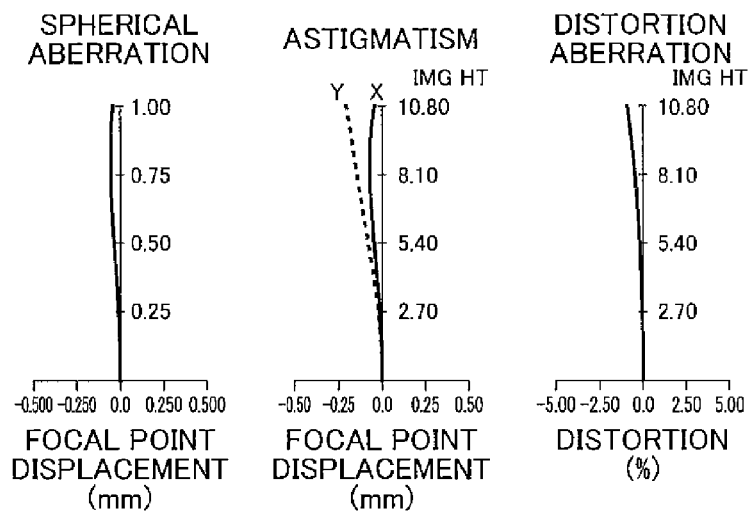
FIG.24C  EXAMPLE 4 (CLOSEST, TELEPHOTO END)
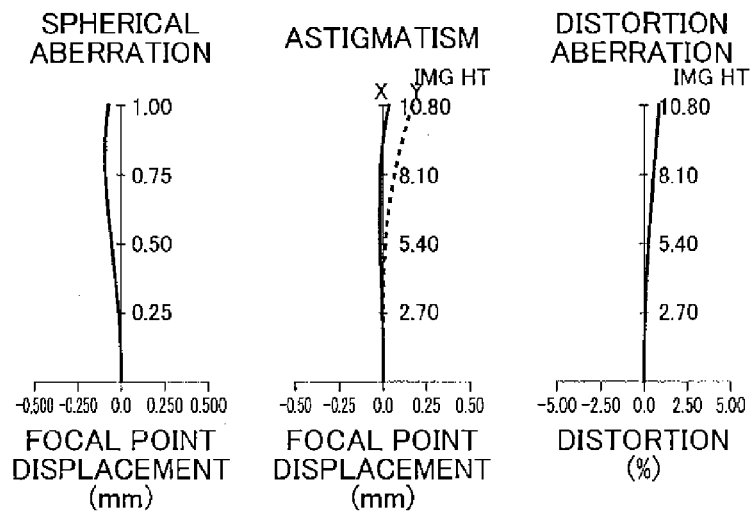

EXAMPLE 4
(CLOSEST, WIDE ANGLE END)

EXAMPLE 4
(CLOSEST, MIDDLE)

EXAMPLE 4
(CLOSEST, TELEPHOTO END)

FIG.26A EXAMPLE 5 (INFINITE, WIDE ANGLE END)
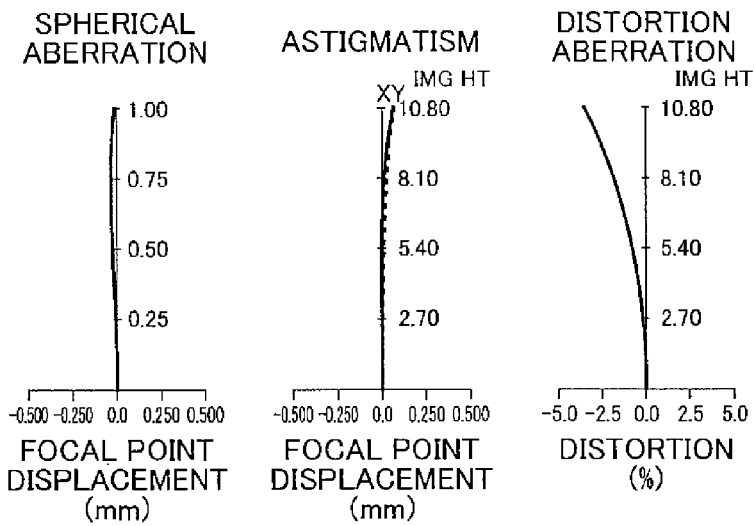
FIG.26B EXAMPLE 5 (INFINITE, MIDDLE)
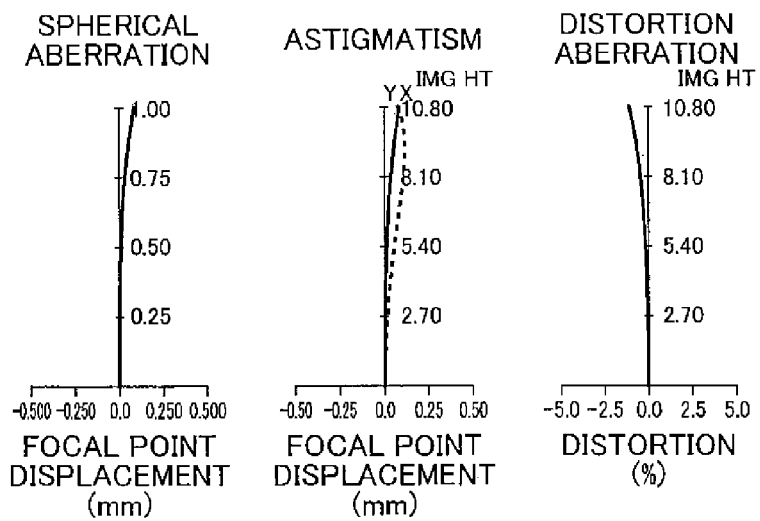
FIG.26C EXAMPLE 5 (INFINITE, TELEPHOTO END)
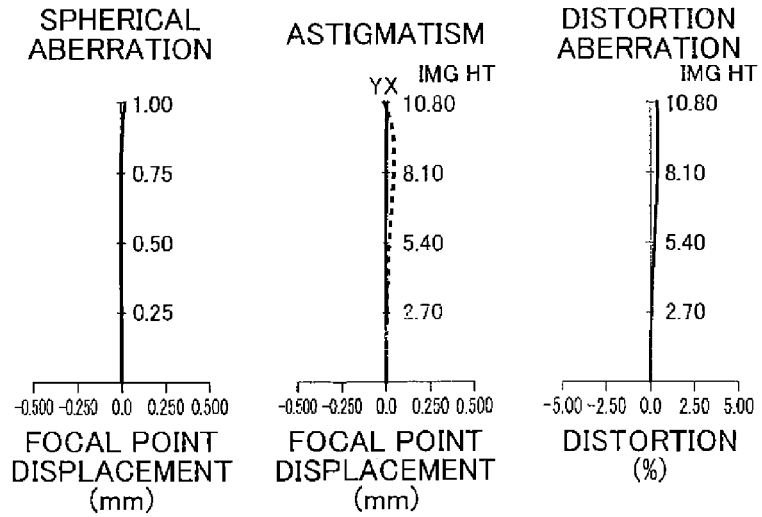

FIG.27A
EXAMPLE 5
(INFINITE, WIDE ANGLE END)

FIG.27B
EXAMPLE 5
(INFINITE, MIDDLE)

FIG.27C
EXAMPLE 5
(INFINITE, TELEPHOTO END)

FIG.28A EXAMPLE 5 (CLOSEST, WIDE ANGLE END)
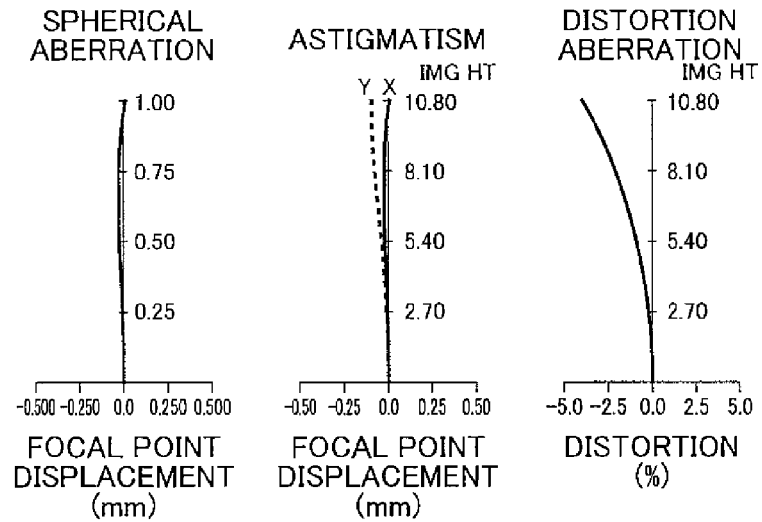
FIG.28B EXAMPLE 5 (CLOSEST, MIDDLE)
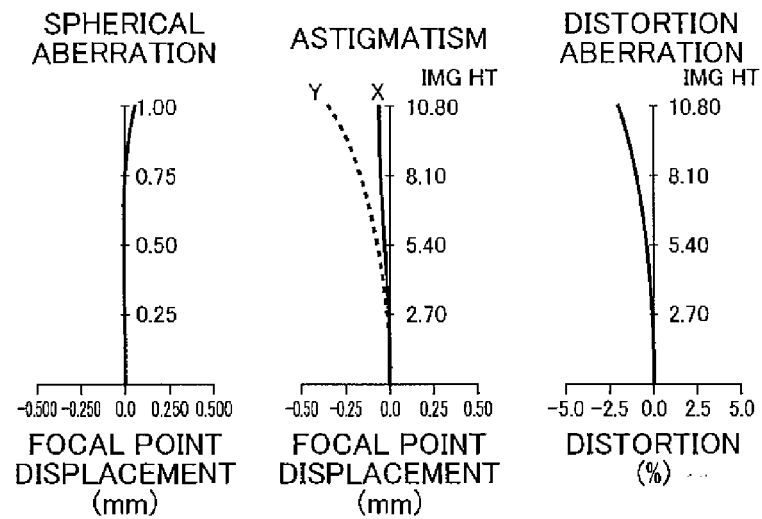
FIG.28C EXAMPLE 5 (CLOSEST, TELEPHOTO END)
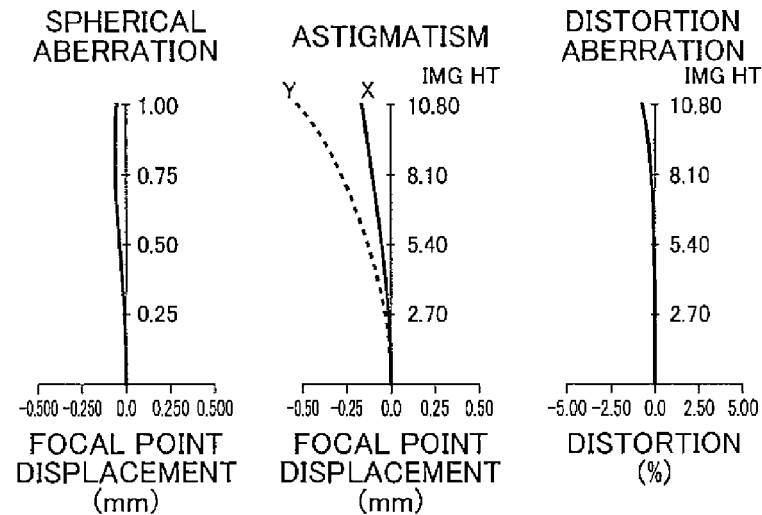

EXAMPLE 5
(CLOSEST, WIDE ANGLE END)

EXAMPLE 5
(CLOSEST, MIDDLE)

EXAMPLE 5
(CLOSEST, TELEPHOTO END)

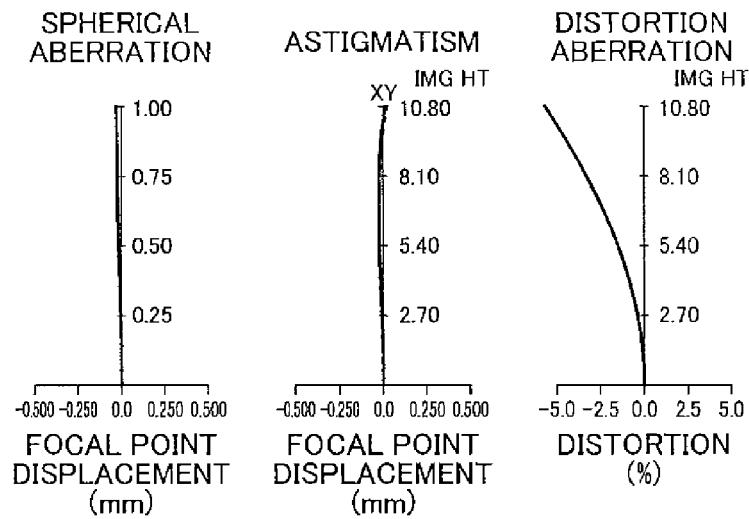
FIG.30A EXAMPLE 6 (INFINITE, WIDE ANGLE END)
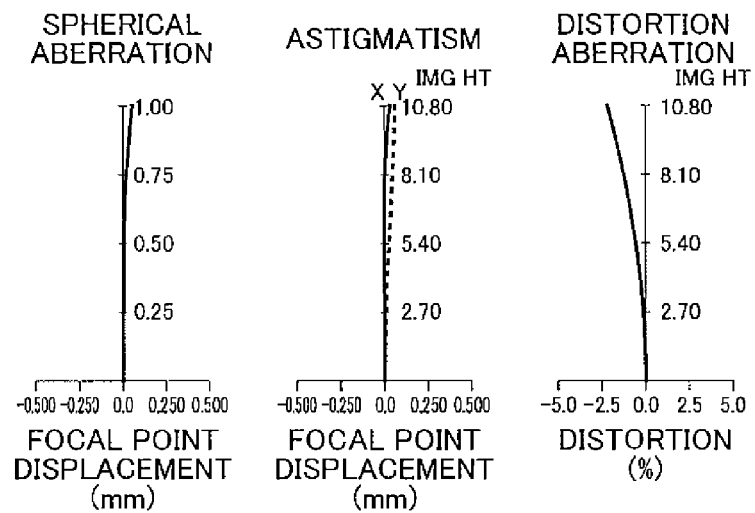
FIG.30B EXAMPLE 6 (INFINITE, MIDDLE)
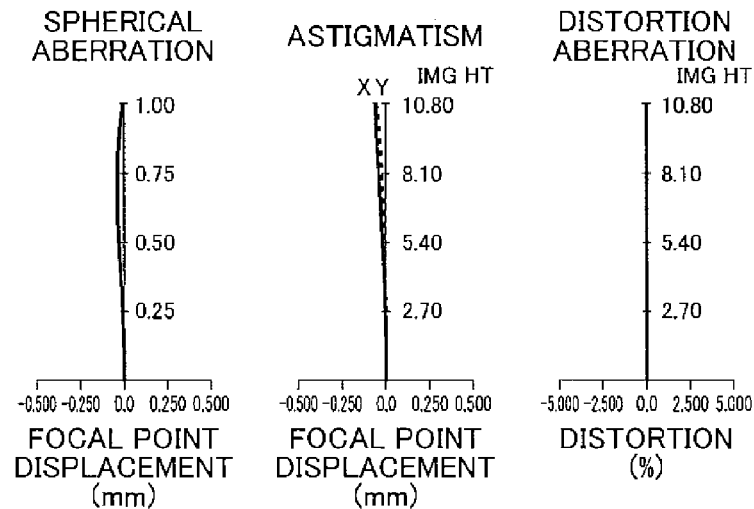
FIG.30C EXAMPLE 6 (INFINITE, TELEPHOTO END)

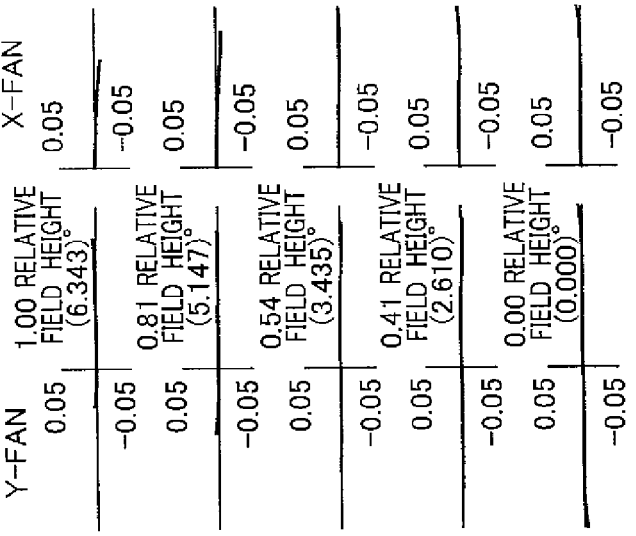
FIG.31A EXAMPLE 6 (INFINITE, WIDE ANGLE END)
FIG.31B EXAMPLE 6 (INFINITE, MIDDLE)
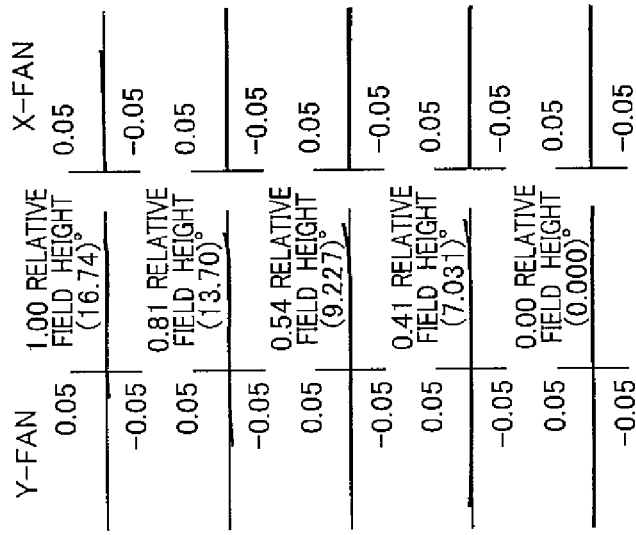
FIG.31C EXAMPLE 6 (INFINITE, TELEPHOTO END)

FIG.32A EXAMPLE 6 (CLOSEST, WIDE ANGLE END)
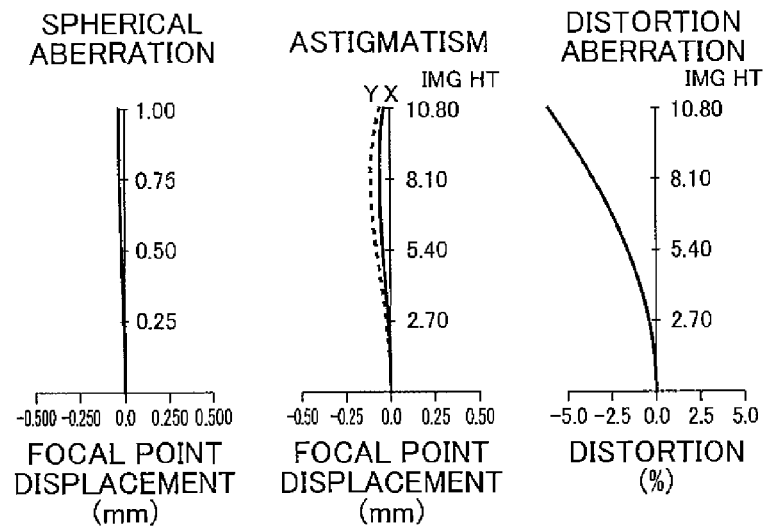
FIG.32B EXAMPLE 6 (CLOSEST, MIDDLE)
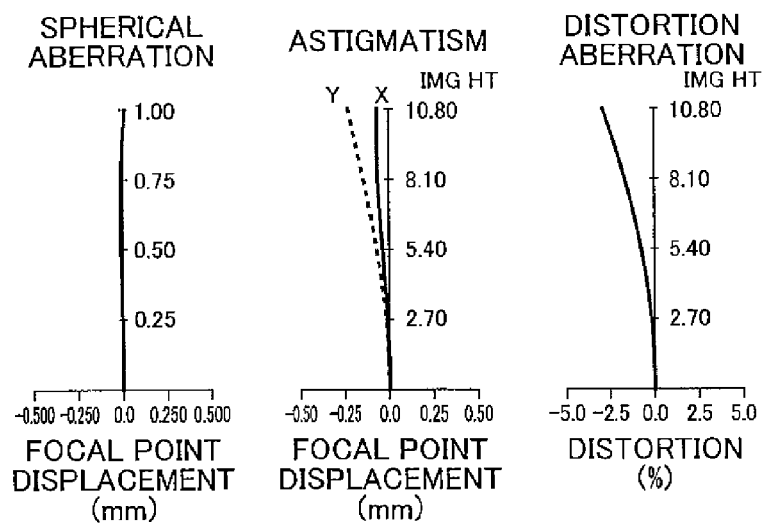
FIG.32C EXAMPLE 6 (CLOSEST, TELEPHOTO END)
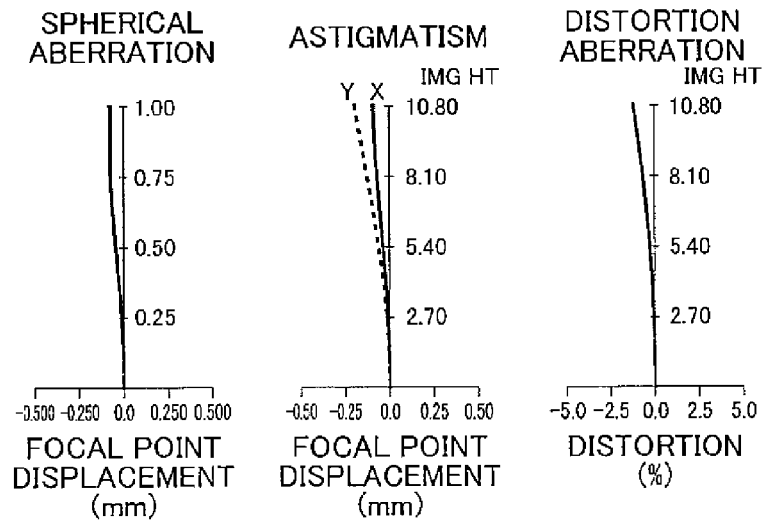

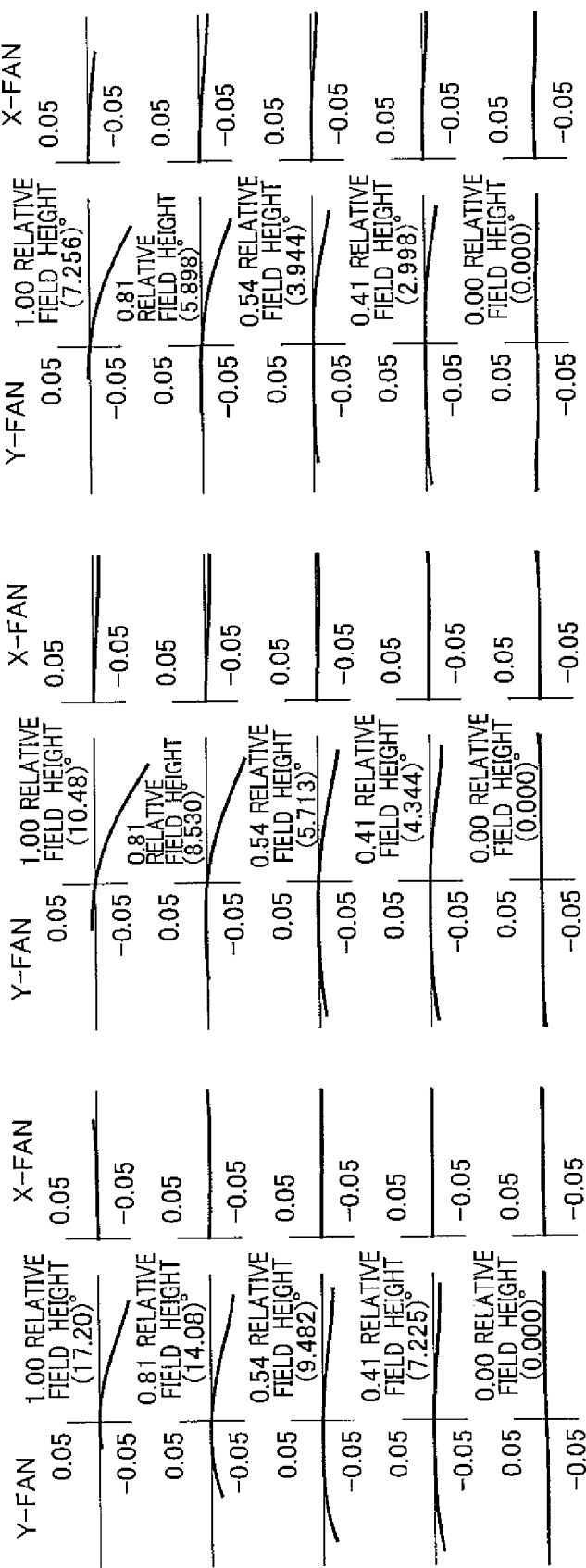

US 8,947,791 B2

LARGE APERTURE ZOOM OPTICAL SYSTEM AND IMAGE PICKUP APPARATUS

BACKGROUND OF THE INVENTION

1. Field of the Invention

The present invention relates to a zoom optical system, and more particularly to a large aperture zoom optical system and to an image pickup apparatus incorporated with the large aperture zoom optical system.

2. Description of the Background Art

A variety of types of large aperture zoom optical systems have been developed and proposed. Typically, there are known zoom optical systems (zoom lens units) as disclosed in patent literatures 1 to 3.

The zoom lens unit disclosed in patent literature 1 is provided with a first lens group having a positive refractive power, a second lens group having a negative refractive power, a third lens group having a positive refractive power, and a fourth lens group having a positive refractive power successively from the object side. The fourth lens, group has a front group having a positive refractive power, and a rear group having a positive refractive power. At the time of zooming from a wide angle end to a telephoto end, the interval between the first lens group and the second lens group increases, and the interval between the second lens group and the third lens group and the interval between the third lens group and the fourth lens group non-linearly change. The zoom lens unit is provided with a displacement member for preventing vibrations by moving the front group of the fourth lens group in a direction substantially orthogonal to the optical axis.

The zoom lens unit disclosed in patent literature 2 is provided with four lens groups i.e. a first group having a positive refractive power, a second group having a negative refractive power for zooming, a third group having a positive refractive power for correcting an image plane which changes as the magnification is varied, and a fixed fourth group having a positive refractive power successively from the object side. The first group has a first sub group having a positive refractive power, and a second sub group which has a negative refractive power and is moved along the optical axis for focusing. The second sub group has a positive lens element 12P convex toward the image side and a biconcave negative lens element 12N.

The large aperture ratio inner focus type telephoto zoom lens unit disclosed in patent literature 3 is provided with a first lens group G1 having a positive refractive power, a second lens group G2 having a negative refractive power, a third lens group G3 having a positive refractive power, and a fourth lens group G4 having a positive refractive power successively from the object side. The second lens group G2 and the third lens group G3 are moved along the optical axis for zooming. The first lens group G1 is composed of a front group G1F having a positive refractive power, and a rear group G1R having a positive refractive power stronger than that of the front group G1F successively from the object side. The rear group G1R in the first lens group G1 is composed of a meniscus negative lens element convex toward the object side, and a positive lens component successively from the object side. The rear group G1R in the first lens group G1 is moved along the optical axis for focusing. The zoom lens unit disclosed in patent literature 3 meets the following conditional expression:

$$0.005 < f1R/(f1F*D1) < 0.055$$

where f1F: a focal length of the front group G1F in the first lens group G1;

f1R: a focal length of the rear group G1R in the first lens group G1; and

D1: a distance along the optical axis between a lens surface of the front group G1F, closest to the image side, and a lens surface of the rear group G1R, closest to the object side when the lens unit is in the infinity in-focus state.

The aforementioned typical zoom optical systems (zoom lens units) have positive-negative-positive-positive four lens group arrangement, or a five lens group arrangement if the divided groups are counted individually. At the time of zooming, the first group and a group closest to the image side are fixed, and at the time of focusing, the first group and an image-side subgroup (e.g. the second sub group) obtained by dividing the first group into two are moved in the optical axis direction for focusing.

Recently, digital cameras have been generally used as a camera (image pickup apparatus), in place of so-called silver-halide cameras (film cameras). Further, in such digital cameras, moving image photographing is enabled, in addition to still image photographing by auto-focusing. In the moving image photographing, normally, sounds such as voices are simultaneously recorded, as well as images. In view of this, it is required to suppress the sounds such as operation sounds caused by a camera or an imaging lens (imaging optical system) as much as possible. Generally, sounds caused by an imaging lens are operation sounds caused by an actuator, which is used for focusing or camera shake correction. It is necessary to suppress these operation sounds of the actuator as much as possible. Therefore, it is essentially important to reduce the load of an actuator for suppressing the sounds by reducing the operation sounds of the actuator. Thus, there is a demand for reducing the weight of an optical system which is required to move at the time of focusing.

The zoom lens units disclosed in patent literatures 1 to 3 are constructed in such a manner that an optical system which is moved at the time of focusing is composed of plural lens elements. Therefore, the zoom lens units disclosed in patent literatures 1 to 3 are technically insufficient in the above aspect.

In addition to the above, generally, the total length of a zoom optical system is relatively long, which is not suitable for carrying. Thus, there is also a demand for miniaturization.

Patent Literature 1: JP Hei 02-244110A
Patent Literature 2: JP Hei 07-092431A
Patent Literature 3: JP 2000-019398A

SUMMARY OF THE INVENTION

In view of the above, an object of the invention is to provide a miniaturized large aperture zoom optical system with a reduced weight of an optical system which is moved at the time of focusing, and an image pickup apparatus incorporated with the large aperture zoom optical system.

A large aperture zoom optical system and an image pickup apparatus of the invention have a five-lens-group arrangement of positive-negative-positive-negative-positive refractive powers. At the time of zooming, the fifth lens group is fixed, and at least the second lens group, the third lens group and the fourth lens group are moved. The third lens group for use in focusing is composed of a single lens element. The large aperture zoom optical system and the image pickup apparatus thus constructed are advantageous in reducing the weight of the optical system to be moved for focusing, while attaining miniaturization.

These and other objects, features and advantages of the present invention will become more apparent upon reading the following detailed description along with the accompanying drawings.

BRIEF DESCRIPTION OF THE DRAWINGS

FIGS. 1A and 1B are lens sectional views diagrammatically showing a construction of a zoom optical system embodying the invention.

FIGS. 4A and 4B are sectional views showing an arrangement of lens groups in a zoom optical system as a first example.

FIGS. 5A and 5B are sectional views showing an arrangement of lens groups in a zoom optical system as a second example.

FIGS. 6A and 6B are sectional views showing an arrangement of lens groups in a zoom optical system as a third example.

FIGS. 7A and 7B are sectional views showing an arrangement of lens groups in a zoom optical system as a fourth example.

FIGS. 8A and 8B are sectional views showing an arrangement of lens groups in a zoom optical system as a fifth example.

FIGS. 9A and 9B are sectional views showing an arrangement of lens groups in a zoom optical system as a sixth example.

FIGS. 10A, 10B, 10C are aberration diagrams of the zoom optical system as the first example at an infinite distance.

Figures 11A, 11B, 11C:
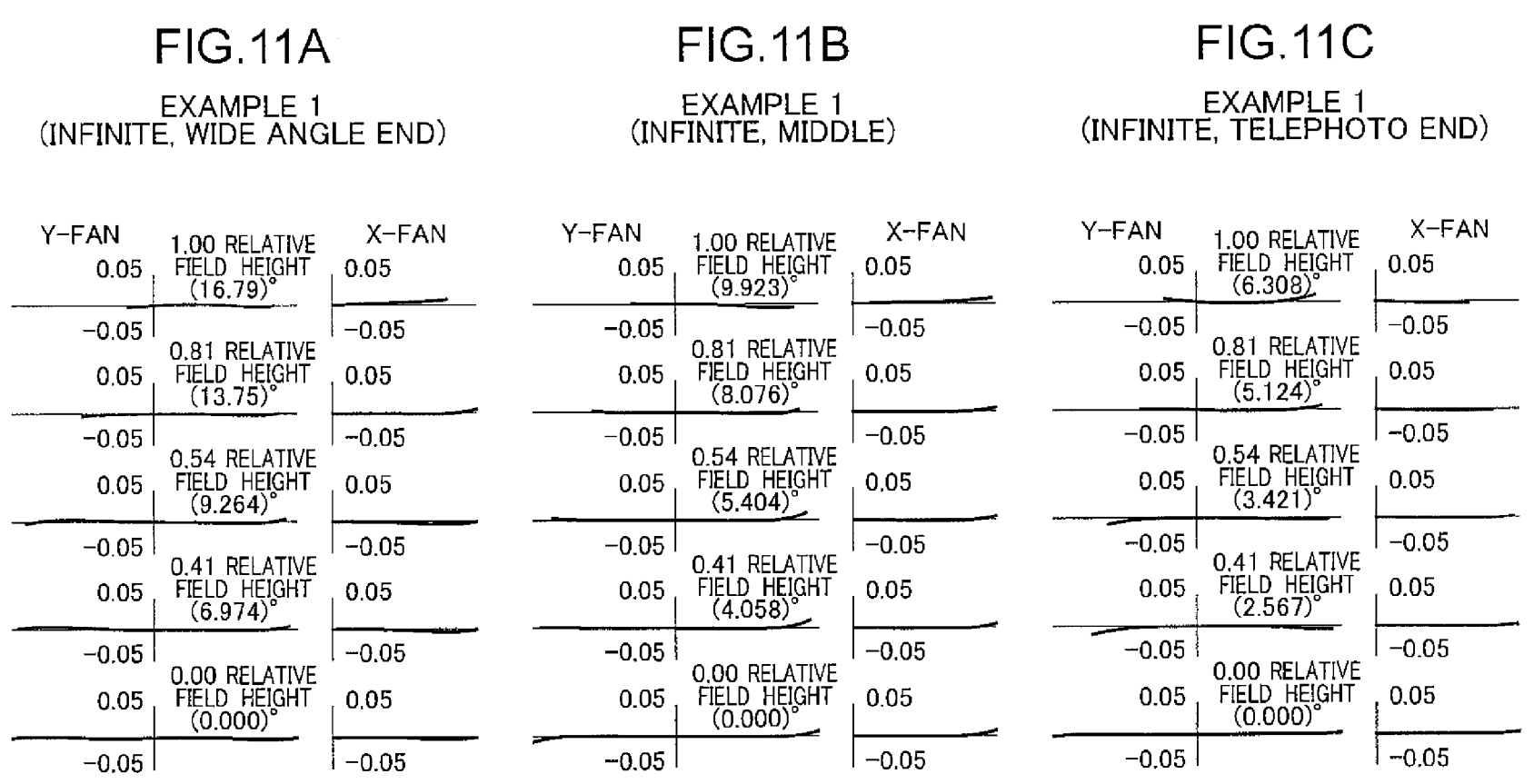

FIGS. 11A, 11B, 11C are lateral aberration diagrams of the zoom optical system as the first example at an infinite distance.

FIGS. 12A, 12B, 12C are aberration diagrams of the zoom optical system as the first example at a closest distance.

FIGS. 13A, 13B, 13C are lateral aberration diagrams of the zoom optical system as the first example at a closest distance.

FIGS. 14A, 14B, 14C are aberration diagrams of the zoom optical system as the second example at an infinite distance.

FIGS. 15A, 15B, 15C are lateral aberration diagrams of the zoom optical system as the second example at an infinite distance.

FIGS. 16A, 16B, 16C are aberration diagrams of the zoom optical system as the second example at a closest distance.

FIGS. 18A, 18B, 18C are aberration diagrams of the zoom optical system as the third example at an infinite distance.

FIGS. 20A, 20B, 20C are aberration diagrams of the zoom optical system as the third example at a closest distance.

FIGS. 21A, 21B, 21C are lateral aberration diagrams of the zoom optical system as the third example at a closest distance.

FIGS. 22A, 22B, 22C are aberration diagrams of the zoom optical system as the fourth example at an infinite distance.

FIGS. 23A, 23B, 23C are lateral aberration diagrams of the zoom optical system as the fourth example at an infinite distance.

FIGS. 24A, 24B, 24C are aberration diagrams of the zoom optical system as the fourth example at a closest distance.

FIGS. 26A, 26B, 26C are aberration diagrams of the zoom optical system as the fifth example at an infinite distance.

FIGS. 27A, 27B, 27C are lateral aberration diagrams of the zoom optical system as the fifth example at an infinite distance.

FIGS. 28A, 28B, 28C are aberration diagrams of the zoom optical system as the fifth example at a closest distance.

FIGS. 30A, 30B, 30C are aberration diagrams of the zoom optical system as the sixth example at an infinite distance.

FIGS. 31A, 31B, 31C are lateral aberration diagrams of the zoom optical system as the sixth example at an infinite distance.

FIGS. 32A, 32A, 32C are aberration diagrams of the zoom optical system as the sixth example at a closest distance.

FIGS. 33A, 33B, 33C are lateral aberration diagrams of the zoom optical system as the sixth example at a closest distance.

DETAILED DESCRIPTION OF THE PREFERRED EMBODIMENTS

Figure 2:
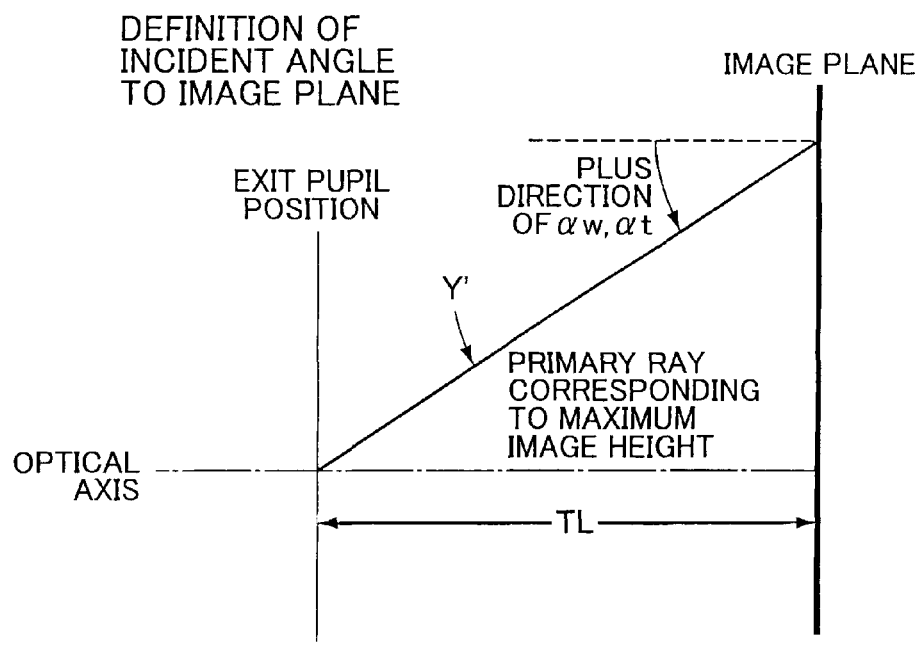
FIG. 2 is a schematic diagram showing a definition of an incident angle of a principal ray on an image plane.

Hereinafter, an embodiment of the invention is described referring to the drawings. Constructions identified by the same reference numerals in the drawings are the same constructions and not repeatedly described unless necessary. Further, in the specification, in the case where the elements are generically referred to, the elements are indicated with reference numerals without suffixes, and in the case where the elements are individually referred to, the elements are indicated with reference numerals with suffixes.

The terms used in the following description are defined as follows in this specification.

(a) A refractive index is the one for a wavelength (587.56 nm) of a d-line.

(b) An Abbe number is an Abbe number νd obtained by the following definitional equation:

$$\nu d = (nd-1)/(nF-nC)$$

where nd: a refractive index for the d-line, nF: a refractive index for an F-line (wavelength: 486.13 nm), nC: a refractive index for a C-line (wavelength: 656.28 nm), and νd: an Abbe number.

(c) Expressions such as "concave", "convex" and "meniscus" used to describe lens elements indicate the lens shapes near an optical axis (near the center of a lens element).

(d) Refractive powers (optical powers, inverses of focal lengths) of single lens elements composing a cemented lens are powers when there is air at the opposite sides of lens surfaces of the single lens elements.

(e) Since a resin material used for a hybrid aspherical lens has only an additional function of a substrate glass material, the hybrid aspherical lens is not handled as a single optical member, but handled similar to the case where the substrate glass material has an aspherical surface, and is considered to be one lens element. A lens refractive index is also considered to be a refractive index of the glass material forming a substrate. The hybrid aspherical lens is a lens formed to have an aspherical surface shape by applying a thin layer of the resin material on the glass material forming the substrate.

(f) The number of lenses in a cemented lens is represented by the number of lens elements composing the cemented lens.

(g) A large aperture zoom optical system means a zoom optical system whose F-number is smaller than 3, specifically, equal to or smaller than $2^{1/2} \times 2$.

(h) Miniaturization in the specification means making a zoom optical system to such a size that the entirety of the zoom optical system meets the following conditional expression:

$$TL/2Y' < 6.0$$

where

TL: a distance on an optical axis from a lens surface closest to an object, and a focal point on the image side at the wide angle end, and 2Y': a length of a diagonal line to an image pickup surface of a solid-state image pickup element, or a length of a diagonal line to a rectangular effective pixel region of the solid-state image pickup element.

Meeting the above conditional expression makes it possible to miniaturize the entirety of the zoom optical system, whereby the entirety of an image pickup apparatus incorporated with the zoom optical system is miniaturized and lightweighted.

<Description of Large Aperture Zoom Optical System>

FIGS. 1A and 1B are lens sectional views diagrammatically showing a construction of a large aperture zoom optical system embodying the invention. FIG. 1A shows the optical system at a wide angle end (WIDE), and FIG. 12, shows the optical system at a telephoto end (TELE). FIG. 2 is a schematic diagram for describing a definition of an incident angle of a principal ray on an image plane. In the following, as shown in FIG. 2, the incident angle of the principal ray on the image plane is the angle α (unit: degree) with respect to normal to the image plane, of the principal ray at a maximum angle of view, out of incident rays onto an image pickup surface, and the incident angle α on the image plane is defined based on the premise that the principal ray angle is in the plus direction in the case where the exit pupil position is located on the object side with respect to the image plane.

Referring to FIGS. 1A and 1B, the large aperture zoom optical system 1 is adapted to form an optical image of an object (subject) on a light receiving surface (image plane) of an image pickup element 18 for converting the optical image into an electrical signal, and includes a first lens group 11 having a positive refractive power, a second lens group 12 having a negative refractive power, a third lens group 13 having a positive refractive power, a fourth lens group 14 having a negative refractive power, and a fifth lens group 15 having a positive refractive power successively from an object side to an image side. The zoom optical system exemplarily illustrated in FIGS. 1A and 1B has the same construction as a large aperture zoom optical system 1A (see FIG. 4) as a first example to be described later.

More specifically, in the example shown in FIGS. 1A and 1B, the first lens group 11 is composed of a positive meniscus lens element 111 convex toward the object side, a positive meniscus lens element 112 convex toward the object side, and a positive meniscus lens element 113 convex toward the object side successively from the object side to the image side. The positive meniscus lens element 111 and the positive meniscus lens element 112 form a cemented lens.

The second lens group 12 is moved from the object side to the image side in such a manner that the refractive power is substantially linearly increased at the time of zooming from the wide angle end to the telephoto end, and is composed of a biconvex positive lens element 121, a biconcave negative lens element 122, a negative meniscus lens element 123 convex toward the object side, a positive meniscus lens element 124 convex toward the object side, and a biconcave negative lens element 125. The positive lens element 121 and the negative lens element 122 form a cemented lens, and the negative meniscus lens element 123 and the positive meniscus lens element 124 form a cemented lens.

The third lens group 13 is moved along a curve convex toward the image side at the time of zooming from the wide angle end to the telephoto end, and is composed of a biconvex positive lens element 131. In other words, the third lens group 13 is composed of the single lens element 131. Focusing is performed by moving the third lens group 13 along the optical axis direction. More specifically, the third lens group 13 is moved to the image side at the time of focusing from an infinite distance object to a closest distance object, whereby focusing is performed.

The fourth lens group 14 is moved from the object side to the image side in such a manner that the refractive power is substantially linearly increased at the time of zooming from the wide angle end to the telephoto end, and is composed of a negative meniscus lens element 141 convex toward the image side. In other words, the fourth lens group 14 is composed of the single lens element 141.

The fifth lens group 15 is fixed at the time of zooming, and is composed of a biconvex positive lens element 151, a biconvex positive lens element 152, a biconcave negative lens element 153, a negative meniscus lens element 154 convex toward the image side, a biconcave negative lens element 155, a biconvex positive lens element 156, a negative meniscus lens element 157 convex toward the image side, and a biconvex positive lens element 158. The positive lens element 152 and the negative lens element 153 form a cemented lens, and the negative meniscus lens element 154 and the negative lens element 155 form a cemented lens.

In the example shown in FIGS. 1A and 1B, the fifth lens group 15 includes a lens group for shake correction. More specifically, in the fifth lens group 15, the positive lens element 151, the positive lens element 152 and the negative lens element 153 form a sub lens group 5a having a positive refractive power; the negative meniscus lens element 154 and the negative lens element 155 form a second sub lens group 5b having a negative refractive power; and the positive lens element 156, the negative meniscus lens element 157 and the positive lens element 158 form a third sub lens group 5c having a positive refractive power. Shake correction is performed by moving the sub lens group 5b in a direction orthogonal to the optical axis AX.

Shake correction is performed by e.g. detecting a shake such as a camera shake by a sensor called as a vibration gyro, and by shifting the second sub lens group 5b in a direction orthogonal to the optical axis in accordance with a shake amount detected by the sensor in such a manner as to cancel the detected shake amount, using a predetermined moving mechanism. Examples of the shake correction by shifting an optical system are disclosed in Japanese Unexamined Patent Publication No. 2007-150996 and Japanese Unexamined Patent Publication No. 2010-136269.

In the large aperture zoom optical system 1, an optical diaphragm ST is disposed on the object side (object side of the positive lens element 151) of the fifth lens group 15. The optical diaphragm ST may be an aperture stop or a mechanical shutter.

A filter 17 and the image pickup element 18 are disposed on the image side of the large aperture zoom optical system 1. The filter 17 is an optical element in the form of a parallel plate, and is diagrammatically represented by various optical filters, a cover glass for the image pickup element, and the like. An optical filter such as a low-pass filter or an infrared cut filter can be disposed, as necessary, depending on the intended use, the constructions of the image pickup element and the camera, etc. The image pickup element 18 is an element for photoelectrically converting an optical image of a object focused by the large aperture zoom optical system 1 into image signals of respective color components of R (red), G (green) and B (blue) in accordance with the light amount of the optical image, and outputting the image signals to a specified image processing circuit (not shown). Thus, the optical image of the object on the object side is introduced to a light receiving surface of the image pickup element 18 at a suitable zoom ratio along the optical axis AX by the large aperture zoom optical system 1, whereby the optical image of the object is picked up by the image pickup element 18.

In the large aperture zoom optical system 1 thus constructed, the third lens group 13 which is moved at the time of focusing is composed of the single lens element 131. This is advantageous in reducing the weight of the large aperture zoom optical system 1. Further, the single lens element 131 which is moved at the time of focusing forms the third lens group 13 in the five lens group arrangement having positive-negative-positive-negative-positive refractive powers. The large aperture zoom optical system 1 thus constructed is advantageous in realizing a desirable optical performance in all the photographing conditions from the wide angle end to the telephoto end, while attaining miniaturization. In other words, a desirable optical performance is maintained in all the photographing conditions from the wide angle end to the telephoto end, and a variation in the optical performance is suppressed to a small value.

Preferably, the large aperture zoom optical system 1 thus constructed may meet the following conditional expression (1).

$$0.2 < (R1+R2)/(R1-R2) < 0.75 \quad (1)$$

where

R1: a curvature radius of an object-side surface of the single lens element 131 in the third lens group 13, and R2: a curvature radius of an image-side surface of the single lens element 131 in the third lens group.

The above conditional expression (1) defines a cross-sectional shape of the single lens element 131 taken along the optical axis AX including the optical axis AX for obtaining a more desirable optical performance even if the object distance (distance to the object) changes with respect to the large aperture zoom optical system 1. In the case where the value of the conditional expression (1) is under the lower limit of the conditional expression (1), the curvature radius R1 of the object-side surface of the single lens element 131 is decreased, and particularly, a large minus spherical aberration occurs in a state that the object distance is short. This lowers the resolution and is not preferable. On the other hand, in the case where the value of the conditional expression (1) is over the upper limit of the conditional expression (1), the curvature radius R1 of the object-side surface of the single lens element 131 on the object side is increased. As a result, flatness of the image plane between the center (near the optical axis) and the periphery is deteriorated, which is also not preferable. This tendency is conspicuous particularly in a state that the object distance is short. In view of the above, causing the single lens element 131 to meet the conditional expression (1) as described above makes it possible to form the third lens group 13 which is moved for focusing, by using a single lens element.

More preferably, the large aperture zoom optical system 1 may meet the following conditional expression (1A) in the aforementioned aspect.

$$0.24 < (R1+R2)/(R1-R2) < 0.70 \quad (1A)$$

Furthermore preferably, the large aperture zoom optical system 1 thus constructed may meet the following conditional expression (2).

$$0.9 < f5/fw < 1.4 \quad (2)$$

where f5: a focal length of the fifth lens group 15, and fw: a focal length of the entire optical system at the wide angle end.

The above conditional expression (2) defines the focal length of the fifth lens group 15, in other words, defines the refractive power of the fifth lens group 15 for reducing the total length of the optical system while keeping a desirable optical performance. In the case where the value of the conditional expression (2) is under the lower limit of the conditional expression (2), the focal length f5 of the fifth lens group 15 is shortened, which increases an off-axial coma aberration. This deteriorates the optical performance, and is not preferable. On the other hand, in the case where the value of the conditional expression (2) is over the upper limit of the conditional expression (2), the focal length f5 of the fifth lens group 15 is lengthened, which increases the total length of the optical system. This makes it difficult to carry the optical system, and is not preferable.

More preferably, the large aperture zoom optical system 1 may meet the following conditional expression (2A) in the aforementioned aspect.

$$0.94 < f5/fw < 1.37 \quad (2A)$$

Furthermore preferably, in the large aperture zoom optical system 1 thus constructed, the fifth lens group 15 may include at least one positive lens element that meets the following conditional expression (3).

$$vd > 80 \quad (3)$$

where vd: the Abbe number of the positive lens element of the fifth lens group 15.

The fifth lens group 15 including the positive lens element whose value of the conditional expression (3) is over the lower limit of the conditional expression (3) can reduce an on-axial chromatic aberration and an off-axial chromatic aberration. Thus, it is possible to provide the large aperture zoom optical system 1 with a more desirable optical performance.

More preferably, the positive lens element in the fifth lens group 15 of the large aperture zoom optical system 1 may meet the following conditional expression (3A) in the aforementioned aspect.

$$vd > 81 \quad (3A)$$

Furthermore preferably, the large aperture zoom optical system 1 having the above configuration may meet the following conditional expression (4).

$$0.68 < f3/f5 < 0.9 \quad (4)$$

where f3: the focal length of the third lens group 13, and f5: the focal length of the fifth lens group 15.

The aforementioned conditional expression (4) defines a load ratio of refractive power between the third lens group 13 and the fifth lens group 15 for realizing a more desirable optical performance regardless of a change in the object distance, while miniaturizing the optical system. In the case where the value of the conditional expression (4) is under the lower limit of the conditional expression (4), the focal length f3 of the third lens group 13 is shortened, which increases a variation in the spherical aberration when the object distance is short. This deteriorates the optical performance, and is not preferable. On the other hand, in the case where the value of the conditional expression (4) is over the upper limit of the conditional expression (4), the focal length f3 of the third lens group 13 is lengthened. As a result, the moving amount of the third lens group 13 as a focusing group is increased when the object distance is short. This may cause interference (collision) between the third lens group 13, and the other lens groups such as the second lens group or the fourth lens group at the time of focusing, and is not preferable.

More preferably, the large aperture zoom optical system 1 may meet the following conditional expression (4A) in the aforementioned aspect.

$$0.73 < f3/f5 < 0.87 \quad (4A)$$

Furthermore preferably, the large aperture zoom optical system 1 thus constructed may meet the following conditional expression (5).

$$1 < f1/f5 < 1.9 \quad (5)$$

where f1: the focal length of the first lens group 11, and
f5: the focal length of the fifth lens group 15.

The above conditional expression (5) defines a load ratio of refractive power between the first lens group 11 and the fifth lens group 15 for realizing a more desirable optical performance, while miniaturizing the optical system. In the case where the value of the conditional expression (5) is under the lower limit of the conditional expression (5), the focal length f1 of the first lens group 11 is shortened, which unduly increases a spherical aberration at the telephoto side. This deteriorates the optical performance at the telephoto side, and is not preferable. On the other hand, in the case where the value of the conditional expression (5) is over the upper limit of the conditional expression (5), the focal length f5 of the fifth lens group 15 is shortened, which is advantageous in miniaturization. However, since a coma aberration or the like of the fifth lens group 15 is increased. This deteriorates the optical performance, and is not preferable in the total aspect, even taking into consideration of the advantage i.e. miniaturization.

More preferably, the large aperture zoom optical system 1 may meet the following conditional expression (5A) in the aforementioned aspect.

$$1.11 < f1/f5 < 1.70 \quad (5A)$$

Furthermore preferably, in the large aperture zoom optical system 1 thus constructed, the fifth lens group 15 may meet the following conditional expression (6).

$$-0.6 < f5b/f5a < -1.2 \quad (6)$$

where f5a: the focal length of the first sub lens group 5a, and
f5b: the focal length of the second sub lens group 5b.

The above conditional expression (6) defines a load ratio of refractive power between the first sub lens group 5a and the second sub lens group 5b for reducing the weight of the second sub lens group 5b for use in shake correction and maintaining the desirable optical performance at the time of shake correction.

As described above, the fifth lens group is composed of the first sub lens group 5a having a positive refractive power, the second sub lens group 5b having a negative refractive power, and the third sub lens group 5c having a positive refractive power. Thus, the fifth lens group 15 has a triplet structure of positive-negative-positive refractive powers. Accordingly, the large aperture zoom optical system 1 thus constructed is advantageous in realizing a desirable optical performance, while suppressing field curvature. According to this construction, the first sub lens group 5a having a positive refractive power is disposed at a front position (on the incident light side) of the second sub lens group 5b for use in shake correction. This reduces the spot diameter of a light flux to be incident into the second sub lens group 5b for use in shake correction. The large aperture zoom optical system 1 thus constructed is advantageous in reducing the weight of the second sub lens group 5b which is moved for shake correction.

In the case where the value of the conditional expression (6) is under the lower limit, the focal length f5b of the second sub lens group 5b for use in shake correction is shortened, which increases a coma aberration at the time of shake correction. This deteriorates the optical performance at the time of shake correction, and is not preferable. On the other hand, in the case where the value of the conditional expression (6) is over the upper limit of the conditional expression (6), the focal length f5b of the second sub lens group 5b for use in shake correction is lengthened. This increases the moving amount of the second sub lens group 5b at the time of shake correction, and causes interference (collision) between the second sub lens group 5b, and the other members such as a lens barrel disposed in the moving direction of the second sub lens group 5b at the time of shake correction, and is not preferable.

Further, in the large aperture zoom optical system 1 thus constructed, cams, a stepping motor and the like, or a piezoelectric actuator may be used to drive the movable lens groups, a shutter (not shown) and the like. In the case of using the piezoelectric actuator, the lens groups can be driven independently, while the volume of the driving device and an increase in power consumption are suppressed. Thus, the image pickup apparatus can be further miniaturized.

In the large aperture zoom optical system 1 thus constructed, the lens elements 111 to 158 of the lens groups 11 to 15 each may be a glass lens element or a resin lens element. Further alternatively, the large aperture zoom optical system 1 may include both of a glass lens element and a resin lens element. In particular, the single lens element 131 of the movable third lens group 13 may be a resin lens element in the aspect of reducing the weight. Reducing the weight as described above is advantageous in moving the lens element for focusing to follow the movement of a object at the time of moving image photographing. Further, in particular, the movable second sub lens group 5b of the fifth lens group 15 may include a resin lens element in the aspect of reducing the weight.

Further, in the case of using a resin lens element, the lens element may be a molded lens element made of a resin material (plastic) containing dispersant particles of 30 nm or smaller as a maximum diameter.

Generally, if fine particles are mixed with a transparent resin material, light is scattered, which lowers the transmittance. Thus, it has been difficult to use such a material as an optical material. However, by setting the size of the fine particles to a value smaller than the wavelength of transmitted light flux, light is not substantially scattered. As temperature rises, the refractive index of the resin material is lowered. Conversely, as temperature rises, the refractive index of inorganic particles is raised. Accordingly, it is possible to generally keep the refractive index unchanged with respect to a temperature change by cancelling out the refractive indexes, taking advantage of such temperature dependencies. More specifically, it is possible to obtain a resin material a refractive index with less temperature dependence by dispersing inorganic particles having a maximum diameter of 30 nm or smaller in the resin material as a base material. For example, fine particles of niobium oxide ($Nb_2O_5$) are dispersed in acrylic resin. In the catadioptric system 1 thus constructed, aback focus deviation of the catadioptric system 1 resulting from an ambient temperature change can be suppressed by using a plastic material containing inorganic fine particle dispersants as the material for at least one lens element.

It is preferable to mold such a plastic lens element containing inorganic fine particles as a dispersant as follows.

A refractive index change with temperature is described as follows. A refractive index change n(T) with temperature is expressed by the following formula (F) by differentiating a refractive index n by temperature T based on the Lorentz-Lorenz formula.

$$n(T)=((n^2+2)\times(n^2-1))/6n\times(-3\alpha+(1/[R])\times(\partial[R]/\partial T))  \quad (F)$$

where α denotes a linear expansion coefficient and [R] denotes a molecular refraction.

In the case of a resin material, contribution of the refractive index to the temperature dependence is generally smaller in the second term than in the first term of the formula F, and can be substantially ignored. For instance, in the case of a PMMA resin, the linear expansion coefficient α is $7\times10^{-5}$, and, if the linear expansion coefficient α is substituted into the formula (F), n (T)=$-12\times10^{-5}$ (/° C.), which substantially coincides with an actual measurement value.

Specifically, the refractive index change n(T) with temperature, which has conventionally been about $-12\times10^{-5}$ (/° C.), is preferably suppressed to below $8\times10^{-5}$ (/° C.) in absolute value, and more preferably suppressed to below $6\times10^{-5}$ (/° C.) in absolute value.

In view of the above, it is preferable to use a resin material containing polyolefin, a resin material containing polycarbonate, or a resin material containing polyester, as such a resin material. The refractive index change n (T) with temperature is about $-11\times10^{-5}$ (/° C.) in the resin material containing polyolefin, about $-14\times10^5$ (/° C.) in the resin material containing polycarbonate, and about $-13\times10^{-5}$ (/° C.) in the resin material containing polyester.

<Description on Image Pickup Apparatus Incorporating Large Aperture Zoom Optical System>

Figure 3:
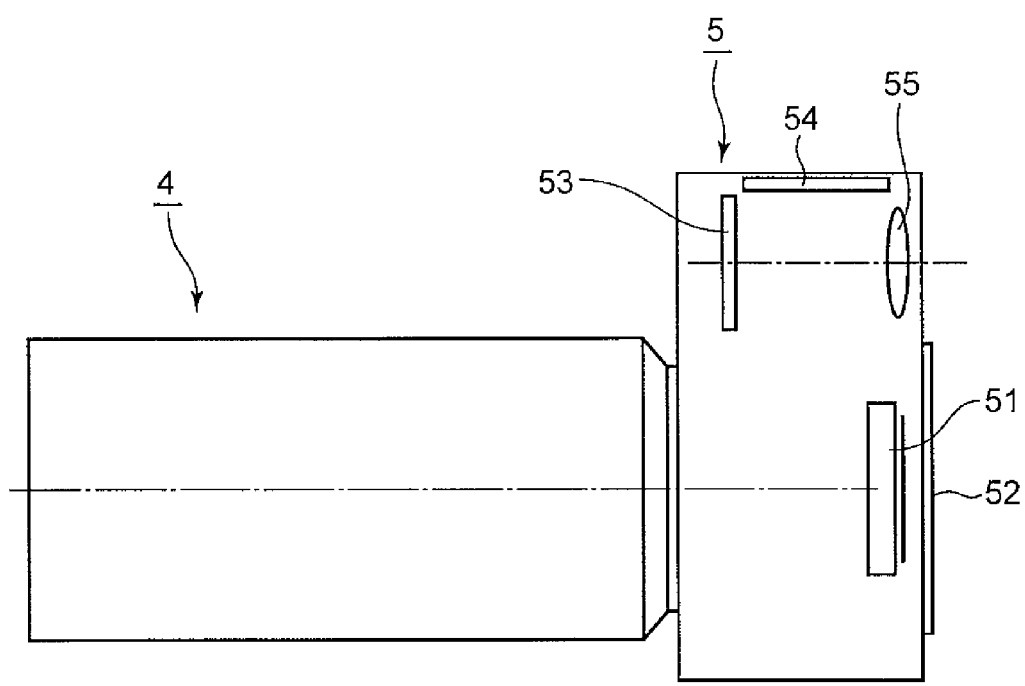
FIG. 3 is a block diagram showing a construction of an image pickup apparatus embodying the invention.

Next, there is described a mirrorless type image pickup apparatus without a reflex mirror, which is incorporated with the aforementioned large aperture zoom optical system 1. In this section, there is described a case where the large aperture zoom optical system 1 is incorporated in a mirrorless type image pickup apparatus. Alternatively, the large aperture zoom optical system 1 may be incorporated in an image pickup apparatus equipped with a reflex mirror. FIG. 3 is a block diagram showing a construction of the image pickup apparatus embodying the invention. Referring to FIG. 3, an image pickup apparatus 3 is provided with an interchangeable lens unit 4 and an apparatus body 5.

The interchangeable lens unit 4 is an optical system detachably attachable to the apparatus body 5. The interchangeable lens unit 4 is provided with the large aperture zoom optical system 1 as shown in FIGS. 1A and 1B, which serves as an imaging lens; an unillustrated lens driving device which drives a focus lens in the optical axis direction for focusing; and an unillustrated moving mechanism which drives a lens group for use in shake correction for performing shake correction.

The apparatus body 5 is provided with an image pickup element 51, a first display device 52, a second display device 53 as a viewfinder, a processing controller 54, and an eyepiece lens 55. Light beams from a object are formed on a light receiving surface of the image pickup element 51 by the large aperture zoom optical system 1 into an optical image of the object.

The image pickup element 51 converts an optical image of the object focused by the large aperture zoom optical system 1 into electrical signals (image signals) of respective color components of R, G and B, and outputs these electrical signals to the processing controller 54 as image signals of the respective colors of R, G and B. The image pickup element 51 is a two-dimensional image sensor such as a CCD (Charge-Coupled Devices) image sensor, or a CMOS (Complementary Metal-Oxide Semiconductor) image sensor. The processing controller 54 controls the image pickup element 51 to perform an image pickup operation such as readout of output signals from the respective pixels in the image pickup element 51 (including horizontal synchronization, vertical synchronization, transfer). The image pickup element 51 performs either one of a still image pickup operation and a moving image pickup operation by the processing controller 54.

The processing controller 54 generates image data on a object image, based on image signals of the respective colors of R, G and B that have been outputted from the image pickup element 51. More specifically, the processing controller 54 performs an amplification processing, a digital conversion processing and the like to analog output signals from the image pickup element 51; and generates image data of the respective pixels from the image signals by performing known image processings such as a determination of a proper black level, a gamma-correction, a white balance adjustment (WB adjustment), an outline correction and a color unevenness correction for the entire image. Further, the processing controller 54 performs a predetermined image processing such as resolution conversion for the image data. The processing controller 54 outputs the processed image data to each of the first display device 52 and the second display device 53. Furthermore, the processing controller 54 controls the entirety of the apparatus body 5. By the control, the apparatus body 5 is controlled to execute at least one of the still image photographing and the moving image photographing of a object. The processing controller 54 is composed of e.g. a microprocessor, a storage element and peripheral circuits.

If necessary, further, the processing controller 54 may be so configured as to correct aberrations, which could not be corrected by the large aperture zoom optical system 1, by performing a known distortion correction processing for correcting a distortion in an optical image of a object formed on the light receiving surface of the image pickup element 51, as necessary. A distortion correction is correcting an image distorted by aberrations into a natural image substantially free from distortion and having a similar shape as a scene seen by the naked eye. By such a construction, even if an optical image of a object introduced to the image pickup element 51 by the large aperture zoom optical system 1 is distorted, a natural image substantially free from distortion can be generated. In a construction for correcting a distortion by an image processing by means of an information processing, only the aberrations other than the distortion have to be considered, wherefore a degree of freedom in the design of the large aperture zoom optical system 1 is increased and an easier design becomes possible.

If necessary, further, the processing controller 54 may also perform a known peripheral illuminance reduction correction processing for correcting a reduction in peripheral illuminance in an optical image of a object formed on the light receiving surface of the image pickup element 51. The peripheral illuminance reduction correction (shading correction) is performed by storing correction data for the peripheral illuminance reduction correction beforehand, and multiplying a photographed image (pixels) by the correction data. Since the reduction in peripheral illuminance mainly occurs due to an incident angle dependence of sensitivity in the image pickup element 51, lens vignetting, cosine fourth law and the like, the correction data is set at such a specified value as to correct an illuminance reduction caused by these factors. By employing such a construction, an image having a sufficient illuminance up to the periphery can be generated even if peripheral illuminance is reduced in an optical image of a object introduced to the image pickup element 51 by the large aperture zoom optical system 1.

In this embodiment, the shading correction may be performed by slightly changing the pitch of the arrangement of a color filter or an on-chip micro-lens array with respect to the pixel pitch on the image pickup surface of the image pickup element 51 in such a manner as to reduce the shading. In such a construction, the color filter or the on-chip micro-lens array is shifted with respect to each pixel, as the image pickup surface of the image pickup element 51 comes close to the periphery of the image pickup surface by slightly changing the pitch as described above. Accordingly, it is possible to efficiently guide a light flux incident in an oblique direction to a light receiving portion of each pixel. This is advantageous in suppressing the shading occurred in the image pickup element 51.

The first display device 52 is disposed on the back surface of the apparatus body 5 for displaying an image of a object based on image data outputted from the processing controller 54. The first display device 52 is an LCD (Liquid Crystal Display), an organic EL display or the like. A so-called liveview image is displayed on the first display device 52.

The second display device 53 is disposed within the apparatus body 5 for displaying an image of a object based on image data outputted from the processing controller 54, and serves as an electronic viewfinder. The second display device 53 is e.g. an LCD (Liquid Crystal Display), an organic EL display or the like. An image displayed on the second display device 53 is viewed through the eyepiece lens 55.

As described above, the image pickup apparatus 3 is loadable with an interchangeable lens unit. Alternatively, the image pickup apparatus 3 may be a one-unit apparatus obtained by integrally combining the apparatus body and an imaging optical system of the large aperture zoom optical system 1. Further alternatively, the second display device 53 and the eyepiece lens 55 may be omitted. Further alternatively, a vibration gyro for detecting shake correction, or a shake correction control device for controlling the unillustrated moving mechanism which performs shake correction by driving the lens group for use in shake correction, based on the detection result, may be incorporated in the interchangeable lens unit 4, or may be incorporated in the apparatus body 5. Further alternatively, the vibration gyro and the shake correction control device may be individually and respectively incorporated in the interchangeable lens unit 4 and the apparatus body 5.

In the still image photographing by the image pickup apparatus 3 thus constructed, the processing controller 54 controls the image pickup apparatus 3 and the apparatus body 5 to perform the still image photographing, and actuates the unillustrated lens driving device for moving the focus lens, whereby focusing is performed. Further, the lens group (the negative lens group composed of the lens element 54 and the lens element 55 in the large aperture zoom optical system 1 in the example shown in FIGS. 1A and 1B) in the large aperture zoom optical system 1 of the interchangeable lens unit 4 also performs shake correction. By the control, a focused optical image is repeatedly and cyclically formed on the light receiving surface of the image pickup element 51, and is converted into image signals of the respective color components of R, G and B. Thereafter, the image signals are outputted to the processing controller 54. Then, after the image signals are subjected to an image processing by the processing controller 54, an image based on the processed image signals is displayed on each of the first display device 52 and the second display device 53. Then, the photographer is allowed to adjust the position of the main object so that the main object is located at an intended position within a screen by referring to the first display device 52, or the second display device 53 through the eyepiece lens 55. When a shutter button (not shown) is depressed in this state, image data is stored in a storage element as a still image memory in the processing controller 54, and a still image is obtained. A zooming operation is performed by the photographer, as necessary.

In the moving image photographing, the processing controller 54 controls the image pickup apparatus 3 and the apparatus body 5 to perform the moving image photographing. Thereafter, the photographer is allowed to adjust the position of the image of the object so that the image of the object is located at an intended position within the screen by referring to the first display device 52, or the second display device 53 through the eyepiece lens 55 in the similar manner as the still image photographing. When the photographer depresses the shutter button (not shown), the moving image photographing is started. Then, at the time of the moving image photographing, the processing controller 54 controls the image pickup apparatus 3 and the apparatus body 5 to perform the moving image photographing, and actuates the unillustrated lens driving device, whereby focusing is performed. Further, the lens group in the large aperture zoom optical system 1 of the interchangeable lens unit 4 also performs shake correction. By the control, a focused optical image is repeatedly and cyclically formed on the light receiving surface of the image pickup element 51, and is converted into image signals of the respective color components of R, G and B. Thereafter, the converted image signals are outputted to the processing controller 54. After the processed image signals are subjected to an image processing by the processing controller 54, an image based on the processed image signals is displayed on each of the first display device 52 and the second display device 53. Then, when the photographer depresses the shutter button (not shown) again, the moving image photographing is ended. The photographed moving image is stored in a storage element as a moving image memory in the processing controller 54, and the moving image is obtained. A zooming operation is performed by the photographer, as necessary.

The image pickup apparatus 3 thus constructed is provided with the large aperture zoom optical system 1 loaded with an optical system for implementing a shake correcting function by shifting an optical system. Thus, the image pickup apparatus 3 can be easily provided with a shake correcting function.

<Description on Practical Examples of Large Aperture Zoom Optical System>

Practical constructions of the large aperture zoom optical system 1 as shown in FIGS. 1A and 1B i.e. the large aperture zoom optical system 1 incorporated in the image pickup apparatus 3 as shown in FIG. 3 are described with reference to the drawings.

Example 1

FIGS. 4A and 4B are sectional views showing an arrangement of lens groups in a large aperture zoom optical system as a first example. FIG. 4A shows the zoom optical system at a wide-angle end (WIDE), and FIG. 4B shows the zoom optical system at a telephoto end (TELE). Referring to FIGS. 4A and 4B, the arrows diagrammatically show how the respective lens groups are moved at the time of zooming. The same holds true for the sectional view of FIGS. 5A to 8B showing arrangements of lens groups as second to sixth examples to be described later.

FIGS. 10A to 13C are aberration diagrams of the zoom optical system as the first example. FIGS. 10A, 10B and 10C are longitudinal aberration diagrams at an infinity distance, and FIGS. 11A, 11B and 11C are lateral aberration diagrams at an infinity distance. FIGS. 12A, 12B and 12C are longitudinal aberration diagrams at a closest distance, and FIGS. 13A, 13B and 13C are lateral aberration diagrams at a closest distance. In the drawings of FIGS. 10A to 13C, FIGS. 10A, 11A, 12A and 13A show the zoom optical system at the wide angle end (WIDE), FIGS. 10B, 11B, 12B and 13B show the zoom optical system at the middle point (MIDDLE), and FIGS. 10C, 11C, 12C and 13C show the zoom optical system at the telephoto end (TELE). The same holds true for the aberration diagrams of FIGS. 14A to 17C; FIGS. 18A to 21C; FIGS. 22A to 25C; FIGS. 26A to 29C; and FIGS. 30A to 33C as the second to sixth examples to be described later.

As shown in FIGS. 4A and 4B, a zoom optical system 1A as the first example has a five-component zoom system of positive-negative-positive-negative-positive refractive powers, which is composed of a first lens group (Gr1) having a positive refractive power as a whole, a second lens group (Gr2) having a negative refractive power as a whole, a third lens group (Gr3) having a positive refractive power as a whole, a fourth lens group (Gr4) having a negative refractive power as a whole, and a fifth lens group (Gr5) having a positive refractive power as a whole successively from the object side to the image side. At the time of zooming, as shown in FIGS. 4A and 4B, the first lens group (Gr1) disposed on the side closest to the object, and the fifth lens group (Gr5) disposed on the side closest to the image are fixed; and the second to fourth lens groups (Gr2) to (Gr4) are moved. An optical diaphragm (ST) is disposed on the side of the fifth lens group (Gr5) closest to the object, in other words, between the fourth lens group (Gr4) and the fifth lens group (Gr5).

More specifically, in the zoom optical system 1A as the first example, the respective lens groups (Gr1, Gr2, Gr3, Gr4, Gr5) are constructed as follows successively from the object side to the image side.

The first lens group (Gr1) is composed of a positive meniscus lens element (first lens element L1) convex toward the object side, a positive meniscus lens element (second lens element L2) convex toward the object side, and a positive meniscus lens element (third lens element L3) convex toward the object side. The first lens element L1 and the second lens element L2 form a cemented lens.

The second lens group (Gr2) is composed of a biconvex positive lens element (fourth lens element L4), a biconcave negative lens element (fifth lens element L5), a negative meniscus lens element (sixth lens element L6) convex toward the object side, a positive meniscus lens element (seventh lens element L7) convex toward the object side, and a biconcave negative lens element (eighth lens element L8). The fourth lens element L4 and the fifth lens element L5 form a cemented lens, and the sixth lens element L6 and the seventh lens element L7 form a cemented lens.

The third lens group (Gr3) is composed of a biconvex positive lens element (ninth lens element L9). In other words, the third lens group (Gr3) is composed of the single lens element L9.

The fourth lens group (Gr4) is composed of a negative meniscus lens element (tenth lens element L10) convex toward the image side. In other words, the fourth lens group (Gr4) is composed of the single lens element L10.

The fifth lens group (Gr5) is composed of a biconvex positive lens element (eleventh lens element L11), a biconvex positive lens element (twelfth lens element L12), a biconcave negative lens element (thirteenth lens element L13), a positive meniscus lens element (fourteenth lens element L14) convex toward the image side, a biconcave negative lens element (fifteenth lens element L15), a biconvex positive lens element (sixteenth lens element L16), a negative meniscus lens element (seventeenth lens element L17) convex toward the image side, and a biconvex positive lens element (eighteenth lens element L18). The twelfth lens element L12 and the thirteenth lens element L13 form a cemented lens, and the fourteenth lens element L14 and the fifteenth lens element L15 form a cemented lens.

The optical diaphragm (ST) is an aperture stop in the first example, but may be a mechanical shutter. The same holds true for the second to sixth examples to be described later.

A light receiving surface of an image pickup element (SR) is disposed on the image side of the fifth lens group (Gr5) via a parallel plate (FT) as a filter.

In FIGS. 4A and 4B, numbers ri (i=1, 2, 3, ...) assigned to the respective lens surfaces indicate the numbers of the lens surfaces counted from the object side (where a cemented surface of the lens elements is counted as one surface). It should be noted that the both surfaces of the optical diaphragm (ST) and the parallel plate (FT) and the light receiving surface of the image pickup element (SR) are also treated as surfaces. Such definition and meaning of reference numerals hold true for the second to sixth examples to be described later (FIGS. 5A to 9B), but it does not mean that they are completely identical. For example, the lens surface disposed closest to the object is identified by the same reference numeral (r1) throughout FIGS. 4A to 9B showing the first to sixth examples, but the curvatures and the like of these lens elements are not identical in the first to sixth examples.

In such a construction, a beam incident from the object side successively passes through the first lens group (Gr1), the second lens group (Gr2), the third lens group (Gr3), the fourth lens group (Gr4), the optical diaphragm (ST), the fifth lens group (Gr5) and the parallel plate (FT) along an optical axis (AX), and forms an optical image of an object on the light receiving surface of the image pickup element (SR). In the image pickup element (SR), the optical image is converted into an electrical signal. The electrical signal is applied with a specified digital image processing and the like as necessary, and is stored as a digital video signal in a memory of a digital apparatus such as a digital camera or transmitted to another digital apparatus by wired or wireless communication.

In the zoom optical system 1A as the first example, during the zooming from the wide-angle end (WIDE) to the telephoto end (TELE) via the middle point (MIDDLE), as shown in FIGS. 4A and 4B, the first lens group (Gr1) is fixed, the second lens group (Gr2) is substantially linearly moved from the object side to the image side, the third lens group (Gr3) is moved along a curve convex toward the image side, the fourth lens group (Gr4) is substantially linearly moved from the object side to the image side, the optical diaphragm (ST) is fixed, and the fifth lens group (Gr5) is fixed.

Focusing is performed by moving the third lens group (Gr3) along the optical axis direction. More specifically, the single lens element L9 forming the third lens group (Gr3) is moved toward the image side at the time of zooming from an infinite distance object to a closest distance object, whereby focusing is performed.

In the first example, the fifth lens group (Gr5) includes a lens group for shake correction. More specifically, in the fifth lens group (Gr5), the eleventh lens element L11, the twelfth lens element L12 and the thirteenth lens element L13 form a first sub lens group (5a) having a positive refractive power as a whole, the fourteenth lens element L14 and the fifteenth lens element L15 form a second sub lens group (5b) having a negative refractive power as a whole, the sixteenth lens element L16, the seventeenth lens element L17 and the eighteenth lens element L18 form a third sub lens group (5c) having a positive refractive power as a whole, and shake correction is performed by moving the second sub lens group (5b) in a direction perpendicular to the optical axis (AX).

Construction data of the respective lens elements in the zoom optical system 1A as the first example are shown below.

Numerical Data in Example 1

Unit: mm
Lens Surface Data

| lens surface | r | d | nd | vd |
|---|---|---|---|---|
| object plane | ∞ | ∞ | | |
| 1 | 55.908 | 1.2 | 1.84666 | 23.78 |
| 2 | 35.502 | 6.5 | 1.49700 | 81.61 |
| 3 | 19520.916 | 0.1 | | |
| 4 | 33.441 | 5.8 | 1.49700 | 81.61 |
| 5 | 605.665 | 1 | | |
| 6 | 390.909 | 2.75 | 1.84666 | 23.78 |
| 7 | −33.753 | 0.9 | 1.73947 | 52.01 |
| 8 | 78.878 | 1.721 | | |
| 9 | 107.012 | 0.9 | 1.82875 | 41.75 |
| 10 | 15.470 | 1.989 | 1.94595 | 17.98 |
| 11 | 24.369 | 3.574 | | |
| 12 | −24.139 | 0.9 | 1.90265 | 35.70 |
| 13 | 134.545 | 12.369 | | |
| 14 | 81.729 | 3.047 | 1.77250 | 49.62 |
| 15 | −28.356 | 3.257 | | |
| 16 | −21.000 | 0.9 | 1.84666 | 23.78 |
| 17 | −33.468 | 9.047 | | |
| 18 (aperture stop) | ∞ | 1 | | |
| 19 | 21.902 | 3.583 | 1.71575 | 51.53 |
| 20 | −56.302 | 0.1 | | |
| 21 | 32.370 | 3.067 | 1.49700 | 81.61 |
| 22 | −23.633 | 0.9 | 1.84666 | 23.78 |
| 23 | 59.851 | 3.347 | | |
| 24 | −62.004 | 2.621 | 1.84666 | 23.78 |
| 25 | −14.192 | 0.9 | 1.72342 | 37.99 |
| 26 | 23.901 | 1.952 | | |
| 27 | 36.585 | 2.382 | 1.73753 | 28.39 |
| 28 | −51.229 | 8.521 | | |
| 29 | −13.522 | 0.95 | 1.90265 | 35.70 |
| 30 | −32.683 | 3.5254 | | |
| 31 | 30.872 | 2.996 | 1.71150 | 34.75 |
| 32 | −410.456 | 11.000 | | |
| 33 | ∞ | 4.2 | 1.51680 | 64.17 |
| 34 | ∞ | 1 | | |
| image plane | ∞ | | | |

Various Data
Zoom Lens Group Data

| group | first surface | end surface | focal length |
|---|---|---|---|
| 1 | 1 | 5 | 52.64 |
| 2 | 6 | 13 | −13.33 |
| 3 | 14 | 15 | 27.58 |
| 4 | 16 | 17 | −68.86 |
| 5 | 19 | 32 | 37.01 |

-continued

Unit: mm

| | wide angle end | middle | telephoto end |
|---|---|---|---|
| Variable Distance | | | |
| infinite distance object (object distance: infinite) | | | |
| distance to object | ∞ | ∞ | ∞ |
| between 5th and 6th surfaces | 1.000 | 10.690 | 16.032 |
| between 13th and 14th surfaces | 12.369 | 7.988 | 1.500 |
| between 15th and 16th surfaces | 3.257 | 4.966 | 6.942 |
| between 17th and 18th surfaces | 9.047 | 2.030 | 1.200 |
| closest distance object (object distance: closest) | | | |
| distance to object | 591 | 891 | 891 |
| between 5th and 6th surfaces | 1.000 | 10.690 | 16.032 |
| between 13th and 14th surfaces | 13.719 | 10.332 | 6.546 |
| between 15th and 16th surfaces | 1.909 | 2.622 | 1.897 |
| between 17th and 18th surfaces | 9.047 | 2.030 | 1.200 |
| Zoom Data | | | |
| zoom ratio (ft/fw) 2.73 | | | |
| focal length | 35.80 | 61.74 | 97.70 |
| angle of view (2ω) | 33.57 | 19.85 | 12.62 |
| BF | 1.00 | 1.00 | 1.00 |
| total length of lens system | 108.00 | 108.000 | 108.00 |
| F-number | 2.85 | 2.85 | 2.85 |

In the aforementioned lens surface data, the lens surface No. corresponds to the number "i" in the symbol ri (i=1, 2, 3, . . . ) attached to each of the lens surfaces shown in FIGS. 4A and 4B.

"r" denotes a radius of curvature (unit: mm) of each surface, "d" denotes a lens surface interval on an optical axis (on-axial surface interval) in an infinity in-focus state, "nd" denotes a refractive index of each lens element for a d-line (wavelength: 587.56 nm), and "vd" denotes an Abbe number. Since the both surfaces of the optical diaphragm (ST), the parallel plate (FT) and the light receiving surface of the image pickup element (SR) are flat surfaces, radii of curvature of these surfaces are ∞ (infinite).

The same holds true for the construction data in the second to sixth examples to be described later.

Respective aberrations in the zoom optical system 1A as the first example under the above lens arrangement and construction are shown in FIGS. 10A to 13C. In FIGS. 10A, 10B, 10C, 12A, 12B and 12C, spherical aberrations, astigmatisms and distortions are successively shown from the left. A horizontal axis of spherical aberrations represents a focus position deviation in mm, and a vertical axis thereof represents a normalized value at a maximum incident height. A horizontal axis of astigmatisms represents a focus position deviation in mm, and a vertical axis thereof represents an image height in mm. A horizontal axis of distortions represents a ratio (%) of an actual image height to an ideal image height, and a vertical axis thereof represents an image height in mm. In graphs of astigmatisms, broken line and solid line respectively indicate results on a tangential (meridional) surface and a sagittal (radial) surface. The graphs of spherical aberrations, astigmatisms and distortions show results in the case of using the d-line (wavelength: 587.56 nm).

The same holds true for longitudinal aberrations according to the second to sixth examples to be described below referring to FIGS. 14A to 14C, 16A to 16C; FIGS. 18A to 18C, 20A to 20C; FIGS. 22A to 22C, 24A to 24C; FIGS. 26A to 26C, 28A to 28C; and FIGS. 30A to 30C, 32A to 32C.

In FIG. 11A, 11B, 11C, FIGS. 13A, 13B and 13C, the left graphs show a case of a tangential (meridional) surface and the right graphs show a case of a sagittal (radial) surface, and assuming that the length from the center (optical axis AX) to an end of an effective pixel region is set to 100%, the graphs show cases at 100% position, 80% position, 50% position, 40% position and the center position successively from the upper side. A horizontal axis of the respective graphs represents a height of an incident beam to a principal ray in mm, and a vertical axis of the respective graphs represents a deviation from the principal ray on the image plane in mm. The lateral aberration diagrams also show results in the case of using the d-line.

The same holds true for lateral aberrations according to the second to sixth examples to be described below referring to FIGS. 15A to 15C, 17A to 17C; FIGS. 19A to 19C, 21A to 21C; FIGS. 23A to 23C, 25A to 25C; FIGS. 27A to 27C, 29A to 29C; and FIGS. 31A to 13C, 33A to 33C.

Example 2

Figure 17A:
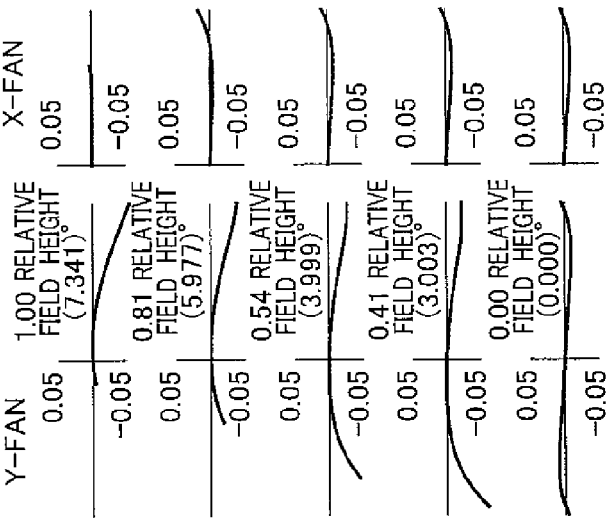
FIGS. 17A, 17B, 17C are lateral aberration diagrams of the zoom optical system as the second example at a closest distance.
Figure 17B:
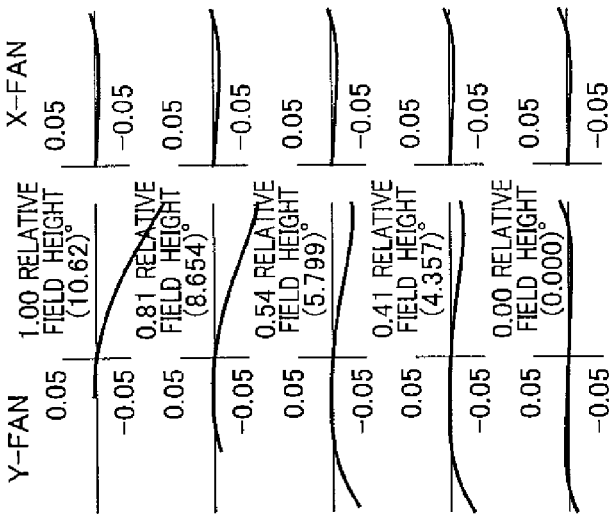
Figure 17C:
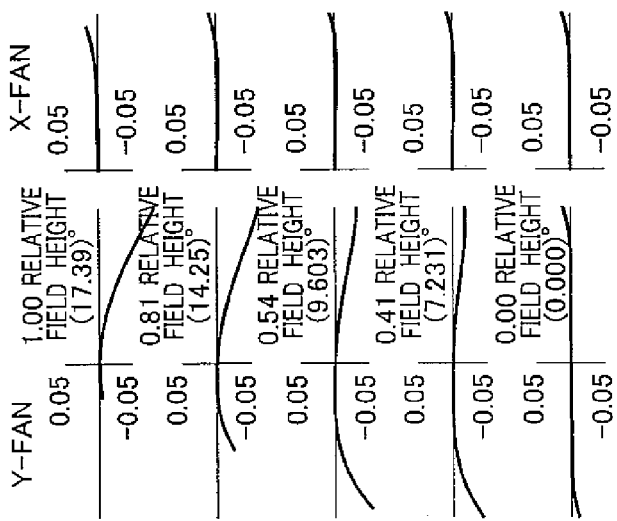

FIGS. 5A and 5B are sectional views showing an arrangement of lens groups in a large aperture zoom optical system as a second example. FIGS. 14A to 17C are aberration diagrams of the zoom optical system as the second example. FIGS. 14A, 14B and 14C are longitudinal aberration diagrams at an infinity distance, FIGS. 15A, 15B and 15C are lateral aberration diagrams at an infinity distance, FIGS. 16A, 16B and 16C are longitudinal aberration diagrams at a closest distance, and FIGS. 17A, 17B and 17C are lateral aberration diagrams at a closest distance.

As shown in FIGS. 5A and 5B, the zoom optical system 1B as the second example has a five-component zoom system of positive-negative-positive-negative-positive refractive powers, which is composed of a first lens group (Gr1) having a positive refractive power as a whole, a second lens group (Gr2) having a negative refractive power as a whole, a third lens group (Gr3) having a positive refractive power as a whole, a fourth lens group (Gr4) having a negative refractive power as a whole, and a fifth lens group (Gr5) having a positive refractive power as a whole successively from the object side to the image side. At the time of zooming, as shown in FIGS. 5A and 53, the first lens group (Gr1) disposed on the side closest to the object, and the fifth lens group (Gr5) disposed on the side closest to the image are fixed; and the second to fourth lens groups (Gr2) to (Gr4) are moved. An optical diaphragm (ST) is included in the fifth lens group (Gr5). More specifically, the optical diaphragm (ST) is disposed on the image side of the lens element disposed closest to the object.

More specifically, in the zoom optical system 1B as the second example, the respective lens groups (Gr1, Gr2, Gr3, Gr4, Gr5) are constructed as follows successively from the object side to the image side.

The first lens group (Gr1) is composed of a positive meniscus lens element (first lens element L1) convex toward the object side, a biconvex positive lens element (second lens element L2), and a positive meniscus lens element (third lens element L3) convex toward the object side. The first lens element L1 and the second lens element L2 form a cemented lens.

The second lens group (Gr2) is composed of a biconvex positive lens element (fourth lens element L4), a biconcave negative lens element (fifth lens element L5), a negative meniscus lens element (sixth lens element L6) convex toward the object side, a positive meniscus lens element (seventh lens element L7) convex toward the object side, and a biconcave negative lens element (eighth lens element L8). The fourth lens element L4 and the fifth lens element L5 form a cemented lens, and the sixth lens element L6 and the seventh lens element L7 form a cemented lens.

The third lens group (Gr3) is composed of a biconvex positive lens element (ninth lens element L9). In other words, the third lens group (Gr3) is composed of the single lens element L9.

The fourth lens group (Gr4) is composed of a negative meniscus lens element (tenth lens element L10) convex toward the image side. In other words, the fourth lens group (Gr4) is composed of the single lens element L10.

The fifth lens group (Gr5) is composed of a biconvex positive lens element (eleventh lens element L11), the optical diaphragm (ST), a biconvex positive lens element (twelfth lens element L12), a biconcave negative lens element (thirteenth lens element L13), a positive meniscus lens element (fourteenth lens element L14) convex toward the image side, a biconcave negative lens element (fifteenth lens element L15), a biconvex positive lens element (sixteenth lens element L16), a negative meniscus lens element (seventeenth lens element L17) convex toward the image side, and a biconvex positive lens element (eighteenth lens element L18). The twelfth lens element L12 and the thirteenth lens element L13 form a cemented lens, and the fourteenth lens element L14 and the fifteenth lens element L15 form a cemented lens.

A light receiving surface of an image pickup element (SR) is disposed on the image side of the fifth lens group (Gr5) via a parallel plate (FT) as a filter.

In such a construction, a beam incident from the object side successively passes through the first lens group (Gr1), the second lens group (Gr2), the third lens group (Gr3), the fourth lens group (Gr4), the fifth lens group (Gr5) (including the optical diaphragm (ST)) and the parallel plate (FT) along an optical axis (AX), and forms an optical image of an object on the light receiving surface of the image pickup element (SR). In the image pickup element (SR), the optical image is converted into an electrical signal. The electrical signal is processed as described above.

In the zoom optical system 1B as the second example, during the zooming from the wide-angle end (WIDE) to the telephoto end (TELE) via the middle point (MIDDLE), as shown in FIGS. 5A and 5B, the first lens group (Gr1) is fixed, the second lens group (Gr2) is substantially linearly moved from the object side to the image side, the third lens group (Gr3) is moved along a curve convex toward the image side, the fourth lens group (Gr4) is substantially linearly moved from the object side to the image side, and the fifth lens group (Gr5) (including the optical diaphragm (ST)) is fixed.

Focusing is performed by moving the third lens group (Gr3) along the optical axis direction. More specifically, the single lens element L9 forming the third lens group (Gr3) is moved toward the image side at the time of zooming from an infinite distance object to a closest distance object, whereby focusing is performed.

In the second example, the fifth lens group (Gr5) includes a lens group for use in shake correction. More specifically, in the fifth lens group (Gr5), the eleventh lens element L11, the twelfth lens element L12 and the thirteenth lens element L13 form a first sub lens group (5*a*) having a positive refractive power as a whole, the fourteenth lens element L14 and the fifteenth lens element L15 form a second sub lens group (5*b*) having a negative refractive power as a whole, the sixteenth lens element L16, the seventeenth lens element L17 and the eighteenth lens element L18 form a third sub lens group (5*c*) having a positive refractive power as a whole, and shake correction is performed by moving the second sub lens group (5*b*) in a direction perpendicular to the optical axis (AX).

Construction data of the respective lens elements in the zoom optical system 1B as the second example are shown below.

Numerical Data in Example 2

Unit: mm

Lens Surface Data

| lens surface | r | d | nd | vd |
|---|---|---|---|---|
| object plane | ∞ | ∞ | | |
| 1 | 62.623 | 0.9 | 1.84666 | 23.78 |
| 2 | 39.010 | 6.5 | 1.49700 | 81.61 |
| 3 | −838.608 | 0.1 | | |
| 4 | 32.870 | 5.8 | 1.49700 | 81.61 |
| 5 | 428.400 | 1.160 | | |
| 6 | 2664.634 | 2.864 | 1.84666 | 23.78 |
| 7 | −35.304 | 0.9 | 1.67790 | 50.71 |
| 8 | 29.536 | 2.246 | | |
| 9 | 254.092 | 0.9 | 1.88284 | 37.05 |
| 10 | 18.359 | 2.673 | 1.92286 | 20.88 |
| 11 | 99.034 | 2.356 | | |
| 12 | −26.459 | 0.9 | 1.91082 | 35.25 |
| 13 | 103.605 | 13.893 | | |
| 14 | 86.322 | 3.188 | 1.75500 | 52.315 |
| 15 | −30.901 | 3.420 | | |
| 16 | −23.024 | 0.9 | 1.84666 | 23.78 |
| 17 | −36.344 | 8.358 | | |
| 18 | 21.926 | 3.720 | 1.6779 | 50.71 |
| 19 | −70.409 | 1 | | |
| 20 (aperture stop) | ∞ | 0.8 | | |
| 21 | 28.117 | 3.517 | 1.49700 | 81.61 |
| 22 | −23.612 | 0.9 | 1.84666 | 237.85 |
| 23 | 57.188 | 4.470 | | |
| 24 | −63.992 | 2.910 | 1.84666 | 23.78 |
| 25 | −13.583 | 0.9 | 1.72341 | 37.99 |
| 26 | 20.324 | 1.788 | | |
| 27 | 28.403 | 2.689 | 1.72685 | 30.64 |
| 28 | −57.906 | 7.587 | | |
| 29 | −12.917 | 0.95 | 1.91082 | 35.25 |
| 30 | −39.277 | 0.193 | | |
| 31 | 42.772 | 3.316 | 1.71039 | 35.10 |
| 32 | −45.068 | 11.000 | | |
| 33 | ∞ | 4.2 | 1.51680 | 64.17 |
| 34 | ∞ | 1 | | |
| image plane | ∞ | | | |

Various Data
Zoom Lens Group Data

| group | first surface | end surface | focal length |
|---|---|---|---|
| 1 | 1 | 5 | 53.01 |
| 2 | 6 | 13 | −14.27 |
| 3 | 14 | 15 | 30.50 |
| 4 | 16 | 17 | −76.57 |
| 5 | 18 | 32 | 37.60 |

| | wide angle end | middle | telephoto end |
|---|---|---|---|
| Variable Distance | | | |
| infinite distance object (object distance: infinite) | | | |
| distance to object | ∞ | ∞ | ∞ |
| between 5th and 6th surfaces | 1.160 | 11.068 | 16.603 |
| between 13th and 14th surfaces | 13.893 | 8.913 | 1.500 |
| between 15th and 16th surfaces | 3.420 | 5.652 | 7.526 |
| between 17th and 18th surfaces | 8.358 | 1.202 | 1.200 |
| closest distance object (object distance: closest) | | | |
| distance to object | 591 | 891 | 891 |
| between 5th and 6th surfaces | 1.160 | 11.068 | 16.603 |
| between 13th and 14th surfaces | 15.382 | 11.497 | 7.162 |
| between 15th and 16th surfaces | 1.936 | 3.067 | 1.868 |
| between 17th and 18th surfaces | 8.358 | 1.202 | 1.200 |

Unit: mm

Zoom Data
zoom ratio (ft/fw) 2.73

| | | | |
|---|---|---|---|
| focal length | 35.81 | 61.74 | 97.70 |
| angle of view (2ω) | 33.57 | 19.85 | 12.62 |
| BF | 1.00 | 1.00 | 1.00 |
| total length of lens system | 108.00 | 108.000 | 108.00 |
| F-number | 2.85 | 2.85 | 2.85 |

In the aforementioned lens surface data, the lens surface No. corresponds to the number "i" in the symbol ri (i=1, 2, 3, . . . ) attached to each of the lens surfaces shown in FIGS. 5A and 5B.

Respective aberrations in the zoom optical system 1B as the second example under the above lens arrangement and construction are shown in FIGS. 14A to 17C.

Example 3

Figure 19A:
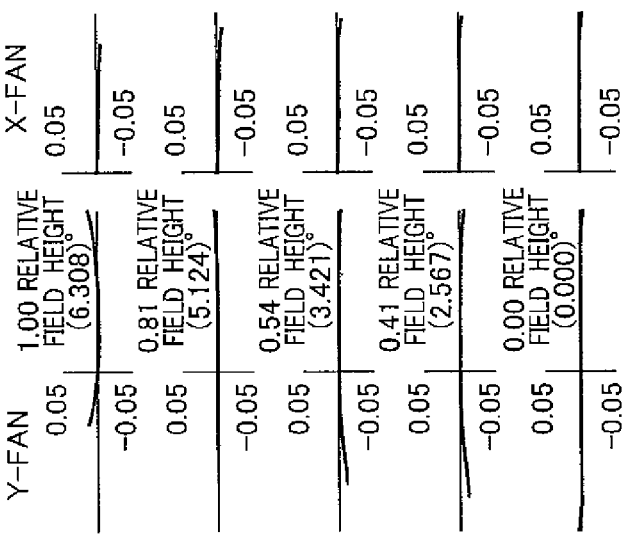
FIGS. 19A, 19B, 19C are lateral aberration diagrams of the zoom optical system as the third example at an infinite distance.
Figure 19B:
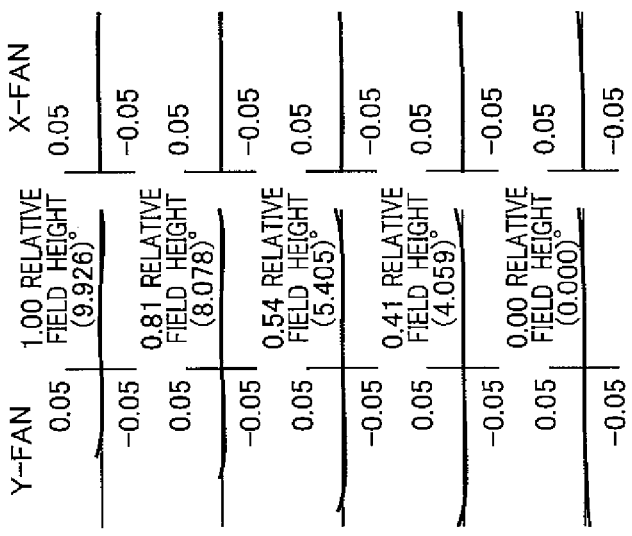
Figure 19C:
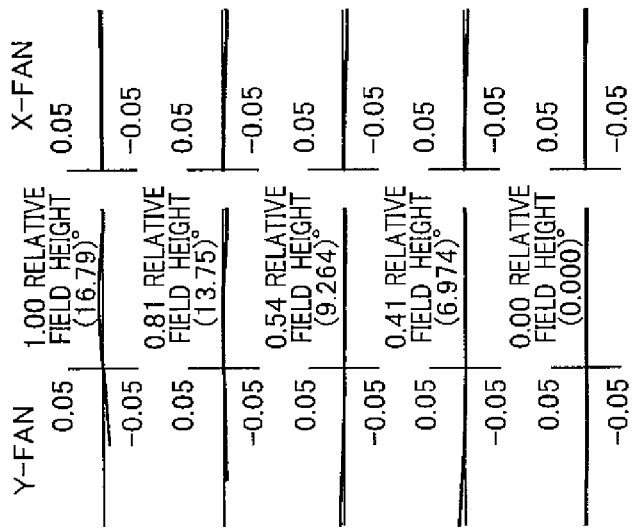

FIGS. 6A and 6B are sectional views showing an arrangement of lens groups in a large aperture zoom optical system as a third example. FIGS. 18A to 21C are aberration diagrams of the zoom optical system as the third example. FIGS. 18A, 18B and 18C are longitudinal aberration diagrams at an infinity distance, FIGS. 19A, 19B and 19C are lateral aberration diagrams at an infinity distance, FIGS. 20A, 20B and 20C are longitudinal aberration diagrams at a closest distance, and FIGS. 21A, 21B and 22C are lateral aberration diagrams at a closest distance.

As shown in FIGS. 6A and 6B, the zoom optical system 1C as the third example has a five-component zoom system of positive-negative-positive-negative-positive refractive powers, which is composed of a first lens group (Gr1) having a positive refractive power as a whole, a second lens group (Gr2) having a negative refractive power as a whole, a third lens group (Gr3) having a positive refractive power as a whole, a fourth lens group (Gr4) having a negative refractive power as a whole, and a fifth lens group (Gr5) having a positive refractive power as a whole successively from the object side to the image side. At the time of zooming, as shown in FIGS. 6A and 6B, the first lens group (Gr1) disposed on the side closest to the object, and the fifth lens group (Gr5) disposed on the side closest to the image are fixed; and the second to fourth lens groups (Gr2) to (Gr4) are moved. An optical diaphragm (ST) is included in the fifth lens group (Gr3). More specifically, the optical diaphragm (ST) is disposed on the image side of the lens element disposed closest to the object.

More specifically, in the zoom optical system 10 as the third example, the respective lens groups (Gr1, Gr2, Gr3, Gr4, Gr3) are constructed as follows successively from the object side to the image side.

The first lens group (Gr1) is composed of a negative meniscus lens element (first lens element L1) convex toward the object side, a positive meniscus lens element (second lens element L2) convex toward the object side, and a positive meniscus lens element (third lens element L3) convex toward the object side. The first lens element L1 and the second lens element L2 form a cemented lens.

The second lens group (Gr2) is composed of a biconcave negative lens element (fourth lens element L4), a biconcave negative lens element (fifth lens element L5), a positive meniscus lens element (sixth lens element L6) convex toward the object side, and a biconcave negative lens element (seventh lens element L7). The fifth lens element L5 and the sixth lens element L6 form a cemented lens.

The third lens group (Gr3) is composed of a biconvex positive lens element (eighth lens element L8). In other words, the third lens group (Gr3) is composed of the single lens element L8.

The fourth lens group (Gr4) is composed of a positive meniscus lens element (ninth lens element L9) convex toward the image side, and a negative meniscus lens element (tenth lens element L10) convex toward the image side. The ninth lens element L9 and the tenth lens element L10 form a cemented lens.

The fifth lens group (Gr5) is composed of a biconvex positive lens element (eleventh lens element L11), the optical diaphragm (ST), a positive meniscus lens element (twelfth lens element L12) convex toward the object side, a biconcave negative lens element (thirteenth lens element L13), a biconvex positive lens element (fourteenth lens element L14), a biconvex positive lens element (fifteenth lens element L15), a biconcave negative lens element (sixteenth lens element L16), a biconvex positive lens element (seventeenth lens element L17), a negative meniscus lens element (eighteenth lens element L18) convex toward the image side, and a biconvex positive lens element (nineteenth lens element L19). The thirteenth lens element L13 and the fourteenth lens element L14 form a cemented lens, and the fifteenth lens element L15 and the sixteenth lens element L16 form a cemented lens.

A light receiving surface of an image pickup element (SR) is disposed on the image side of the fifth lens group (Gr5) via a parallel plate (FT) as a filter.

In such a construction, a beam incident from the object side successively passes through the first lens group (Gr1), the second lens group (Gr2), the third lens group (Gr3), the fourth lens group (Gr4), the fifth lens group (Gr5) (including the optical diaphragm (ST)) and the parallel plate (FT) along an optical axis (AX), and forms an optical image of an object on the light receiving surface of the image pickup element (SR). In the image pickup element (SR), the optical image is converted into an electrical signal. The electrical signal is processed as described above.

In the zoom optical system 1C as the third example, during the zooming from the wide-angle end (WIDE) to the telephoto end (TELE) via the middle point (MIDDLE), as shown in FIGS. 6A and 6B, the first lens group (Gr1) is fixed, the second lens group (Gr2) is substantially linearly moved from the object side to the image side, the third lens group (Gr3) is moved along a curve convex toward the image side, the fourth lens group (Gr4) is substantially linearly moved from the object side to the image side, and the fifth lens group (Gr5) (including the optical diaphragm (ST)) is fixed.

Focusing is performed by moving the third lens group (Gr3) along the optical axis direction. More specifically, the single lens element L8 forming the third lens group (Gr3) is moved toward the image side at the time of zooming from an infinite distance object to a closest distance object, whereby focusing is performed.

In the third example, the fifth lens group (Gr5) includes a lens group for use in shake correction. More specifically, in the fifth lens group (Gr5), the eleventh lens element L11, the twelfth lens element L12, the thirteenth lens element L13 and the fourteenth lens element L14 form a first sub lens group (Sa) having a positive refractive power as a whole, the fifteenth lens element L15 and the sixteenth lens element L16 form a second sub lens group (5b) having a negative refractive power as a whole, the seventeenth lens element L17, the eighteenth lens element L18, the nineteenth lens element L19 and a twentieth lens element L20 form a third sub lens group (5c) having a positive refractive power as a whole, and shake correction is performed by moving the second sub lens group (5b) in a direction perpendicular to the optical axis (AX).

Construction data of the respective lens elements in the zoom optical system 1C as the third example are shown below.

Numerical Data in Example 3

| Unit: mm | | | | |
|---|---|---|---|---|
| Lens Surface Data | | | | |
| lens surface | r | d | nd | vd |
| object plane | ∞ | ∞ | | |
| 1 | 54.903 | 0.95 | 1.846663 | 23.78 |
| 2 | 36.373 | 6.5 | 1.496997 | 81.61 |
| 3 | 739.117 | 0.1 | | |
| 4 | 32.765 | 5.8 | 1.496997 | 81.61 |
| 5 | 621.077 | 1.121 | | |
| 6 | −1670.819 | 0.95 | 1.754999 | 52.32 |
| 7 | 27.281 | 3.147 | | |
| 8 | −66.471 | 0.95 | 1.754999 | 52.32 |
| 9 | 20.989 | 3.434 | 1.846663 | 23.78 |
| 10 | −142.615 | 1.612 | | |
| 11 | −31.514 | 0.95 | 1.754999 | 52.32 |
| 12 | 110.057 | 13.822 | | |
| 13 | 95.239 | 3.424 | 1.754999 | 52.32 |
| 14 | −32.232 | 2.549 | | |
| 15 | −25.925 | 1.129 | 1.496997 | 81.61 |
| 16 | −24.123 | 0.95 | 1.797532 | 27.66 |
| 17 | −46.445 | 8.741 | | |
| 18 | 20.305 | 3.723 | 1.754999 | 52.32 |
| 19 | −456.964 | 1 | | |
| 20 (aperture stop) | ∞ | 1 | | |
| 21 | 2.10E+01 | 1.943 | 1.82114 | 42.56 |
| 22 | 39.376 | 1.105 | | |
| 23 | −214.977 | 0.95 | 1.871764 | 2.98 |
| 24 | 11.166 | 4.480 | 1.496997 | 81.61 |
| 25 | −70.261 | 4.450 | | |
| 26 | 126.819 | 3.644 | 1.84666 | 23.78 |
| 27 | −12.499 | 0.95 | 1.846104 | 38.78 |
| 28 | 15.757 | 1.473 | | |
| 29 | 25.101 | 2.605 | 1.700277 | 38.69 |
| 30 | −59.927 | 1.891 | | |
| 31 | −15.917 | 0.95 | 1.90265 | 35.70 |
| 32 | −68.716 | 0.1 | | |
| 33 | 26.115 | 2.867 | 1.681089 | 48.50 |
| 34 | −2.16E+02 | 14.741 | | |
| 35 | ∞ | 4.2 | 1.5168 | 64.17 |
| 36 | ∞ | 1 | | |
| image plane | ∞ | | | |

| Various Data | | | |
|---|---|---|---|
| Zoom Lens Group Data | | | |
| group | first surface | end surface | focal length |
| 1 | 1 | 5 | 52.15 |
| 2 | 6 | 12 | −15.02 |
| 3 | 13 | 14 | 32.27 |
| 4 | 15 | 17 | −70.92 |
| 5 | 18 | 34 | 37.32 |

| | wide angle end | middle | telephoto end |
|---|---|---|---|
| Variable Distance | | | |
| infinite distance object (object distance: infinite) | | | |
| distance to object | ∞ | ∞ | ∞ |
| between 5th and 6th surfaces | 1.121 | 11.260 | 17.065 |
| between 12th and 13th surfaces | 13.822 | 8.817 | 1.000 |
| between 14th and 15th surfaces | 2.549 | 5.153 | 7.167 |
| between 17th and 18th surfaces | 8.741 | 1.000 | 1.000 |
| closest distance object (object distance: closest) | | | |
| distance to object | 585 | 880 | 1080 |
| between 5th and 6th surfaces | 1.121 | 11.260 | 17.065 |
| between 12th and 13th surfaces | 15.375 | 11.442 | 5.855 |

-continued

Unit: mm

| | | | |
|---|---:|---:|---:|
| between 14th and 15th surfaces | 1.000 | 2.529 | 2.316 |
| between 17th and 18th surfaces | 8.741 | 1.000 | 1.000 |

Zoom Data
zoom ratio (ft/fw) 2.73

| | | | |
|---|---:|---:|---:|
| focal length | 35.81 | 61.74 | 97.70 |
| angle of view (2ω) | 33.57 | 19.85 | 12.62 |
| BF | 1.00 | 1.00 | 1.00 |
| total length of lens system | 108.00 | 108.000 | 108.00 |
| F-number | 2.85 | 2.85 | 2.85 |

In the aforementioned lens surface data, the lens surface No. corresponds to the number "i" in the symbol ri (i=1, 2, 3, ... ) attached to each of the lens surfaces shown in FIGS. 6A and 6B.

Respective aberrations in the zoom optical system 1C as the third example under the above lens arrangement and construction are shown in FIGS. 18A to 21C.

Example 4

Figure 25A:
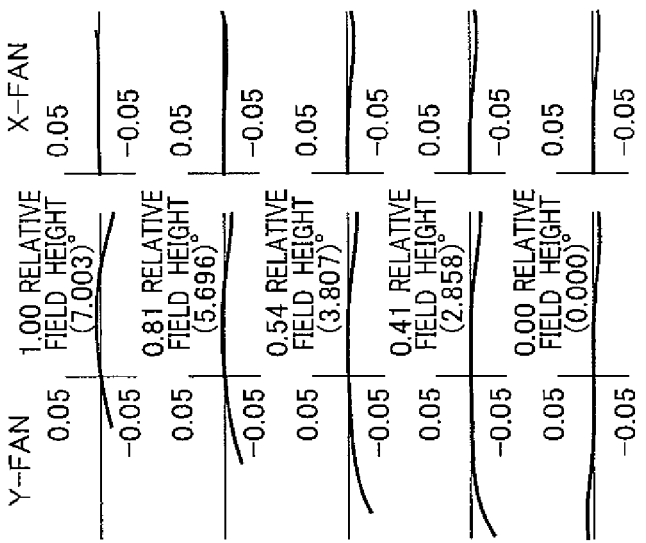
FIGS. 25A, 25B, 25C are lateral aberration diagrams of the zoom optical system as the fourth example at a closest distance.
Figure 25B:
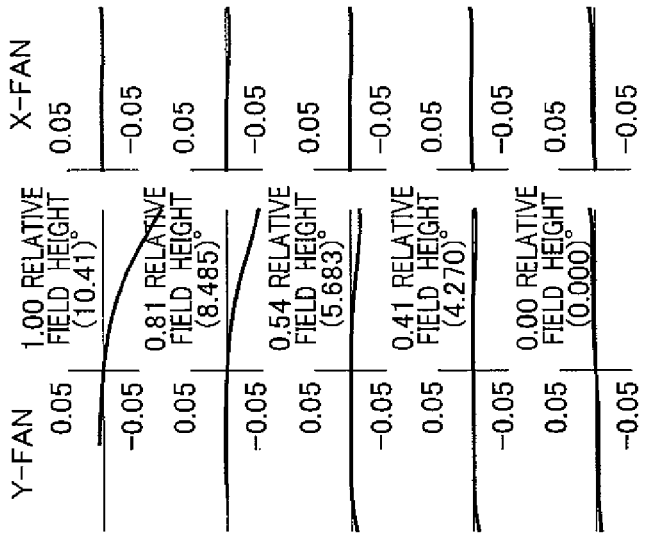
Figure 25C:
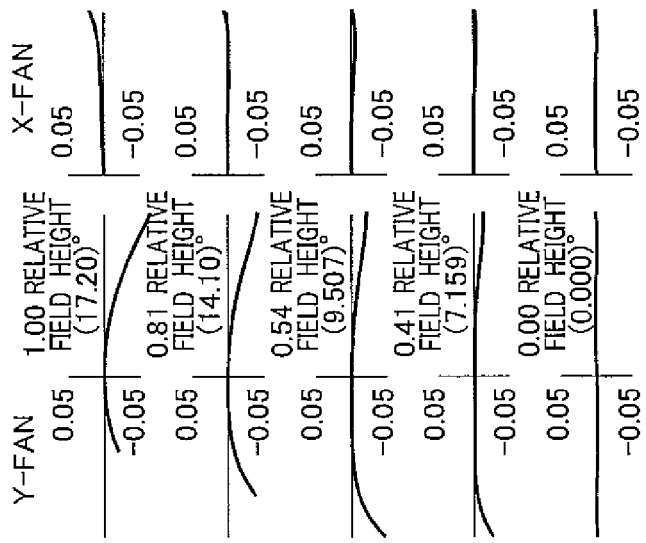

FIGS. 7A and 7B are sectional views showing an arrangement of lens groups in a large aperture zoom optical system as a fourth example. FIGS. 22A to 25C are aberration diagrams of the zoom optical system as the fourth example. FIGS. 22A, 22B and 22C are longitudinal aberration diagrams at an infinity distance, FIGS. 23A, 23B and 23C are lateral aberration diagrams at an infinity distance, FIGS. 24A, 24B and 24C are longitudinal aberration diagrams at a closest distance, and FIGS. 25A, 25B and 25C are lateral aberration diagrams at a closest distance.

As shown in FIGS. 7A and 7B, the zoom optical system 1D as the fourth example has a five-component zoom system of positive-negative-positive-negative-positive refractive powers, which is composed of a first lens group (Gr1) having a positive refractive power as a whole, a second lens group (Gr2) having a negative refractive power as a whole, a third lens group (Gr3) having a positive refractive power as a whole, a fourth lens group (Gr4) having a negative refractive power as a whole, and a fifth lens group (Gr5) having a positive refractive power as a whole successively from the object side to the image side. At the time of zooming, as shown in FIGS. 7A and 7B, the first lens group (Gr1) disposed on the side closest to the object, and the fifth lens group (Gr5) disposed on the side closest to the image are fixed; and the second to fourth lens groups (Gr2) to (Gr4) are moved. An optical diaphragm (ST) is included in the fifth lens group (Gr5). More specifically, the optical diaphragm (ST) is disposed on the image side of the lens element disposed closest to the object.

More specifically, in the zoom optical system 1D as the fourth example, the respective lens groups (Gr1, Gr2, Gr3, Gr4, Gr5) are constructed as follows successively from the object side to the image side.

The first lens group (Gr1) is composed of a negative meniscus lens element (first lens element L1) convex toward the object side, a biconvex positive lens element (second lens element L2), and a positive meniscus lens element (third lens element L3) convex toward the object side. The first lens element L1 and the second lens element L2 form a cemented lens.

The second lens group (Gr2) is composed of a biconcave negative lens element (fourth lens element L4), a biconvex positive lens element (fifth lens element L5), a negative meniscus lens element (sixth lens element L6) convex toward the object side, a biconcave negative lens element (seventh lens element L7), a biconvex positive lens element (eighth lens element L8), and a biconcave negative lens element (ninth lens element L9). The eighth lens element L8 and the ninth lens element L9 form a cemented lens.

The third lens group (Gr3) is composed of a biconvex positive lens element (tenth lens element L10). In other words, the third lens group (Gr3) is composed of the single lens element L10.

The fourth lens group (Gr4) is composed of a positive meniscus lens element (eleventh lens element L11) convex toward the image side, and a negative meniscus lens element (twelfth lens element L12) convex toward the image side. The eleventh lens element L11 and the twelfth lens element L12 form a cemented lens.

The fifth lens group (Gr5) is composed of a biconvex positive lens element (thirteenth lens element L13), the optical diaphragm (ST), a positive meniscus lens element (fourteenth lens element L14) convex toward the object side, a negative meniscus lens element (fifteenth lens element L15) convex toward the object side, a biconvex positive lens element (sixteenth lens element L16), a positive meniscus lens element (seventeenth lens element L17) convex toward the image side, a biconcave negative lens element (eighteenth lens element L18), a biconvex positive lens element (nineteenth lens element L19), a biconvex positive lens element (twentieth lens element L20), a biconcave negative lens element (twenty-first lens element L21), and a positive meniscus lens element (twenty-second lens element L22) convex toward the object side. The fifteenth lens element L15 and the sixteenth lens element L16 form a cemented lens, the seventeenth lens element L17 and the eighteenth lens element L18 form a cemented lens, and the twentieth lens element L20 and the twenty-first lens element L21 form a cemented lens.

A light receiving surface of an image pickup element (SR) is disposed on the image side of the fifth lens group (Gr5) via a parallel plate (FT) as a filter.

In such a construction, a beam incident from the object side successively passes through the first lens group (Gr1), the second lens group (Gr2), the third lens group (Gr3), the fourth lens group (Gr4), the fifth lens group (Gr5) (including the optical diaphragm (ST)) and the parallel plate (FT) along an optical axis (AX), and forms an optical image of an object on the light receiving surface of the image pickup element (SR). In the image pickup element (SR), the optical image is converted into an electrical signal. The electrical signal is processed as described above.

In the zoom optical system 1D as the fourth example, during the zooming from the wide-angle end (WIDE) to the telephoto end (TELE) via the middle point (MIDDLE), as shown in FIGS. 7A and 7B, the first lens group (Gr1) is fixed, the second lens group (Gr2) is substantially linearly moved from the object side to the image side, the third lens group (Gr3) is moved along a curve convex toward the image side, the fourth lens group (Gr4) is substantially linearly moved from the object side to the image side, and the fifth lens group (Gr5) (including the optical diaphragm (ST)) is fixed.

Focusing is performed by moving the third lens group (Gr3) along the optical axis direction. More specifically, the single lens element L10 forming the third lens group (Gr3) is moved toward the image side at the time of zooming from an infinite distance object to a closest distance object, whereby focusing is performed.

In the fourth example, the fifth lens group (Gr5) includes a lens group for use in shake correction. More specifically, in the fifth lens group (Gr5), the thirteenth lens element L13, the fourteenth lens element L14, the fifteenth lens element L14 and the sixteenth lens element L16 form a first sub lens group (5a) having a positive refractive power as a whole, the seventeenth lens element L17 and the eighteenth lens element L18 form a second sub lens group (5b) having a negative refractive power as a whole, and the nineteenth lens element L19, the twentieth lens element L20, the twenty-first lens element L21 and the twenty-second lens element L22 form a third sub lens group (5c) having a positive refractive power as a whole, and shake correction is performed by moving the second sub lens group (5b) in a direction perpendicular to the optical axis (AX).

Construction data of the respective lens elements in the zoom optical system 1D as the fourth example are shown below.

Numerical Data in Example 4

Unit: mm

Lens Surface Data

| lens surface | r | d | nd | vd |
|---|---|---|---|---|
| object plane | ∞ | ∞ | | |
| 1 | 60.543 | 0.95 | 1.818 | 30.44 |
| 2 | 32.899 | 7.2 | 1.497 | 81.61 |
| 3 | −2046.271 | 0.1 | | |
| 4 | 28.634 | 5.8 | 1.497 | 81.61 |
| 5 | 265.310 | 1.351 | | |
| 6 | −1566.457 | 0.95 | 1.758 | 51.73 |
| 7 | 22.168 | 0.766 | | |
| 8 | 29.708 | 3.542 | 1.847 | 23.78 |
| 9 | −93.220 | 0.6 | | |
| 10 | 158.776 | 0.95 | 1.879 | 31.22 |
| 11 | 30.611 | 2.677 | | |
| 12 | −66.017 | 0.95 | 1.752 | 5.23 |
| 13 | 44.186 | 1.586 | 1.923 | 20.88 |
| 14 | 227.007 | 2.292 | | |
| 15 | −20.738 | 0.95 | 1.755 | 52.31 |
| 16 | 277.037 | 10.154 | | |
| 17 | 133.150 | 3.354 | 1.757 | 51.87 |
| 18 | −24.693 | 2.080 | | |
| 19 | −22.255 | 1.180 | 1.497 | 81.61 |
| 20 | −20.328 | 0.95 | 1.862 | 86.23 |
| 21 | −34.809 | 9.663 | | |
| 22 | 84.378 | 2.080 | 1.755 | 52.31 |
| 23 | −68.275 | 0.5 | | |
| 24 (aperture stop) | ∞ | 0.5 | | |
| 25 | 17.576 | 2.619 | 1.761 | 51.08 |
| 26 | 41.754 | 1.750 | | |
| 27 | 62.758 | 1.017 | 1.803 | 26.50 |
| 28 | 12.686 | 3.998 | 1.497 | 81.61 |
| 29 | −608.710 | 4.679 | | |
| 30 | −139.663 | 3.439 | 1.847 | 23.78 |
| 31 | −12.500 | 0.95 | 1.804 | 37.17 |
| 32 | 18.860 | 1.735 | | |
| 33 | 41.352 | 1.847 | 1.759 | 51.50 |
| 34 | −231.811 | 0.1 | | |
| 35 | 60.553 | 4.673 | 1.704 | 37.20 |
| 36 | −11.909 | 1 | 1.903 | 35.70 |
| 37 | 80.215 | 0.227 | | |
| 38 | 26.710 | 1.950 | 1.847 | 23.78 |
| 39 | 70.437 | 16.391 | | |
| 40 | ∞ | 4.2 | 1.517 | 64.17 |
| 41 | ∞ | 1 | | |
| image plane | ∞ | | | |

Various Data
Zoom Lens Group Data

| group | first surface | end surface | focal length |
|---|---|---|---|
| 1 | 1 | 5 | 51.83 |
| 2 | 6 | 16 | −12.58 |
| 3 | 17 | 18 | 27.76 |
| 4 | 19 | 21 | −67.13 |
| 5 | 22 | 39 | 33.98 |

Unit: mm

| | wide angle end | middle | telephoto end |
|---|---|---|---|
| Variable Distance infinite distance object (object distance: infinite) | | | |
| distance to object | ∞ | ∞ | ∞ |
| between 5th and 6th surfaces | 1.351 | 10.783 | 16.519 |
| between 12th and 13th surfaces | 10.154 | 6.882 | 1.000 |
| between 14th and 15th surfaces | 2.080 | 4.583 | 4.728 |
| between 17th and 18th surfaces | 9.663 | 1.000 | 1.000 |
| closest distance object (object distance: closest) | | | |
| distance to object | 585 | 880 | 1080 |
| between 5th and 6th surfaces | 1.351 | 10.783 | 16.519 |
| between 12th and 13th surfaces | 11.234 | 8.672 | 4.520 |
| between 14th and 15th surfaces | 1.000 | 2.793 | 1.208 |
| between 17th and 18th surfaces | 9.663 | 1.000 | 1.000 |
| Zoom Data zoom ratio (ft/fw) 2.73 | | | |
| focal length | 35.81 | 61.74 | 97.70 |
| angle of view (2ω) | 33.57 | 19.85 | 12.62 |
| BF | 1.00 | 1.00 | 1.00 |
| total length of lens system | 112.50 | 112.50 | 112.50 |
| F-number | 2.85 | 2.85 | 2.85 |

In the aforementioned lens surface data, the lens surface No. corresponds to the number "i" in the symbol ri (i=1, 2, 3, . . . ) attached to each of the lens surfaces shown in FIGS. 7A and 7B.

Respective aberrations in the zoom optical system 1D as the fourth example under the above lens arrangement and construction are shown in FIGS. 22A to 25C.

Example 5

Figures 27A, 27B, 27C:
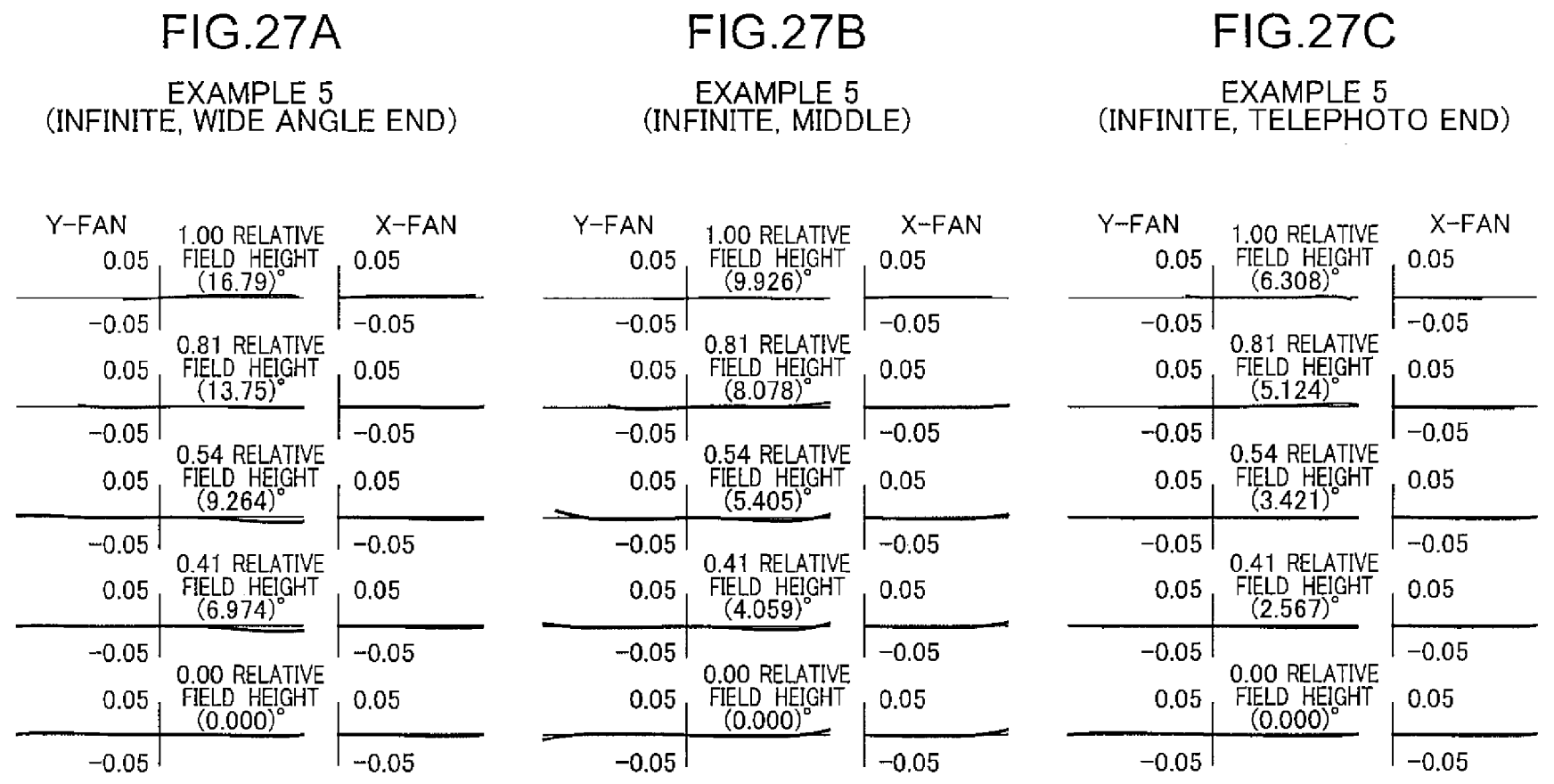
Figure 29A:
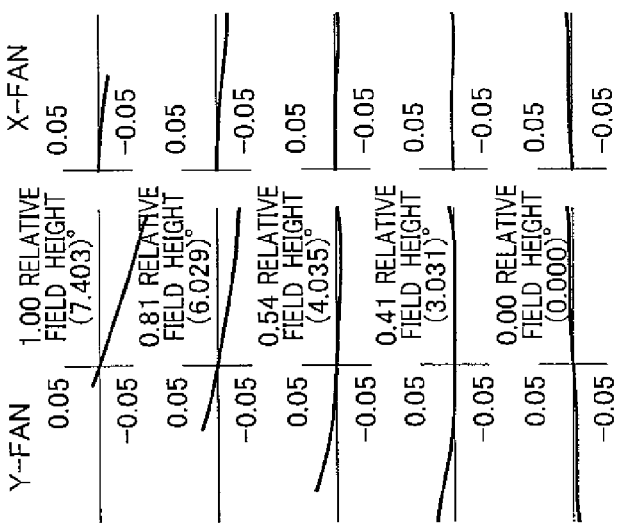
FIGS. 29A, 29B, 29C are lateral aberration diagrams of the zoom optical system as the fifth example at a closest distance.
Figure 29B:
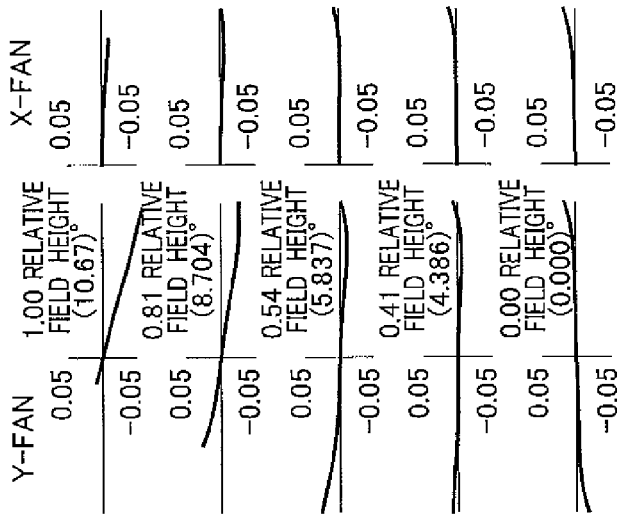
Figure 29C:
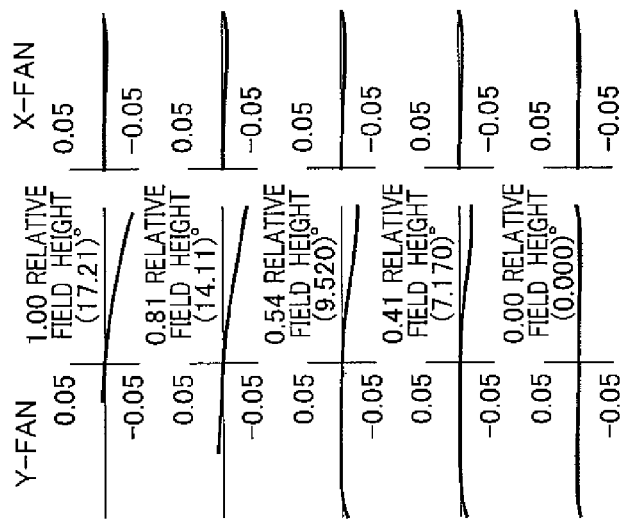

FIGS. 8A and 8B are sectional views showing an arrangement of lens groups in a large aperture zoom optical system as a fifth example. FIGS. 26A to 29C are aberration diagrams of the zoom optical system as the fifth example. FIGS. 26A, 26B and 26C are longitudinal aberration diagrams at an infinity distance, FIGS. 27A, 27B and 27C are lateral aberration diagrams at an infinity distance, FIGS. 28A, 28B and 28C are longitudinal aberration diagrams at a closest distance, and FIGS. 29A, 29B and 29C are lateral aberration diagrams at a closest distance.

As shown in FIGS. 8A and 8B, the zoom optical system 1E as the fifth example has a five-component zoom system of positive-negative-positive-negative-positive refractive powers, which is composed of a first lens group (Gr1) having a positive refractive power as a whole, a second lens group (Gr2) having a negative refractive power as a whole, a third lens group (Gr3) having a positive refractive power as a whole, a fourth lens group (Gr4) having a negative refractive power as a whole, and a fifth lens group (Gr5) having a positive refractive power as a whole successively from the object side to the image side. At the time of zooming, as shown in FIGS. 8A and 8B, the first lens group (Gr1) disposed on the side closest to the object, and the fifth lens group (Gr5) disposed on the side closest to the image are fixed; and the second to fourth lens groups (Gr2) to (Gr4) are moved. An optical diaphragm (ST) is disposed on the side of the fifth lens group (Gr5) closest to the object, in other words, disposed between the fourth lens group (Gr4) and the fifth lens group (Gr5).

More specifically, in the zoom optical system 1E as the fifth example, the respective lens groups (Gr1, Gr2, Gr3, Gr4, Gr5) are constructed as follows successively from the object side to the image side.

The first lens group (Gr1) is composed of a negative meniscus lens element (first lens element L1) convex toward the object side, a biconvex positive lens element (second lens element L2), a negative meniscus lens element (third lens element L3) convex toward the object side, and a positive meniscus lens element (fourth lens element L4) convex toward the object side. The first lens element L1 and the second lens element L2 form a cemented lens. The third lens element L3 and the fourth lens element L4 form a cemented lens.

The second lens group (Gr2) is composed of a negative meniscus lens element (fifth lens element L5) convex toward the object side, a biconcave negative lens element (sixth lens element L6), a positive meniscus lens element (seventh lens element L7) convex toward the object side, and a biconcave negative lens element (eighth lens element L8). The sixth lens element L6 and the seventh lens element L7 form a cemented lens.

The third lens group (Gr3) is composed of a biconvex positive lens element (ninth lens element L9). In other words, the third lens group (Gr3) is composed of the single lens element L9.

The fourth lens group (Gr4) is composed of a biconvex positive lens element (tenth lens element L10), and a negative meniscus lens element (eleventh lens element L11) convex toward the image side. The tenth lens element L10 and the eleventh lens element L11 form a cemented lens.

The fifth lens group (Gr5) is composed of a biconvex positive lens element (twelfth lens element L12), a biconvex positive lens element (thirteenth lens element L13), a biconcave negative lens element (fourteenth lens element L14), a biconvex positive lens element (fifteenth lens element L15), a positive meniscus lens element (sixteenth lens element L16) convex toward the image side, a biconcave negative lens element (seventeenth lens element L17), and a biconvex positive lens element (eighteenth lens element L18). The thirteenth lens element L13 and the fourteenth lens element L14 form a cemented lens, and the sixteenth lens element L16 and the seventeenth lens element L17 form a cemented lens.

The optical diaphragm (ST) is disposed on the object side of the fifth lens group (Gr5), and a light receiving surface of an image pickup element (SR) is disposed on the image side of the fifth lens group (Gr5) via a parallel plate (FT) as a filter.

In such a construction, a beam incident from the object side successively passes through the first lens group (Gr1), the second lens group (Gr2), the third lens group (Gr3), the fourth lens group (Gr4), the optical diaphragm (ST), the fifth lens group (Gr5) and the parallel plate (FT) along an optical axis (AX), and forms an optical image of an object on the light receiving surface of the image pickup element (SR). In the image pickup element (SR), the optical image is converted into an electrical signal. The electrical signal is processed as described above.

In the zoom optical system 1E as the fifth example, during the zooming from the wide-angle end (WIDE) to the telephoto end (TELE) via the middle point (MIDDLE), as shown in FIGS. 8A and 8B, the first lens group (Gr1) is fixed, the second lens group (Gr2) is substantially linearly moved from the object side to the image side, the third lens group (Gr3) is moved along a curve convex toward the image side, the fourth lens group (Gr4) is substantially linearly moved from the object side to the image side, and the fifth lens group (Gr5) (including the optical diaphragm (ST)) is fixed.

Focusing is performed by moving the third lens group (Gr3) along the optical axis direction. More specifically, the single lens element L9 forming the third lens group (Gr3) is moved toward the image side at the time of zooming from an infinite distance object to a closest distance object, whereby focusing is performed.

In the fifth example, the fifth lens group (Gr5) includes a lens group for use in shake correction. More specifically, in the fifth lens group (Gr5), the twelfth lens element L12, the thirteenth lens element L13, the fourteenth lens element L14 and the fifteenth lens element L15 form a first sub lens group (5a) having a positive refractive power as a whole, the sixteenth lens element L16 and the seventeenth lens element L17 form a second sub lens group (5b) having a negative refractive power as a whole, the eighteenth lens element L18 forms a third sub lens group (5c) having a positive refractive power as a whole, and shake correction is performed by moving the second sub lens group (5b) in a direction perpendicular to the optical axis (AX).

Construction data of the respective lens elements in the zoom optical system 1E as the fifth example are shown below.

Numerical Data in Example 5

Unit: mm

Lens Surface Data

| lens surface | r | d | nd | vd |
|---|---|---|---|---|
| object plane | ∞ | ∞ | | |
| 1 | 49.590 | 0.95 | 1.783 | 28.96 |
| 2 | 39.430 | 7.184 | 1.497 | 81.61 |
| 3 | −324.098 | 0.6 | | |
| 4 | 27.195 | 0.95 | 1.840 | 25.28 |
| 5 | 22.607 | 6.284 | 1.489 | 81.41 |
| 6 | 61.075 | 1.260 | | |
| 7 | 75.333 | 0.95 | 1.721 | 3.85 |
| 8 | 15.076 | 4.914 | | |
| 9 | −43.919 | 0.95 | 1.487 | 70.20 |
| 10 | 17.675 | 3.288 | 1.847 | 23.78 |
| 11 | 3763.055 | 2.202 | | |
| 12 | −25.417 | 0.95 | 1.766 | 50.23 |
| 13 | 844.931 | 15.764 | | |
| 14 | 76.327 | 2.863 | 1.802 | 44.89 |
| 15 | −45.452 | 2.042 | | |
| 16 | 214.785 | 3.287 | 1.497 | 81.61 |
| 17 | −22.824 | 0.95 | 1.856 | 33.88 |
| 18 | −112.830 | 7.029 | | |
| 19 (aperture stop) | ∞ | 0.8 | | |
| 20 | 62.841 | 2.403 | 1.828 | 41.84 |
| 21 | −52.051 | 0.1 | | |
| 22 | 17.807 | 5.171 | 1.487 | 70.20 |
| 23 | −43.290 | 1.831 | 1.817 | 32.19 |
| 24 | 17.954 | 4.329 | | |
| 25 | 41.263 | 2.092 | 1.755 | 52.31 |
| 26 | −114.316 | 1.803 | | |
| 27 | −82.019 | 4.181 | 1.863 | 36.24 |
| 28 | −11.000 | 0.95 | 1.830 | 41.64 |
| 29 | 21.395 | 11.445 | | |
| 30 | 28.122 | 5.279 | 1.678 | 50.71 |
| 31 | −106.392 | 12.2 | | |
| 32 | ∞ | 4.2 | 1.517 | 64.17 |
| 33 | ∞ | 1 | | |
| image plane | ∞ | | | |

Various Data
Zoom Lens Group Data

| group | first surface | end surface | focal length |
|---|---|---|---|
| 1 | 1 | 6 | 54.61 |
| 2 | 7 | 13 | −14.76 |
| 3 | 14 | 15 | 35.91 |
| 4 | 16 | 18 | −174.48 |
| 5 | 20 | 31 | 48.77 |

-continued

Unit: mm

|  | wide angle end | middle | telephoto end |
|---|---|---|---|
| Variable Distance | | | |
| infinite distance object (object distance: infinite) | | | |
| distance to object | ∞ | ∞ | ∞ |
| between 5th and 6th surfaces | 1.260 | 11.399 | 16.498 |
| between 13th and 14th surfaces | 15.764 | 9.438 | 1.000 |
| between 15th and 16th surfaces | 2.042 | 4.357 | 7.696 |
| between 18th and 19th surfaces | 7.029 | 0.900 | 0.900 |
| closest distance object (object distance: closest) | | | |
| distance to object | 873 | 873 | 873 |
| between 5th and 6th surfaces | 1.260 | 11.399 | 16.498 |
| between 13th and 14th surfaces | 17.007 | 12.630 | 7.898 |
| between 15th and 16th surfaces | 0.800 | 1.165 | 0.800 |
| between 18th and 19th surfaces | 7.029 | 0.900 | 0.900 |
| Zoom Data | | | |
| zoom ratio (ft/fw) 2.73 | | | |
| focal length | 35.80 | 61.72 | 97.70 |
| angle of view (2ω) | 33.57 | 19.85 | 12.62 |
| BF | 1.00 | 1.00 | 1.00 |
| total length of lens system | 120.00 | 120.00 | 120.00 |
| F-number | 2.85 | 2.85 | 2.85 |

In the aforementioned lens surface data, the lens surface No. corresponds to the number "i" in the symbol ri (i=1, 2, 3, ... ) attached to each of the lens surfaces shown in FIGS. 8A and 8B.

Respective aberrations in the zoom optical system 1E as the fifth example under the above lens arrangement and construction are shown in FIGS. 26A to 29C.

Example 6

FIGS. 9A and 9B are sectional views showing an arrangement of lens groups in a large aperture zoom optical system as a sixth example. FIGS. 30A to 33C are aberration diagrams of the zoom optical system as the sixth example. FIGS. 30A, 30B and 30C are longitudinal aberration diagrams at an infinity distance, FIGS. 31A, 31B and 31C are lateral aberration diagrams at an infinity distance, FIGS. 32A, 32B and 32C are longitudinal aberration diagrams at a closest distance, and FIGS. 33A, 33B and 33C are lateral aberration diagrams at a closest distance.

As shown in FIGS. 9A and 9B, the zoom optical system 1F as the sixth example has a five-component zoom system of positive-negative-positive-negative-positive refractive powers, which is composed of a first lens group (Gr1) having a positive refractive power as a whole, a second lens group (Gr2) having a negative refractive power as a whole, a third lens group (Gr3) having a positive refractive power as a whole, a fourth lens group (Gr4) having a negative refractive power as a whole, and a fifth lens group (Gr5) having a positive refractive power as a whole successively from the object side to the image side. At the time of zooming, as shown in FIGS. 9A and 9B, the first lens group (Gr1) disposed on the side closest to the object, and the fifth lens group (Gr5) disposed on the side closest to the image are fixed; and the second to fourth lens groups (Gr2) to (Gr4) are moved. An optical diaphragm (ST) is disposed on the side of the fifth lens group (Gr5) closest to the object, in other words, disposed between the fourth lens group (Gr4) and the fifth lens group (Gr5).

More specifically, in the zoom optical system 1F as the sixth example, the respective lens groups (Gr1, Gr2, Gr3, Gr4, Gr5) are constructed as follows successively from the object side to the image side.

The first lens group (Gr1) is composed of a negative meniscus lens element (first lens element L1) convex toward the object side, a positive meniscus lens element (second lens element L2) convex toward the object side, and a positive meniscus lens element (third lens element L3) convex toward the object side. The first lens element L1 and the second lens element L2 form a cemented lens.

The second lens group (Gr2) is composed of a biconvex positive lens element (fourth lens element L4), a biconcave negative lens element (fifth lens element L5), a biconcave negative lens element (sixth lens element L6), a positive meniscus lens element (seventh lens element L7) convex toward the object side, and a biconcave negative lens element (eighth lens element L8). The fourth lens element L4 and the fifth lens element L5 form a cemented lens, and the sixth lens element L6 and the seventh lens element L7 form a cemented lens.

The third lens group (Gr3) is composed of a biconvex positive lens element (ninth lens element L9). In other words, the third lens group (Gr3) is composed of the single lens element L9.

The fourth lens group (Gr4) is composed of a negative meniscus lens element (tenth lens element L10) convex toward the image side. In other words, the fourth lens group (Gr4) is composed of the single lens element L10.

The fifth lens group (Gr5) is composed of a biconvex positive lens element (eleventh lens element L11), a biconvex positive lens element (twelfth lens element L12), a biconcave negative lens element (thirteenth lens element L13), a positive meniscus lens element (fourteenth lens element L14) convex toward the image side, a biconcave negative lens element (fifteenth lens element L15), a biconvex positive lens element (sixteenth lens element L16), a negative meniscus lens element (seventeenth lens element L17) convex toward the image side, and a biconvex positive lens element (eighteenth lens element L18). The twelfth lens element L12 and thirteenth lens element L13 form a cemented lens, and the fourteenth lens element L14 and the fifteenth lens element L15 form a cemented lens.

The optical diaphragm (ST) is disposed on the object side of the fifth lens group (Gr5), and a light receiving surface of an image pickup element (SR) is disposed on the image side of the fifth lens group (Gr5) via a parallel plate (FT) as a filter.

In such a construction, a beam incident from the object side successively passes through the first lens group (Gr1), the second lens group (Gr2), the third lens group (Gr3), the fourth lens group (Gr4), the optical diaphragm (ST), the fifth lens group (Gr5) and the parallel plate (FT) along an optical axis (AX), and forms an optical image of an object on the light receiving surface of the image pickup element (SR). In the image pickup element (SR), the optical image is converted into an electrical signal. The electrical signal is processed as described above.

In the zoom optical system 1F as the sixth example, during the zooming from the wide-angle end (WIDE) to the telephoto end (TELE) via the middle point (MIDDLE), as shown in FIGS. 9A and 9B, the first lens group (Gr1) is fixed, the second lens group (Gr2) is substantially linearly moved from the object side to the image side, the third lens group (Gr3) is moved along a curve convex toward the image side, the fourth lens group (Gr4) is substantially linearly moved from the object side to the image side, and the fifth lens group (Gr5) (including the optical diaphragm (ST)) is fixed.

Focusing is performed by moving the third lens group (Gr3) along the optical axis direction. More specifically, the single lens element L9 forming the third lens group (Gr3) is moved toward the image side at the time of zooming from an infinite distance object to a closest distance object, whereby focusing is performed.

In the sixth example, the fifth lens group (Gr5) includes a lens group for use in shake correction. More specifically, in the fifth lens group (Gr5), the eleventh lens element L11, the twelfth lens element L12 and the thirteenth lens element L13 form a first sub lens group (5a) having a positive refractive power as a whole, the fourteenth lens element L14 and the fifteenth lens element L15 form a second sub lens group (5b) having a negative refractive power as a whole, the sixteenth lens element L16, the seventeenth lens element L17 and the eighteenth lens element L18 forms a third sub lens group (5c) having a positive refractive power as a whole, and shake correction is performed by moving the second sub lens group (5b) in a direction perpendicular to the optical axis (AX).

Construction data of the respective lens elements in the zoom optical system 1F as the sixth example are shown below.

Numerical Data in Example 6

Unit: mm

Lens Surface Data

| lens surface | r | d | nd | vd |
|---|---|---|---|---|
| object plane | ∞ | ∞ | | |
| 1 | 53.948 | 1.2 | 1.847 | 23.78 |
| 2 | 37.877 | 0.01 | 1.514 | 42.83 |
| 3 | 37.877 | 5.9 | 1.497 | 81.61 |
| 4 | 218.251 | 0.1 | | |
| 5 | 39.844 | 5 | 1.497 | 81.61 |
| 6 | 475.052 | 1.2 | | |
| 7 | 90.808 | 2.714 | 1.847 | 23.78 |
| 8 | −40.508 | 0.01 | 1.514 | 42.83 |
| 9 | −40.508 | 0.9 | 1.729 | 54.67 |
| 10 | 43.336 | 2.570 | | |
| 11 | −136.619 | 0.9 | 1.881 | 40.14 |
| 12 | 30.108 | 0.01 | 1.514 | 42.83 |
| 13 | 30.108 | 1.484 | 1.946 | 17.98 |
| 14 | 61.714 | 2.127 | | |
| 15 | −32.938 | 0.8 | 1.911 | 35.25 |
| 16 | 86.936 | 11.463 | | |
| 17 | 94.18 | 2.785 | 1.773 | 49.62 |
| 18 | −30.256 | 3.119 | | |
| 19 | −2.34E+01 | 1 | 1.847 | 23.78 |
| 20 | −34.562 | 15.771 | | |
| 21 (aperture stop) | ∞ | 1 | | |
| 22 | 25.416 | 3.186 | 1.729 | 54.67 |
| 23 | −57.238 | 0.4 | | |
| 24 | 28.808 | 3.157 | 1.497 | 81.61 |
| 25 | −24.620 | 0.01 | 1.514 | 42.83 |
| 26 | −24.620 | 1 | 1.847 | 23.78 |
| 27 | 52.227 | 2.591 | | |
| 28 | −50.109 | 2.55 | 1.847 | 23.78 |
| 29 | −14.241 | 0.01 | 1.514 | 42.83 |
| 30 | −14.241 | 0.8 | 1.723 | 37.99 |
| 31 | 30.305 | 3.110 | | |
| 32 | 5.41E+01 | 2.164 | 1.762 | 26.61 |
| 33 | −5.30E+01 | 14.388 | | |
| 34 | −17.653 | 0.9 | 1.911 | 35.25 |
| 35 | −4.19E+01 | 0.3 | | |
| 36 | 4.44E+01 | 2.172 | 1.904 | 31.32 |
| 37 | −13130.987 | 11 | | |
| 38 | ∞ | 4.2 | 1.517 | 64.20 |
| 39 | ∞ | 1 | | |
| image plane | ∞ | | | |

Various Data
Zoom Lens Group Data

| group | first surface | end surface | focal length |
|---|---|---|---|
| 1 | 1 | 6 | 64.81 |
| 2 | 7 | 16 | −15.55 |

-continued

Unit: mm

| 3 | 17 | 18 | 29.94 |
|---|---|---|---|
| 4 | 19 | 20 | −89.68 |
| 5 | 21 | 37 | 38.57 |

| | wide angle end | middle | telephoto end |
|---|---|---|---|
| Variable Distance | | | |
| infinite distance object (object distance: infinite) | | | |
| distance to object | ∞ | ∞ | ∞ |
| between 6th and 7th surfaces | 1.200 | 14.612 | 22.042 |
| between 16th and 17th surfaces | 11.463 | 7.448 | 1.500 |
| between 18th and 19th surfaces | 3.119 | 4.972 | 6.631 |
| between 20th and 21st surfaces | 15.771 | 4.522 | 1.379 |
| closest distance object (object distance: closest) | | | |
| distance to object | 591 | 891 | 891 |
| between 6th and 7th surfaces | 1.260 | 14.612 | 22.042 |
| between 16th and 17th surfaces | 12.793 | 9.687 | 6.281 |
| between 18th and 19th surfaces | 1.790 | 2.733 | 1.850 |
| between 20th and 21st surfaces | 15.771 | 4.522 | 1.379 |
| Zoom Data | | | |
| zoom ratio (ft/fw) 2.73 | | | |
| focal length | 35.90 | 61.88 | 97.15 |
| angle of view (2ω) | 33.49 | 19.80 | 12.69 |
| BF | 1.00 | 1.00 | 1.00 |
| total length of lens system | 113.00 | 113.00 | 113.00 |
| F-number | 2.85 | 2.85 | 2.85 |

In the aforementioned lens surface data, the lens surface No. corresponds to the number "i" in the symbol ri (i=1, 2, 3, . . . ) attached to each of the lens surfaces shown in FIGS. 9A and 9B.

Respective aberrations in the zoom optical system 1F as the sixth example under the above lens arrangement and construction are shown in FIGS. 30A to 33C.

Table 1 shows values of the conditional expressions (1) to (6), in the case where the conditional expressions (1) to (6) are applied to the large aperture zoom optical systems 1A to 1F as the first to sixth examples as described above.

TABLE 1

| | Exp | | | | | |
|---|---|---|---|---|---|---|
| Ex | (1) | (2) | (3) | (4) | (5) | (6) |
| Ex 1 | 0.50 | 1.03 | 81.61 | 0.75 | 1.42 | −1.00 |
| Ex 2 | 0.47 | 1.05 | 81.61 | 0.81 | 1.41 | −0.84 |
| Ex 3 | 0.49 | 1.04 | 81.61 | 0.86 | 1.40 | −0.74 |
| Ex 4 | 0.69 | 0.95 | 81.61 | 0.82 | 1.53 | −0.83 |
| Ex 5 | 0.25 | 1.36 | 81.61 | 0.74 | 1.12 | −0.69 |
| Ex 6 | 0.51 | 1.07 | 81.61 | 0.78 | 1.68 | −1.00 |

Ex: Example
Exp: Conditional Expression

As described above, since the zoom optical systems 1A to 1F as the first to sixth examples meet the aforementioned requirements, it is possible to reduce the weight of an optical system that is moved for focusing, while attaining miniaturization.

For instance, a high-pixel image pickup element 18 having such a high class (grade) as 5M pixels, 8M pixels or 10M pixels has a short pixel pitch, in other words, has a small pixel region in the case where the size of the image pickup element 18 is fixed. Accordingly, the large aperture zoom optical system 1 is required to have such a resolution as to match the pixel pitch. In the case where the large aperture zoom optical system 1 is evaluated based on a specific resolution e.g. an MTF characteristic, it is required to suppress various aberrations in respective predetermined ranges determined by e.g. the lens specifications. In the large aperture zoom optical systems 1A to 1F as the first to sixth examples, various aberrations are suppressed in the respective predetermined ranges, as shown in the aberration diagrams of FIGS. 10A to 10C, 12A to 12C, 14A to 14C, 16A to 16C, 18A to 18C, 20A to 20C, 22A to 22C, 24A to 24C, 26A to 26C, 28A to 28C, 30A to 30C, and 32A to 32C.

In the first to sixth examples, there are described the zoom optical systems 1A to 1F whose magnification is continuously varied. Alternatively, the large aperture zoom optical system 1 may be constructed in such a manner that a focal point is switchable between two focal points by using one optical arrangement for further miniaturization.

The specification discloses the aforementioned arrangements. The following is a summary of the primary arrangements of the embodiments.

A large aperture zoom optical system according to an aspect includes, successively from an object side to an image side: a first lens group having a positive refractive power; a second lens group having a negative refractive power; a third lens group having a positive refractive power; a fourth lens group having a negative refractive power; and a fifth lens group having a positive refractive power, wherein the fifth lens group is fixed, and at least the second lens group, the third lens group and the fourth lens group are moved toward the image side at the time of zooming from a wide angle end to a telephoto end, the third lens group is composed of a single lens element, and the third lens group is moved toward the image side at the time of focusing from an object at an infinite distance to an object at a short distance for focusing.

With the large aperture zoom optical system thus constructed, it is possible to reduce the weight of the third lens group that is moved for focusing, while attaining miniaturization.

Preferably, in the large aperture zoom optical system, the single lens element of the third lens group may meet the conditional expression (1), and more preferably, the single lens element of the third lens group may meet the conditional expression (1A).

Since the large aperture zoom optical system thus constructed meets the conditional expression (1), and more preferably, the conditional expression (1A), it is possible to obtain a desirable optical performance even in the case where the object distance (distance to the object) changes.

Preferably, the large aperture zoom optical system may meet the conditional expression (2), and more preferably, the conditional expression (2A).

Since the large aperture zoom optical system thus constructed preferably meets the conditional expression (2), and more preferably, the conditional expression (2A), it is possible to make the total length of the optical system short, while maintaining the desirable optical performance.

Preferably, in the large aperture zoom optical system, the fifth lens group may include at least one positive lens element that meets the conditional expression (3), and more preferably, the fifth lens group may include at least one positive lens element that meets the conditional expression (3A).

In the large aperture zoom optical system thus constructed, since the fifth lens group includes at least one positive lens element that meets the conditional expression (3) and more preferably, at least one positive lens element that meets the conditional expression (3A), it is possible to suppress on-axial chromatic aberration and off-axial chromatic aberration.

Preferably, the large aperture zoom optical system may meet the conditional expression (4), and more preferably, the conditional expression (4A).

Since the large aperture zoom optical system thus constructed meets the conditional expression (4), and more preferably, the conditional expression (4A), it is possible to realize a desirable optical performance while miniaturizing the optical system, even in the case where the object distance changes.

Preferably, the large aperture zoom optical system may meet the conditional expression (5), and more preferably, the conditional expression (5A).

Since the large aperture zoom optical system thus constructed meets the conditional expression (5), and more preferably, the conditional expression (5A), it is possible to realize a desirable optical performance while miniaturizing the optical system, even in the case where the object distance changes.

Preferably, in the large aperture zoom optical system, the fifth lens group may be composed of, successively from the object side to the image side, a first sub lens group having a positive refractive power, a second sub lens group having a negative refractive power, and a third sub lens group having a positive refractive power, the fifth lens group may meet the conditional expression (6), and the second sub lens group may be moved in a direction perpendicular to an optical axis of the zoom optical system for shake correction.

In the large aperture zoom optical system thus constructed, since the fifth lens group has a triplet structure of positive-negative-positive refractive powers, it is possible to realize a desirable optical performance, while suppressing field curvature. In the large aperture zoom optical system thus constructed, since the first sub lens group having a positive refractive power is disposed at a front position (on the incident light side) of the second sub lens group for use in shake correction, it is possible to reduce the spot diameter of a light flux to be incident into the second sub lens group for use in shake correction. Thus, in the large aperture zoom optical system thus constructed, it is possible to reduce the weight of the second sub lens group that is moved for shake correction. Further, in the case where the value of the conditional expression (6) is under the lower limit of the conditional expression (6), the focal length of the second sub lens group for use in shake correction is shortened, and coma aberration at the time of shake correction is increased. As a result, the optical performance at the time of shake correction may be degraded, which is not preferable. On the other hand, in the case where the value of the conditional expression (6) is over the upper limit of the conditional expression (6), the focal length of the second sub lens group for use in shake correction is lengthened, and the moving amount of the second sub lens group at the time of shake correction is increased. As a result, the second sub lens group may interfere (collide) with other members such as a lens barrel disposed in the moving direction of the second sub lens group, which is not preferable.

An image pickup apparatus according to another aspect includes one of the aforementioned large aperture zoom optical systems, and an image pickup element which converts an optical image into an electrical signal, wherein the large aperture zoom optical system is operable to form an image of an object on a light receiving surface of the image pickup element.

This application is based on Japanese Patent Application No. 2011-130825 filed on Jun. 13, 2011, the contents of which are hereby incorporated by reference.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A large aperture zoom optical system, comprising, successively from an object side to an image side:
a first lens group having a positive refractive power;
a second lens group having a negative refractive power;
a third lens group having a positive refractive power;
a fourth lens group having a negative refractive power; and
a fifth lens group having a positive refractive power,
wherein the fifth lens group is fixed, and at least the second lens group, the third lens group and the fourth lens group are moved toward the image side at the time of zooming from a wide angle end to a telephoto end,
wherein the third lens group comprises a single lens element,
wherein the third lens group is moved toward the image side at the time of focusing from an object at an infinite distance to an object at a short distance for focusing, and
wherein the single lens element of the third lens group meets the following conditional expression (1):

$$0.2<(R1+R2)/(R1-R2)<0.75 \quad (1)$$

where
R1: a curvature radius of an object-side surface of the single lens element, and
R2: a curvature radius of an image-side surface of the single lens element.

2. The large aperture zoom optical system according to claim 1, wherein the single lens element of the third lens group meets the following conditional expression (1A):

$$0.24<(R1+R2)/(R1-R2)<0.70 \quad (1A)$$

where
R1: a curvature radius of an object-side surface of the single lens element, and
R2: a curvature radius of an image-side surface of the single lens element.

3. The large aperture zoom optical system according to claim 1, wherein the large aperture zoom optical system meets the following conditional expression (2):

$$0.9<f5/fw<1.4 \quad (2)$$

where
f5: a focal length of the fifth lens group, and
fw: a focal length of an entirety of the zoom optical system at the wide angle end.

4. The large aperture zoom optical system according to claim 1, wherein the large aperture zoom optical system meets the following conditional expression (2A):

$$0.94<f5/fw<1.37 \quad (2A)$$

where
f5: a focal length of the fifth lens group, and
fw: a focal length of an entirety of the zoom optical system at the wide angle end.

5. The large aperture zoom optical system according to claim 3, wherein the fifth lens group includes at least one positive lens element that meets the following conditional expression (3):

$$\nu d>80 \quad (3)$$

where
νd: an Abbe number of the positive lens element in the fifth lens group.

6. The large aperture zoom optical system according to claim 3, wherein the fifth lens group includes at least one positive lens element that meets the following conditional expression (3A):

$$\nu d>81 \quad (3A)$$

where
νd: an Abbe number of the positive lens element in the fifth lens group.

7. The large aperture zoom optical system according to claim 1, wherein the large aperture zoom optical system meets the following conditional expression (4):

$$0.68<f3/f5<0.9 \quad (4)$$

where
f3: a focal length of the third lens group, and
f5: a focal length of the fifth lens group.

8. The large aperture zoom optical system according to claim 1, wherein the large aperture zoom optical system meets the following conditional expression (4A):

$$0.73<f3/f5<0.87 \quad (4A)$$

where
f3: a focal length of the third lens group, and
f5: a focal length of the fifth lens group.

9. The large aperture zoom optical system according to claim 1, wherein the large aperture zoom optical system meets the following conditional expression (5):

$$1<f1/f5<1.9 \quad (5)$$

where
f1: a focal length of the first lens group, and
f5: a focal length of the fifth lens group.

10. The large aperture zoom optical system according to claim 1, wherein the large aperture zoom optical system meets the following conditional expression (5A):

$$1.11<f1/f5<1.70 \quad (5A)$$

where
f1: a focal length of the first lens group, and
f5: a focal length of the fifth lens group.

11. The large aperture zoom optical system according to claim 1, wherein the fifth lens group comprises, successively from the object side to the image side, a first sub lens group having a positive refractive power, a second sub lens group having a negative refractive power, and a third sub lens group having a positive refractive power,
the fifth lens group meets the following conditional expression (6):

$$-0.6<f5b/f5a<-1.2 \quad (6)$$

where
f5a: a focal length of the first sub lens group of the fifth lens group, and
f5b: a focal length of the second sub lens group of the fifth lens group, and
the second sub lens group is moved in a direction perpendicular to an optical axis of the zoom optical system for shake correction.

12. The large aperture zoom optical system according to claim 1, wherein an F-number is smaller than 3.

13. The large aperture zoom optical system according to claim 1, wherein the large aperture zoom optical system meets the following conditional expression:

$$TL/2Y'<6.0$$

where
- TL: a distance on an optical axis from a lens surface closest to an object, and a focal point on the image side at the wide angle end, and
- 2Y': a length of a diagonal line from the object to an image pickup surface of a solid-state image pickup element, or a length of a diagonal line from the object to a rectangular effective pixel region of the solid-state image pickup element.

14. The large aperture zoom optical system according to claim 1, wherein the third lens group and the fifth lens group each includes a resin lens element manufactured by dispersing particles of 30 nm or smaller in diameter.

15. An image pickup apparatus, comprising:
the large aperture zoom optical system of claim 1; and
an image pickup element which converts an optical image into an electrical signal,
wherein the large aperture zoom optical system is operable to form an image of an object on a light receiving surface of the image pickup element.

* * * * *